US 12,114,005 B2

(12) United States Patent
Chen

(10) Patent No.: US 12,114,005 B2
(45) Date of Patent: Oct. 8, 2024

(54) ENCODING AND DECODING METHOD AND APPARATUS, AND DEVICES

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 17/766,210

(22) PCT Filed: Oct. 28, 2020

(86) PCT No.: PCT/CN2020/124304
§ 371 (c)(1),
(2) Date: Apr. 1, 2022

(87) PCT Pub. No.: WO2021/088695
PCT Pub. Date: May 14, 2021

(65) Prior Publication Data
US 2024/0073437 A1 Feb. 29, 2024

(30) Foreign Application Priority Data
Nov. 5, 2019 (CN) .......................... 201911072766.X

(51) Int. Cl.
H04N 19/176 (2014.01)
H04N 19/105 (2014.01)
H04N 19/159 (2014.01)
H04N 19/513 (2014.01)

(52) U.S. Cl.
CPC ......... *H04N 19/513* (2014.11); *H04N 19/105* (2014.11); *H04N 19/159* (2014.11); *H04N 19/176* (2014.11)

(58) Field of Classification Search
CPC .......................... H04N 19/513; H04N 19/105
See application file for complete search history.

(56) References Cited

U.S. PATENT DOCUMENTS 9,635,380 B2 * 4/2017 Kim ..................... H04N 19/513
11,575,925 B2 * 2/2023 Lee ..................... H04N 19/577
(Continued)

FOREIGN PATENT DOCUMENTS

CN 101299799 A 11/2008
CN 102387360 A 3/2012
(Continued)

OTHER PUBLICATIONS

Japanese Patent Office, Decision of Rejection Issued in the corresponding JP Application No. 2022-520621 on Dec. 4, 2023 with Machine Translation.
(Continued)

Primary Examiner — Irfan Habib
(74) Attorney, Agent, or Firm — Ladas & Parry, LLP

(57) ABSTRACT

The present disclosure provides an encoding and decoding method, apparatus, and devices. The encoding and decoding method includes the following steps: determining to use a decoder-side motion vector refinement mode for a current block if the conditions are all satisfied; and if it is determined to use the decoder-side motion vector refinement mode for the current block, performing motion compensation on the current block.

20 Claims, 7 Drawing Sheets

(56) References Cited

U.S. PATENT DOCUMENTS

| | | | |
|---|---|---|---|
| 11,683,517 B2* | 6/2023 | Zhang | H04N 19/513 375/240.16 |
| 2006/0120613 A1 | 6/2006 | Su et al. | |
| 2016/0373688 A1* | 12/2016 | Imajo | H04N 19/176 |
| 2017/0085906 A1* | 3/2017 | Chen | H04N 19/70 |
| 2017/0310990 A1* | 10/2017 | Hsu | H04N 19/577 |
| 2018/0070092 A1* | 3/2018 | Kim | H04N 19/139 |
| 2018/0242004 A1* | 8/2018 | Park | H04N 19/52 |
| 2018/0352247 A1* | 12/2018 | Park | H04N 19/513 |
| 2019/0208223 A1* | 7/2019 | Galpin | H04N 19/52 |
| 2019/0342557 A1* | 11/2019 | Robert | H04N 19/52 |
| 2020/0128250 A1* | 4/2020 | Lee | H04N 19/159 |
| 2020/0162743 A1* | 5/2020 | Park | H04N 19/513 |
| 2020/0177877 A1 | 6/2020 | Chen et al. | |
| 2021/0195198 A1* | 6/2021 | Chen | H04N 19/52 |
| 2021/0235105 A1* | 7/2021 | Chen | H04N 19/513 |
| 2021/0258570 A1* | 8/2021 | Chen | H04N 19/105 |
| 2022/0078408 A1* | 3/2022 | Park | H04N 19/139 |
| 2022/0078442 A1* | 3/2022 | Chen | H04N 19/176 |
| 2022/0232230 A1* | 7/2022 | Lee | H04N 19/60 |

FOREIGN PATENT DOCUMENTS

| | | |
|---|---|---|
| CN | 102638678 A | 8/2012 |
| CN | 104427345 A | 3/2015 |
| CN | 105338362 A | 2/2016 |
| CN | 105578197 A | 5/2016 |
| CN | 106101716 A | 11/2016 |
| CN | 109089119 A | 12/2018 |
| CN | 109391814 A | 2/2019 |
| CN | 109495746 A | 3/2019 |
| CN | 109996081 A | 7/2019 |
| CN | 110213590 A | 9/2019 |
| CN | 110312132 A | 10/2019 |
| CN | 111698509 A | 9/2020 |
| CN | 112543331 A | 3/2021 |
| EP | 2700231 | 2/2014 |
| JP | 2022537064 A | 8/2022 |
| WO | 2012144829 A2 | 10/2012 |

OTHER PUBLICATIONS

State Intellectual Property Office of the People's Republic of China, Office Action and Search Report Issued in the corresponding CN Application No. 201911072766.X, Oct. 12, 2023, with Machine Translation.

Na Zhang et al, "Non-CE4: Enabling BDOF and DMVR according to reference picture types (JVET-P0191)", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0191.

Fangdong Chen, "Non-CE4: On Enabling Condition of BDOF and DMVR (JVET-P0311-v1)", Joint Video Experts Team (JVET)of ITU-T SG 16 WP 3 and ISO/IEC JTC 1/SC 29/WG 11, 16th Meeting: Geneva, CH, Oct. 1-11, 2019, Document: JVET-P0311-v1.

International Search Report in International Application No. PCT/CN2020/124304 mailed on Jan. 29, 2021, with English translation provided by WIPO.

Written Opinion of the International Searching Authority in International Application No. PCT/CN2020/124304 mailed on Jan. 29, 2021, and its English translation provided by Google Translate.

State Intellectual Property Office of the People's Republic of China, Office Action and Search Report Issued in Application No. 202010988743.X, Jun. 2, 2021, 19 pages (Submitted with Machine/Partial Translation).

State Intellectual Property Office of the People's Republic of China, Office Action and search report issued in Application No. 202010990344.7, Jun. 2, 2021, 15 pages (Submitted with Machine/Partial Translation).

First Office Action for Japanese Patent Application No. 2022-520621 issued by the Japanese Patent Office on Jun. 5, 2023 and its English translation provided by foreign associate.

"Algorithm description for Versatile Video Coding and Test Model 6 (VTM 6)," Document: JVET-O2002-v2, Status: Output document of JVET, Authors: Jianle Chen, Yan Ye, Seung Whan Kim, Joint Video Expert Team (JVET) of ITU-T SG 16 WP 3 and ISO/IEC JTC 1/SC 29/WG 11, 15th meeting: Gothenburg, SE, Jul. 3-12, 2019.

"Non-CE4: Unified BDOF and DMVR early termination threshold," Document: JVET-P0654_rl, Status: Input document to JVET, Authors: Xiaoyu Xiu, Yi-Wen Chen, Tsung-Chuan Ma, Hong-Jheng Jhu, Xianglin Wang, Source: Kwai Inc. JVET, Authors: Jianle Chen, Yan Ye, Seung Whan Kim, Joint Video Expert Team (JVET) of ITU-T SG 16 WP 3 and ISO/IEX JTC 1/SC 29/WG 11, 16th meeting: Geneva, CH, Oct. 1-11, 2019.

"Versatile Video Coding (Draft 7)," document: JVET-P2001-vB, Status: Output document approved by JVET, Authors: Benjamin Bross, Jianle Chen, Shan Liu, Ye-Kui Wang, Joint Video Expert Team (JVET) of ITU-T SG 16 WP 3 and ISO/IEX JTC 1/SC 29/WG 11, 16th meeting: Geneva, CH, Oct. 1-11, 2019.

* cited by examiner

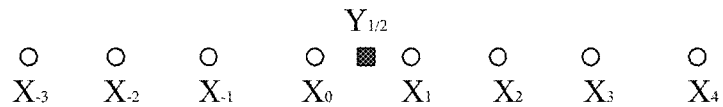

FIG. 1A

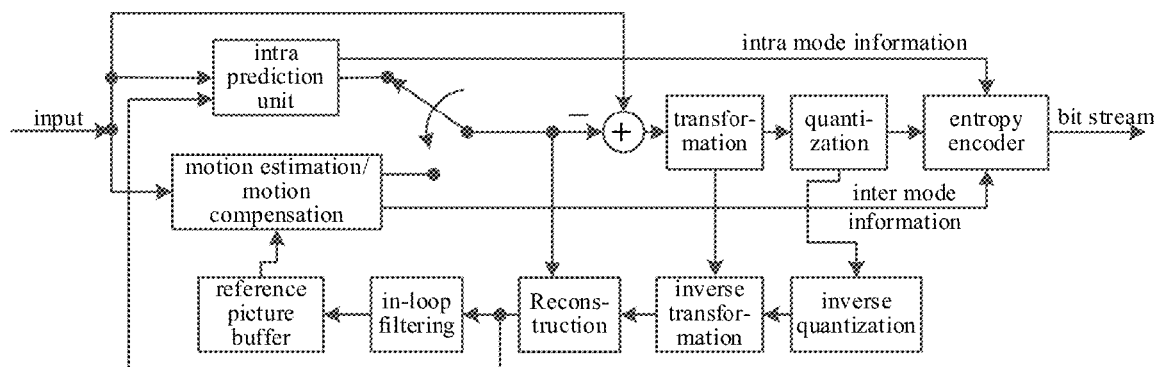

FIG. 1B

| if the following conditions are all satisfied, it is determined to use a decoder-side motion vector refinement mode for a current block: control information allows the current block to enable the decoder-side motion vector refinement mode; a prediction mode of the current block is a regular merge mode; or, a prediction mode of the current block is a merge mode or a skip mode, and the prediction mode of the current block is not other modes except the regular merge mode; prediction values of the current block is obtained by use of a weighted sample prediction process on reference blocks of two reference pictures, one reference picture is displayed earlier than a current picture, the other reference picture is displayed later than the current picture, and the two reference pictures have a same distance from the current picture; the two reference pictures of the current block are same in weight; the two reference pictures of the current block both are short-term reference pictures; the width, height and area of the current block are all in defined ranges; and the two reference pictures of the current block are identical in size to the current picture | 201 |

↓

| if it is determined to use the decoder-side motion vector refinement mode for the current block, motion compensation is performed on the current block | 202 |

FIG. 2

ENCODING AND DECODING METHOD AND APPARATUS, AND DEVICES

CROSS-REFERENCE TO RELATED APPLICATIONS

The present application is a U.S. national phase application of a PCT Application No. PCT/CN2020/124304 filed on Oct. 28, 2020, which claims a priority to the Chinese patent application No. 201911072766.X filed in China on Nov. 5, 2019, the disclosures of which are incorporated herein by reference in their entireties.

TECHNICAL FIELD

The present disclosure relates to the field of encoding and decoding technologies, in particular to an encoding and decoding method, an encoding and decoding apparatus, and devices thereof.

BACKGROUND

To save spaces, video images are transmitted after being encoded. A video encoding method may include processes such as prediction, transformation, quantization, entropy encoding, filtering, etc. The prediction encoding includes intra encoding and inter encoding. The inter encoding refers to an operation of utilizing a temporal domain correlation of a video to predict pixel values of a current picture by using pixel values of neighboring encoded pictures, so as to effectively remove temporal domain redundancies of the video. In the inter encoding, a motion vector (MV) may be used to represent a relative displacement between a current block of a current picture and a reference block of a reference picture. For example, a relatively high temporal domain correlation exists between a current picture A and a reference picture B, when a current block A1 of the current picture A is to be transmitted, motion estimation may be performed in the reference picture B to find a reference block B1 which best matches with the current block A1, and determine a relative displacement between the current block A1 and the reference block B1, where the relative displacement is a motion vector of the current block A1. An encoder may send the motion vector to a decoder instead of sending the current block A1 to the decoder, and then the decoder may obtain the current block A1 according to the motion vector and the reference block B1. Obviously, because the number of bits occupied by the motion vector is less than the number of bits occupied by the current block A1, a large number of bits may be saved.

In related arts, when a current block is a unidirectional block, after a motion vector (called original motion vector hereinafter) of the current block is obtained, the original motion vector may be adjusted, and then encoding and decoding are performed based on the adjusted motion vector, thereby improving the coding performance. But when a current block is a bidirectional block, after a first original motion vector and second original motion vector of the current block are obtained, there is no reasonable solution to a problem of how to adjust the first original motion vector and the second original motion vector, that is to say, for the scenarios of bidirectional blocks, problems such as low prediction quality, prediction error, and the like exist, thereby resulting in a poor coding performance.

SUMMARY

The present disclosure provides an encoding and decoding method, an encoding and decoding apparatus, and devices thereof, which can improve the coding performance.

The present disclosure provides an encoding and decoding method, which includes the following steps:
 determining to use a decoder-side motion vector refinement mode for a current block if the following conditions are all satisfied:
 control information allows the current block to enable the decoder-side motion vector refinement mode;
 a prediction mode of the current block is a regular merge mode; or, the prediction mode of the current block is a merge mode or a skip mode, and the prediction mode of the current block is not other modes except the regular merge mode;
 prediction values of the current block are obtained by use of a weighted sample prediction process on reference blocks of two reference pictures, one reference picture is displayed earlier than a current picture, the other reference picture is displayed later than the current picture, and the two reference pictures have a same distance from the current picture;
 the two reference pictures of the current block are same in weight;
 the two reference pictures of the current block both are short-term reference pictures;
 the width, height and area of the current block are all in defined ranges; and
 the two reference pictures of the current block are identical in size to the current picture; and
 if it is determined to use the decoder-side motion vector refinement mode for the current block, performing motion compensation on the current block.

The present disclosure provides an encoding/decoding apparatus, which includes:
 a determining module, configured to determine to use a decoder-side motion vector refinement mode for a current block if the following conditions are all satisfied:
 control information allows the current block to enable the decoder-side motion vector refinement mode;
 a prediction mode of the current block is a regular merge mode; or, a prediction mode of the current block is a merge mode or a skip mode, and the prediction mode of the current block is not other modes except the regular merge mode;
 prediction values of the current block are obtained by use of a weighted sample prediction process on reference blocks of two reference pictures, one reference picture is displayed earlier than a current picture, the other reference picture is displayed later than the current picture, and the two reference pictures have a same distance from the current picture;
 the two reference pictures of the current block are same in weight;
 the two reference pictures of the current block both are short-term reference pictures;
 the width, height and area of the current block are all in defined ranges; and
 the two reference pictures of the current block are identical in size to the current picture; and
 a motion compensation module, configured to perform motion compensation on the current block if it is determined to use the decoder-side motion vector refinement mode for the current block.

The present disclosure provides an encoding device, which includes a processor and a machine-readable storage medium, where the machine-readable storage medium stores machine-executable instructions that may be executed by the processor;

the processor is configured to execute the machine-executable instructions to implement the following steps:
determining to use a decoder-side motion vector refinement mode for a current block if the following conditions are all satisfied:
control information allows the current block to enable the decoder-side motion vector refinement mode;
a prediction mode of the current block is a regular merge mode; or, a prediction mode of the current block is a merge mode or a skip mode, and the prediction mode of the current block is not other modes except the regular merge mode;
prediction values of the current block are obtained by use of a weighted sample prediction process on reference blocks of two reference pictures, one reference picture is displayed earlier than a current picture, the other reference picture is displayed later than the current picture, and the two reference pictures have a same distance from the current picture;
the two reference pictures of the current block are same in weight;
the two reference pictures of the current block both are short-term reference pictures;
the width, height and area of the current block are all in defined ranges; and
the two reference pictures of the current block are identical in size to the current picture; and
if it is determined to use the decoder-side motion vector refinement mode for the current block, performing motion compensation on the current block.

The present disclosure provides a decoder device, which includes a processor and a machine-readable storage medium, where the machine-readable storage medium stores machine-executable instructions that may be executed by the processor;
the processor is configured to execute the machine-executable instructions to implement the following steps:
determining to use a decoder-side motion vector refinement mode for a current block if the following conditions are all satisfied:
control information allows the current block to enable the decoder-side motion vector refinement mode;
a prediction mode of the current block is a regular merge mode; or, a prediction mode of the current block is a merge mode or a skip mode, and the prediction mode of the current block is not other modes except the regular merge mode;
prediction values of the current block are obtained by use of a weighted sample prediction process on of reference blocks of two reference pictures, one reference picture is displayed earlier than a current picture, the other reference picture is displayed later than the current picture, and the two reference pictures have a same distance from the current picture;
the two reference pictures of the current block are same in weight;
the two reference pictures of the current block both are short-term reference pictures;
the width, height and area of the current block are all in defined ranges; and
the two reference pictures of the current block are identical in size to the current picture; and
if it is determined to use the decoder-side motion vector refinement mode for the current block, performing motion compensation on the current block.

From the technical solutions above, it may be seen that in embodiments of the present disclosure, if it is determined to use a decoder-side motion vector refinement mode for a current block, a first target motion vector and a second target motion vector are obtained according to a first original motion vector and a second original motion vector, and then prediction values are determined according to the first target motion vector and the second target motion vector, instead of according to the first original motion vector and the second original motion vector. In this way, problems such as low prediction quality and prediction error and the like are solved, thereby improving the encoding performance and the encoding efficiency.

BRIEF DESCRIPTION OF THE DRAWINGS

FIG. 1A is a schematic diagram illustrating interpolation according to an embodiment of the present disclosure.

FIG. 1B is a schematic diagram illustrating a video encoding framework according to an embodiment of the present disclosure.

FIG. 2 is a flowchart illustrating an encoding and decoding method according to an embodiment of the present disclosure.

DETAILED DESCRIPTION OF THE EMBODIMENTS

Figure 3:
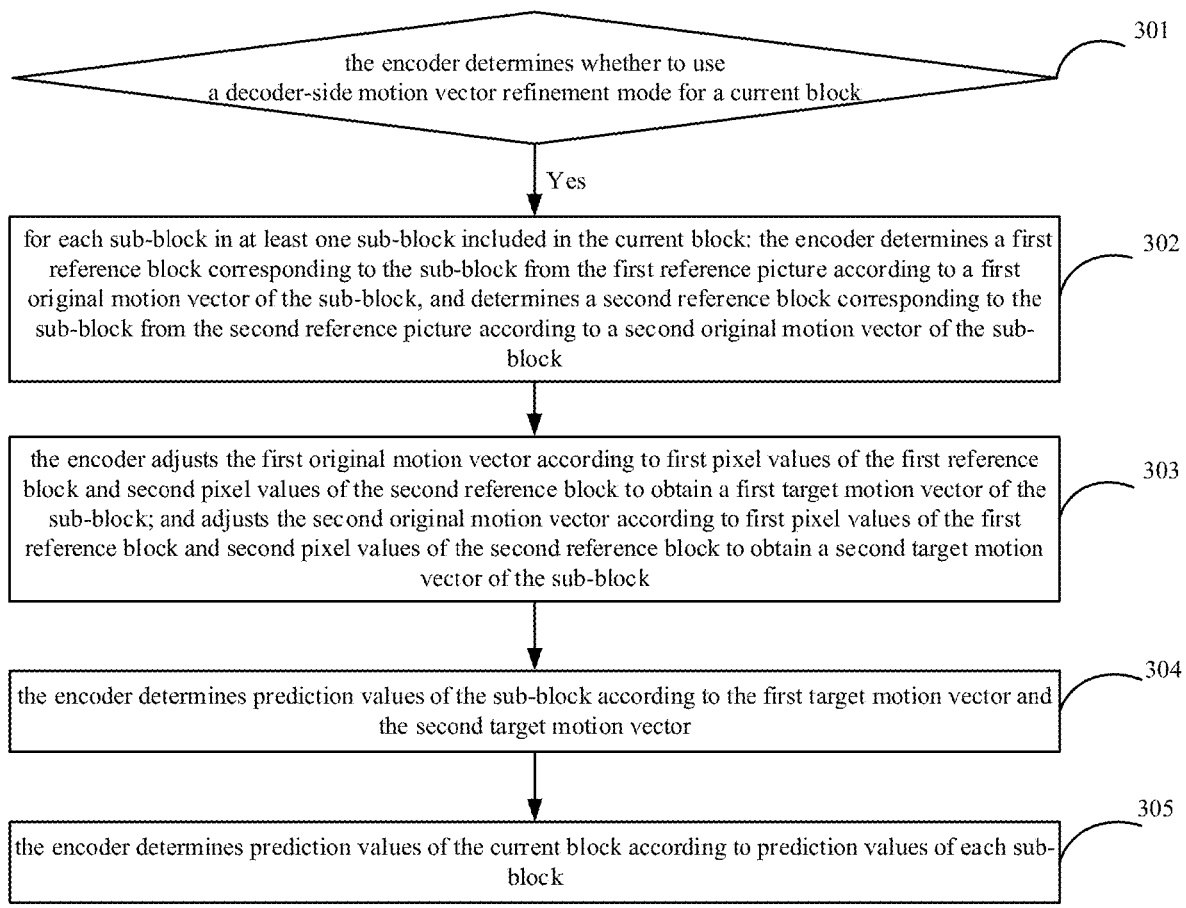
FIG. 3 is a flowchart illustrating an encoding and decoding method according to an embodiment of the present disclosure.

The terms used in the embodiments of the present disclosure are only for describing specific embodiments, rather than limiting the embodiments of present disclosure. The singular forms of "a", "said" and "the" used in the embodiments and claims of the present disclosure are also intended to include plural forms, unless the context clearly indicates otherwise. It should also be understood that the term "and/or" as used herein refers to any one or all possible combinations of one or more associated listed items. It should be understood that although the terms such as first, second, third, etc. may be used in the embodiments of the present disclosure to describe various information, the information should not be limited by these terms. These terms are only used to distinguish the same type of information from each other. For example, without departing from the scope of the present disclosure, first information may also be referred to as second information, and similarly, second information may also be referred to as first information, thus, the selection of the terms depends on the context. In addition, the word "if" used may be interpreted as "upon" or "when" or "in response to".

An embodiment of the present disclosure provides an encoding and decoding method, an encoding and decoding apparatus, and devices thereof, which may involve the following concepts.

Intra prediction and inter prediction technologies: intra prediction refers to an operation of utilizing a spatial domain correlation of a video to predict a value of a current pixel by using pixel values of one or more encoded blocks of a current picture, so as to remove spatial domain redundancies of the video; and inter prediction refers to an operation of utilizing a temporal domain correlation of a video to predict pixel values of a current picture by using pixel values of one or more neighboring encoded pictures because sequences in the video generally contains a relatively strong temporal domain correlation, so as to effectively remove temporal domain redundancies of the video. Inter prediction parts in main video encoding standards adopt a block-based motion compensation technology of which the main principle is to find a best matching block in one or more previously encoded pictures for each pixel block of the current picture, and this process is referred to as Motion Estimation.

Motion vector (MV): in inter encoding, a motion vector is used to represent a relative displacement between a current block and a best matching block in a reference picture. Each block obtained by partition has a corresponding motion vector to be transmitted to a decoder. If the motion vector of each block is encoded and transmitted independently, especially when smaller-sized blocks are obtained by partition, more bits have to be consumed. For reducing the number of bits used to encode the motion vector, a spatial correlation between neighboring image blocks may be utilized to predict the motion vector of a current block based on the motion vectors of neighboring encoded blocks, and then, a prediction difference is encoded, thereby effectively reducing the number of bits representing the motion vector. When the motion vector of the current block is encoded, firstly, the motion vector of the current block is predicted by using the motion vectors of one or more neighboring encoded blocks, and then, a motion vector difference (MVD) between a motion vector prediction (MVP) value and a real estimation value of the motion vector is encoded, thereby effectively reducing the number of bits for encoding the MV.

Motion information: because the motion vector represents a position offset of a current block relative to a reference block, for accurately obtaining the information oriented to an image block, besides the motion vector, index information of one or more reference pictures is also required to indicate which reference picture is used. For a current picture, a reference picture list (may also be referred to as a reference picture sample array) may be established, and the index information of the reference pictures represents which reference picture listed in the reference picture list is used by a current block. In addition, many encoding technologies also support multiple reference picture lists, thus, an index value may be used to indicate which reference picture list is used, and this index value may be referred to as a reference direction. Information related to motion, such as motion vector, reference picture index, reference direction, and the like, may be collectively referred to as motion information.

Interpolation: if a current motion vector is a non-integer pixel accuracy, existing pixel values cannot be directly copied from a reference picture corresponding to the current block, and pixel values required by the current block may be obtained by interpolation. As shown in FIG. 1A, if a pixel value $Y_{1/2}$ with an offset of ½ pixel needs to be obtained, the pixel value $Y_{1/2}$ may be obtained by performing interpolation between surrounding existing pixel values X. Illustratively, if an interpolation filter with N taps is adopted, the pixel value $Y_{1/2}$ may be obtained by performing interpolation for surrounding N integral pixels.

Motion compensation: motion compensation refers to a process of obtaining all pixel values of the current block by interpolation or copying.

Merge modes: the merge modes include: a regular merge mode (may also be referred to as normal merge mode), a sub-block merge mode, (i.e., a merge mode using sub-block motion information), a MMVD mode (i.e., a merge mode encoding a motion difference, which may be called merge with MVD mode), a CIIP mode (i.e., a merge mode of combining intra prediction with inter prediction to generate new prediction values, which may be called combine inter intra prediction mode), a TPM mode (i.e., a merge mode for triangular prediction, which may be called geometric partitioning merge mode with triangular partition), and a GEO mode (i.e., a merge mode based on random geometrical partitioning shape, which may be called Geometrical Partitioning).

Skip mode: a skip mode is a special merge mode, and the skip mode differs from the merge modes in that the skip mode does not need to encode a residual. If a current block is in the skip mode, the CIIP mode is disabled by default, but the regular merge mode, the sub-block merge mode, the MMVD mode, the TPM mode and the GEO mode are still applicable.

Illustratively, how to generate prediction values may be determined based on the regular merge mode, the sub-block merge mode, the MMVD mode, the CIIP mode, the TPM mode and the GEO mode, etc. After the prediction values are generated, for the merge mode, a reconstruction value may be acquired by using the prediction values and a residual value; and for the skip mode, because no residual value exists, a reconstruction value may be obtained by directly using the prediction values.

Sequence parameter set (SPS): in a sequence parameter set, there are flags for determining whether certain tools are allowed to be enabled and disabled in a whole sequence. If a value of a flag is 1, a tool corresponding to the flag is allowed to be enabled in a video sequence; and if a value of a flag is 0, in a video sequence, a tool corresponding to the flag is not allowed to be enabled in an encoding process.

Regular merge mode: motion information is selected from a candidate motion information list, and then prediction values of a current block are generated based on the motion information, where the candidate motion information list includes: candidate motion information of one or more spatial neighboring blocks, candidate motion information of one or more temporal neighboring blocks, motion information of one or more spatial non-neighboring blocks, motion information acquired by combining existing motion information, and default motion information, etc.

MMVD mode: based on the candidate motion information list of the regular merge mode, motion information is selected from the candidate motion information list of the regular merge mode as original motion information, and a motion information difference is obtained by using a table look-up method. Final motion information is acquired based on the original motion information and the motion information difference, and prediction values of the current block are generated based on the final motion information.

CIIP mode: new prediction values of a current block are obtained by combining intra prediction values with inter prediction values.

Sub-block merge mode: the sub-block merge mode includes an Affine merge mode and a sub-block-based temporal motion vector prediction (TMVP) mode.

The Affine merge mode, similar to the regular merge mode, is also implemented by selecting motion information from a candidate motion information list, and generating prediction values of a current block based on the motion information. The Affine merge mode differs from the regular merge mode in that motion information in the candidate motion information list of the regular merge mode is a translational motion vector with 2 parameters, whereas the motion information in the candidate motion information list of the Affine merge mode is Affine motion information with 4 parameters, or Affine motion information with 6 parameters.

The subblock-based TMVP mode: in a temporal reference picture, motion information of a reference block is directly used to generate prediction values of a current block, where the motion information of different sub-blocks in the block may be different.

TPM mode: one block is partitioned into two triangular sub-blocks (a 45-degree triangular sub-block and a 135-degree triangular sub-block), where the two triangular sub-blocks have different unidirectional motion information. The TPM mode is used in a prediction process and will not affect subsequent transformation and quantization processes, and the unidirectional motion information is also directly acquired from a candidate motion information list.

GEO mode: the GEO mode and the TPM mode are similar to each other, and different in partitioning shape. In the GEO mode, one square block is partitioned into two sub-blocks of any shape (any other shapes besides the shape of the two triangular sub-blocks of TPM), such as a triangular sub-block and a pentagonal sub-block; or a triangular sub-block and a quadrilateral sub-block; or two trapezoidal sub-blocks, and so on, and there is no restriction on the partitioning shape. The two sub-blocks partitioned in the GEO mode have different unidirectional motion information.

From the above examples, it can be seen that the merge modes and skip mode provided in the embodiments refer to one type of prediction modes in which motion information is directly selected from a candidate motion information list to generate prediction values of a current block. In these prediction modes, a motion vector refinement process is not required at an encoder, and encoding the motion information difference is not required for other modes than the MMVD mode.

Video encoding framework: as shown in FIG. 1B, a video encoding framework may be used to implement a processing flow at an encoder according to an embodiment of the present disclosure. Moreover, a schematic diagram of a video decoding framework is similar to FIG. 1B, and thus will not be repeated here. A video decoding framework may be used to implement a processing flow at a decoder according to an embodiment of the present disclosure. Specifically, in the video encoding framework and the video decoding framework, modules such as an intra prediction module, a motion estimation/motion compensation module, a reference picture buffer, an in-loop filtering module, a reconstruction module, a transform module, a quantization module, an inverse transform module, an inverse quantization module, an entropy encoder, etc. are included. At the encoder, the processing flow at the encoder may be implemented through the cooperation of these modules, and at the decoder, the processing flow at the decoder may be implemented through the cooperation of these modules.

In related arts, when a current block is a bidirectional block, after a first original motion vector and a second original motion vector of the current block are obtained, there is no reasonable solution to a problem of how to adjust the first original motion vector and the second original motion vector.

In the embodiments of the present disclosure, when a current block is a bidirectional block, considering a mirroring symmetry relationship between motion vectors from two different directions is usually present, redundancies may be further removed based on this characteristic. For example, a decoder-side motion vector refinement mode may be provided. In the decoder-side motion vector refinement mode, by use of prediction values obtained based on original motion vectors and local search at the decoder, fine refinement is made to motion vectors to obtain better motion vectors, so as to generate prediction values with a smaller distortion.

Illustratively, if it is determined to use a decoder-side motion vector refinement mode for a current block, for each sub-block of the current block, a first reference block corresponding to the sub-block may be determined according to a first original motion vector of the sub-block, and a second reference block corresponding to the sub-block may be determined according to a second original motion vector of the sub-block; the first original motion vector and the second original motion vector are adjusted according to first pixel values of the first reference block and second pixel values of the second reference block, so as to obtain a first target motion vector and a second target motion vector; and then prediction values of the sub-block may be determined according to the first target motion vector and the second target motion vector. In this way, the problems such as low prediction quality and prediction error and the like can be solved, and the coding performance and the coding efficiency can be improved.

The encoding and decoding method provided in the present disclosure will be described in detail as below in combination with several specific embodiments.

Embodiment 1: as shown in FIG. 2, a flowchart illustrating an encoding and decoding method according to an embodiment of the present disclosure is provided. The encoding and decoding method may be applied to a decoder or an encoder. The method may include the following steps.

At step 201, if the following conditions are all satisfied, it is determined to use a decoder-side motion vector refinement mode for a current block:
  control information allows the current block to enable the decoder-side motion vector refinement mode;
  a prediction mode of the current block is a regular merge mode; or, a prediction mode of the current block is a merge mode or a skip mode, and the prediction mode of the current block is not other modes except the regular merge mode;
  prediction values of the current block are obtained by use of a weighted sample prediction process on reference blocks of two reference pictures, one reference picture is displayed earlier than a current picture, the other reference picture is displayed later than the current picture, and the two reference pictures have a same distance from the current picture;
  the two reference pictures of the current block are same in weight;
  the two reference pictures of the current block both are short-term reference pictures;

the width, height and area of the current block are all in defined ranges; and the two reference pictures of the current block are identical in size to the current picture.

In a possible implementation, if any one of the following conditions is not satisfied, it is determined not to use a decoder-side motion vector refinement mode for a current block:

control information allows the current block to enable the decoder-side motion vector refinement mode;

a prediction mode of the current block is a regular merge mode; or, a prediction mode of the current block is a merge mode or a skip mode, and the prediction mode of the current block is not other modes except the regular merge mode;

prediction values of the current block are obtained by use of a weighted sample prediction process on reference blocks of two reference pictures, one reference picture is displayed earlier than a current picture, the other reference picture is displayed later than the current picture, and the two reference pictures have a same distance from the current picture;

the two reference pictures of the current block are same in weight;

the two reference pictures of the current block both are short-term reference pictures;

the width, height and area of the current block are all in defined ranges; and the two reference pictures of the current block are identical in size to the current picture.

In the above-mentioned embodiments, seven conditions are given, and then whether to use a decoder-side motion vector refinement mode for a current block is determined based on the seven conditions. In practical applications, some conditions also may be selected from the seven conditions, and then whether to use a decoder-side motion vector refinement mode for a current block is determined based on the selected conditions. For example, five conditions are selected from the seven conditions, which is not limited herein, for example, the selected five conditions may be any five conditions. If the selected five conditions are all satisfied, it is determined to use the decoder-side motion vector refinement mode for the current block; and if any one of the selected five conditions is not satisfied, it is determined not to use the decoder-side motion vector refinement mode for the current block. Of course, another number of conditions may also be selected from the seven conditions, which is not restricted herein.

In the above-mentioned embodiments, the merge mode or the skip mode includes: the regular merge mode, the sub-block merge mode, the MMVD mode, the CIIP mode, the TPM mode, and the GEO mode. The condition that the prediction mode of the current block is not other modes except the regular merge mode means that the prediction mode is not the sub-block merge mode, the MMVD mode, the CIIP mode, the TPM mode or the GEO mode, etc.

For example, when the prediction mode of the current block is the merge mode or the skip mode, the prediction mode of the current block is not the MMVD mode or the CIIP mode.

When it is determined that the prediction mode of the current block is the merge mode or the skip mode, and the prediction mode of the current block is not the MMVD mode, the CIIP mode, the sub-block merge mode, the TPM mode, or the CEO mode, it may be determined that the prediction mode of the current block is not other modes except the regular merge mode. In other words, by a process of elimination, it is determined that the prediction mode of the current block is the regular merge mode.

In the above-mentioned embodiments, the condition that the prediction values of the current block are obtained by use of a weighted sample prediction process on reference blocks of two reference pictures refers to that the current block adopts a bidirectional prediction mode, i.e., the prediction values of the current block are obtained by use of a weighted sample prediction process on reference blocks of two reference pictures.

In the above-mentioned embodiments, the current block may correspond to two motion information lists, which may be denoted as first motion information and second motion information, the first motion information includes a first reference picture and a first original motion vector, and the second motion information includes a second reference picture and a second original motion vector. The above-mentioned two reference pictures may be the first reference picture and the second reference picture. The condition that the two reference pictures are respectively displayed earlier than and displayed later than the current picture refers to that the first reference picture is displayed earlier than the current picture where the current block is, and the second reference picture is displayed later than the current picture. In some examples, the first reference picture may also be called a forward reference picture, and the forward reference picture is in a first list (e.g., list0); and the second reference picture may also be called a backward reference picture, and the backward reference picture is in a second list (e.g., list1).

In the above-mentioned embodiments, the condition that the width, height and area of the current block are all in defined ranges includes: the width is greater than or equal to a first threshold, the height is greater than or equal to a second threshold, and the area is greater than or equal to a third threshold; or, the width is greater than or equal to the first threshold, the height is greater than or equal to the second threshold, and the area is greater than a fourth threshold. In some examples, the third threshold may be greater than the fourth threshold. For example, the first threshold may be 8, the second threshold may be 8, the third threshold may be 128, and the fourth threshold may be 64. Of course, the above-mentioned values are just a few examples, which is not restricted herein.

In the above-mentioned embodiments, the condition that control information allows the current block to enable the decoder-side motion vector refinement mode may include but is not limited to: sequence-level control information (such as control information for multiple pictures) allows the current block to enable the decoder-side motion vector refinement mode; and/or, picture-level control information (such as control information for one picture) allows the current block to enable the decoder-side motion vector refinement mode.

At step 202, if it is determined to use the decoder-side motion vector refinement mode for the current block, motion compensation is performed on the current block.

In a possible implementation, if it is determined to use the decoder-side motion vector refinement mode for the current block, for each sub-block in at least one sub-block included in the current block: a first reference block corresponding to the sub-block is determined according to a first original motion vector of the sub-block, and a second reference block corresponding to the sub-block is determined according to a second original motion vector of the sub-block; according to first pixel values of the first reference block and second pixel values of the second reference block, the first original motion vector and the second original motion vector are adjusted so as to obtain a first target motion vector corresponding to the first original motion vector and a second target motion vector corresponding to the second original motion vector; and prediction values of the sub-block are determined according to the first target motion vector and the second target motion vector. After prediction values of each sub-block are obtained, prediction values of the current block may be obtained according to prediction values of each sub-block.

In some examples, the step that "the first reference block corresponding to the sub-block is determined according to the first original motion vector of the sub-block and the second reference block corresponding to the sub-block is determined according to the second original motion vector of the sub-block" may include but is not limited to the following:

based on the first original motion vector of the sub-block, the first reference block corresponding to the sub-block is determined from the first reference picture; and pixel values of pixel points in the first reference block is obtained by performing interpolation for pixel values of neighboring pixel points in the first reference block, or by copying the pixel values of the neighboring pixel points in the first reference block;

based on the second original motion vector of the sub-block, the second reference block corresponding to the sub-block is determined from the second reference picture; and pixel values of pixel points in the second reference block is obtained by performing interpolation for pixel values of neighboring pixel points in the second reference block, or by copying the pixel values of the neighboring pixel points in the second reference block.

In some examples, the size of the first reference block is identical to that of the second reference block, the width of the first reference block is determined based on the width of the sub-block and a search range, and the height of the first reference block is determined based on the height of the sub-block and a search range.

In some examples, for each sub-block included in the current block: according to the first pixel values of the first reference block corresponding to the sub-block and the second pixel values of the second reference block corresponding to the sub-block, the first original motion vector of the sub-block and the second original motion vector of the sub-block are adjusted so as to obtain the first target motion vector corresponding to the first original motion vector and the second target motion vector corresponding to the second original motion vector, i.e., the first target motion vector and second target motion vector of the sub-block.

In a possible implementation, with an initial motion vector as a center, part or all of motion vectors surrounding and including the initial motion vector may be selected, and the selected motion vectors are determined as candidate motion vectors, where the initial motion vector (may also be referred to as original motion vector) is the first original motion vector or the second original motion vector; then, according to first pixel values of the first reference block and second pixel values of the second reference block, a motion vector may be selected from the initial motion vector and the candidate motion vectors as an optimal motion vector; and then, the first original motion vector may be adjusted according to the optimal motion vector so as to obtain the first target motion vector corresponding to the first original motion vector, and the second original motion vector is adjusted according to the optimal motion vector so as to obtain the second target motion vector corresponding to the second original motion vector.

In some examples, the step that "the first original motion vector is adjusted according to the optimal motion vector so as to obtain the first target motion vector corresponding to the first original motion vector, and the second original motion vector is adjusted according to the optimal motion vector so as to obtain the second target motion vector corresponding to the second original motion vector" may include: determining a first integer-pixel motion vector refinement value, a second integer-pixel motion vector refinement value, a first fractional pixel motion vector refinement value and a second fractional pixel motion vector refinement value of the sub-block according to the optimal motion vector; adjusting the first original motion vector according to the first integer-pixel motion vector refinement value and the first fractional pixel motion vector refinement value so as to obtain the first target motion vector of the sub-block; and adjusting the second original motion vector according to the second integer-pixel motion vector refinement value and the second fractional pixel motion vector refinement value so as to obtain the second target motion vector of the sub-block.

In some examples, for each sub-block in at least one sub-block included in the current block: the prediction values of the sub-block may be determined according to the first target motion vector of the sub-block and the second target motion vector of the sub-block, and this process will not be described again.

In a possible implementation, if the optimal motion vector is the same as the initial motion vector, a third reference block corresponding to the sub-block may be determined from the first reference picture based on the first target motion vector of the sub-block; and a fourth reference block corresponding to the sub-block may be determined from the second reference picture based on the second target motion vector of the sub-block. Then, the prediction values of the sub-block may be obtained by performing weighting for pixel values of the third reference block and pixel values of the fourth reference block.

In another possible embodiment, if the optimal motion vector is different from the initial motion vector, a fifth reference block may be determined from the first reference picture, and a sixth reference block is obtained by extending the fifth reference block; and then, based on the first target motion vector of the sub-block, a third reference block corresponding to the sub-block is selected from the sixth reference block. Furthermore, a seventh reference block may be determined from the second reference picture, and an eighth reference block is obtained by extending the seventh reference block; and then, based on the second target motion vector of the sub-block, a fourth reference block corresponding to the sub-block is selected from the eighth reference block. Then, the prediction values of the sub-block are obtained by performing weighting for pixel values of the third reference block and pixel value(s) of the fourth reference block.

In the above-mentioned embodiments, obtaining the prediction values of the sub-block by performing weighting for the pixel values of the third reference block and the pixel values of the fourth reference block may include but is not limited to: obtaining the prediction values of the sub-block by performing a weighting process on the pixel values of the third reference block, a first weight corresponding to the pixel values of the third reference block, the pixel values of the fourth reference block, and a second weight corresponding to the pixel values of the fourth reference block; and in some examples, the first weight and the second weight may be same.

In some examples, after the prediction values of each sub-block are obtained, prediction values of the current block may be obtained by combining the prediction values of different sub-blocks, and there is no restriction on the process of determining the prediction values of the current block.

From the above technical solution, it may be seen that in the embodiments of the present disclosure, if it is determined to use the decoder-side motion vector refinement mode for the current block, a first target motion vector and a second target motion vector are obtained according to a first original motion vector and a second original motion vector; and then, prediction values are determined according to the first target motion vector and the second target motion vector, instead of according to the first original motion vector and the second original motion vector. In this way, problems such as low prediction quality and prediction error and the like are solved, and the encoding performance and the encoding efficiency can be improved.

Embodiment 2: based on the same conception as the above method, as shown in FIG. 3, a flowchart illustrating another encoding and decoding method according to the embodiments of the present disclosure is provided. The method may be applied to an encoder. The method may include the following steps.

At step 301, the encoder determines whether to use a decoder-side motion vector refinement mode for a current block. If yes, step 302 is performed, and if not, the decoder-side motion vector refinement mode provided by this present disclosure is not adopted, which is not limited for this specific processing.

In an example, if the encoder determines to use the decoder-side motion vector refinement mode for the current block, it indicates that the motion information of the current block is not accurate enough, therefore, the decoder-side motion vector refinement mode (i.e., the technical solution of this present disclosure) is used for the current block, and step 302 is performed.

If the encoder determines not to use the decoder-side motion vector refinement mode for the current block, it indicates that the motion information of the current block is accurate enough, therefore, the decoder-side motion vector refinement mode may not be used for the current block, and the decoder-side motion vector refinement mode proposed in this present disclosure is not adopted.

At step 302, for each sub-block in at least one sub-block included in the current block: the encoder determines a first reference block corresponding to the sub-block from the first reference picture according to a first original motion vector of the sub-block, and determines a second reference block corresponding to the sub-block from the second reference picture according to a second original motion vector of the sub-block. For the convenience of differentiation, pixel values of all pixel points in the first reference block are called first pixel values, and pixel values of all pixel points in the second reference block are called second pixel values.

In an example, if the current block is a bidirectional prediction block, each sub-block of the current block may have bidirectional motion information; the bidirectional motion information may include two reference pictures and two original motion vectors, and the bidirectional motion information may include the first reference picture, the first original motion vector, the second reference picture and the second original motion vector.

Based on the first original motion vector, the encoder determines a first reference block corresponding to the sub-block from the first reference picture, and the pixel values of all pixel points in the first reference block are called first pixel values. Based on the second original motion vector, the encoder determines a second reference block corresponding to the sub-block from the second reference picture, and pixel values of all pixel points in the second reference block are called second pixel values.

In an example, a distance between the first reference picture and a current picture which the current block is in is identical to a distance between the second reference picture and the current picture which the current block is in. For example, the first reference picture is the $1^{st}$ frame image, the current picture is the $5^{th}$ frame image, and the second reference picture is the $9^{th}$ frame image.

In an example, a mirroring symmetry relationship may exist between the first original motion vector and the second original motion vector, for example, the first original motion vector is (4, 4), and the second original motion vector is (−4, −4); and the first original motion vector is (2.5, 3.5), and the second original motion vector is (−2.5, −3.5). Of course, the foregoing is just an example, which is not restricted herein.

The manner of determining the first and second reference blocks may be referred to subsequent embodiments and will not be repeated herein.

At step 303, the encoder adjusts the first original motion vector according to first pixel values of the first reference block and second pixel values of the second reference block to obtain a first target motion vector of the sub-block; and adjusts the second original motion vector according to first pixel values of the first reference block and second pixel values of the second reference block to obtain a second target motion vector of the sub-block.

In an example, if the decoder-side motion vector refinement mode is used for the current block, the encoder may perform fine refinement to the first original motion vector and the second original motion vector through a local search method based on the first pixel values of the first reference block and the second pixel values of the second reference block so as to obtain a better first target motion vector and a better second target motion vector; and then, prediction values with a smaller distortion are generated by using the first target motion vector and the second target motion vector.

In an example, the current block may contain at least one sub-block, and if the current block contains one sub-block, the sub-block is the current block itself. For each sub-block of the current block, the sub-block may correspond to the first original motion vector and the second original motion vector, and after the first and second original motion vectors are adjusted, the sub-block may correspond to the first target motion vector and the second target motion vector.

In some examples, if the current block includes a sub-block A and a sub-block B, for the sub-block A, the sub-block A corresponds to a first original motion vector A1 and a second original motion vector A2, and after refinement, the sub-block A corresponds to a first target motion vector A3 and a second target motion vector A4; and for the sub-block B, the sub-block B corresponds to a first original motion vector B1 and a second original motion vector B2, and after refinement, the sub-block B corresponds to a first target motion vector B3 and a second target motion vector B4.

In some examples, the first original motion vector A1 corresponding to the sub-block A and the first original motion vector B1 corresponding to the sub-block B may be same, and both are the first original motion vectors of the current block; and the second original motion vector A2 corresponding to the sub-block A and the second original motion vector B2 corresponding to the sub-block B may be same, and both are the second original motion vectors of the current block.

Because the first original motion vector of each sub-block is adjusted respectively, the first target motion vector A3 corresponding to the sub-block A and the first target motion vector B3 corresponding to the sub-block B may be same or different.

Because the second original motion vector of each sub-block is adjusted respectively, the second target motion vector A4 corresponding to the sub-block A and the second target motion vector B4 corresponding to the sub-block B may be same or different.

The manner of adjusting the original motion vectors may be referred to subsequent embodiments and thus will not be described herein.

At step 304, the encoder determines prediction values of the sub-block according to the first target motion vector and the second target motion vector.

At step 305, the encoder determines prediction values of the current block according to the prediction values of each sub-block.

For example, if the current block includes a sub-block A and a sub-block B, the prediction values of the sub-block A may be determined by using the first target motion vector and second target motion vector of the sub-block A, and the prediction values of the sub-block B may be determined by using the first target motion vector and second target motion vector of the sub-block B. the prediction values of the sub-block A and the prediction values of the sub-block B are the prediction values of the current block.

In some examples, the encoder stores the first target motion vector and second target motion vector of each sub-block of the current block, or, stores the first original motion vector and original motion vector of each sub-block of the current block, or, stores the first original motion vector, the second original motion vector, the first target motion vector and the second target motion vector of each sub-block of the current block.

Figure 4:
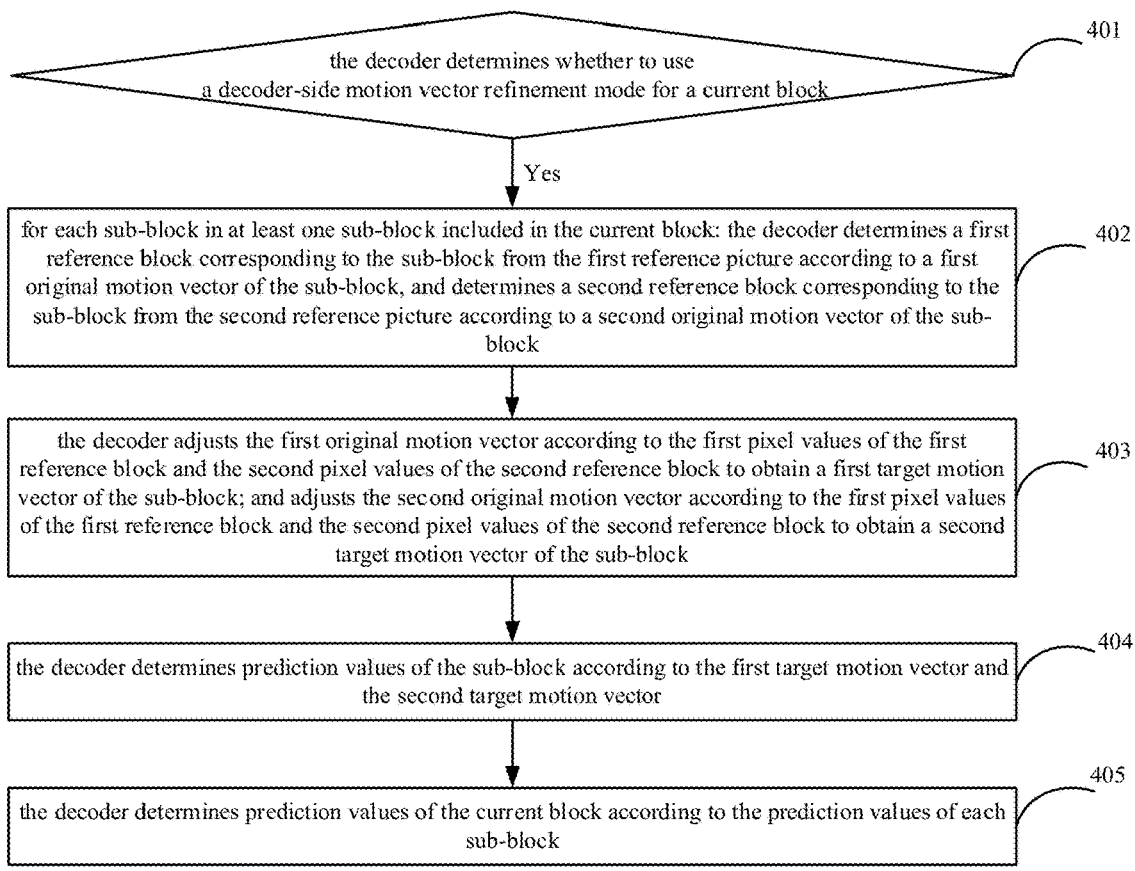
FIG. 4 is a flowchart illustrating an encoding and decoding method according to an embodiment of the present disclosure.

Embodiment 3: based on the same conception as the above method, as shown in FIG. 4, a flowchart illustrating another encoding and decoding method according to the embodiment of the present disclosure is provided. The method may be applied to a decoder, and may include the following steps.

At step 401, the decoder determines whether to use a decoder-side motion vector refinement mode for a current block. If yes, step 402 is performed, and if not, the decoder-side motion vector refinement mode provided by this present disclosure is not adopted, which is not limited for this specific processing.

In an example, if the decoder determines to use the decoder-side motion vector refinement mode for the current block, it indicates that the motion information of the current block is not accurate enough, therefore, the decoder-side motion vector refinement mode (i.e., the technical solution of this present disclosure) is used for the current block, and step 402 is performed.

If the decoder determines not to use the decoder-side motion vector refinement mode for the current block, it indicates that the motion information of the current block is accurate enough, therefore, the decoder-side motion vector refinement mode may not be used for the current block, and the decoder-side motion vector refinement mode proposed in this present disclosure is not adopted.

At step 402, for each sub-block in at least one sub-block included in the current block: the decoder determines a first reference block corresponding to the sub-block from the first reference picture according to a first original motion vector of the sub-block, and determines a second reference block corresponding to the sub-block from the second reference picture according to a second original motion vector of the sub-block. For the convenience of differentiation, pixel values of all pixel points in the first reference block are called first pixel values, and pixel values of all pixel points in the second reference block are called second pixel values.

At step 403, the decoder adjusts the first original motion vector according to the first pixel values of the first reference block and the second pixel values of the second reference block to obtain a first target motion vector of the sub-block; and adjusts the second original motion vector according to the first pixel values of the first reference block and the second pixel values of the second reference block to obtain a second target motion vector of the sub-block.

At step 404, the decoder determines prediction values of the sub-block according to the first target motion vector and the second target motion vector.

Step 405, the decoder determines prediction values of the current block according to the prediction values of each sub-block.

In some examples, the decoder stores the first target motion vector and the second target motion vector of each sub-block of the current block, or, stores the first original motion vector and original motion vector of each sub-block of the current block, or, stores the first original motion vector, the second original motion vector, the first target motion vector and the second target motion vector of each sub-block of the current block.

In some examples, steps 401 to 405 may be referred to steps 301 to 305, and will not be repeated here.

Embodiment 4: in the above-mentioned embodiments, about whether to use the decoder-side motion vector refinement mode for the current block, as described below.

In a possible implementation, the following enabling conditions may be given, of course, the following enabling conditions are only an example, and in practice, the following enabling conditions may be arbitrarily combined without restriction. For example, when all of the following enabling conditions are satisfied, it is determined to use the decoder-side motion vector refinement mode for the current block.

1. Control information allows the current block to enable the decoder-side motion vector refinement mode.

In some examples, the control information may include but is not limited to sequence-level control information and/or picture-level control information.

In a possible implementation, the sequence-level (such as multiple pictures) control information may include a control flag (such as sps_cur_tool_enabled_flag), and the picture-level (such as one picture) control information may include a control flag (such as pic_cur_tool_disabled_flag). When a value of sps_cur_tool_enabled_flag is a first value and a value of pic_cur_tool_disabled_flag is a second value, it indicates that the current block is allowed to enable the decoder-side motion vector refinement mode.

In some examples, sps_cur_tool_enabled_flag indicates whether all images in a sequence allow enabling the decoder-side motion vector refinement mode. pic_cur_tool_disabled_flag indicates whether each block in a current picture is not allowed to enable the decoder-side motion vector refinement mode. When a value of sps_cur_tool_enabled_flag is the first value, it indicates that all the images in the sequence allow enabling the decoder-side motion vector refinement mode. When a value of pic_cur_tool_disabled_flag is the second value, it indicates that each block in the current picture is allowed to enable the decoder-side motion vector refinement mode.

In some examples, when a value of sps_cur_tool_enabled_flag is the second value and/or a value of pic_cur_tool_disabled_flag is the first value, it indicates that the current block is not allowed to enable the decoder-side motion vector refinement mode, i.e., the control information does not allow the current block to enable the decoder-side motion vector refinement mode.

In another possible embodiment, the sequence-level (such as multiple pictures) control information may include a control flag (such as sps_cur_tool_disabled_flag), and the picture-level (such as one picture) control information may include a control flag (such as pic_cur_tool_disabled_flag). When a value of sps_cur_tool_disabled_flag is the second value and a value of pic_cur_tool_disabled_flag is the second value, it indicates that the current block is allowed to enable the decoder-side motion vector refinement mode.

In some examples, sps_cur_tool_disabled_flag indicates whether all pictures in a sequence are not allowed enabling the decoder-side motion vector refinement mode. pic_cur_tool_disabled_flag indicates whether each block in a current picture is not allowed to enable the decoder-side motion vector refinement mode. When a value of sps_cur_tool_disabled_flag is the second value, it indicates that all the pictures in the sequence are allowed enabling the decoder-side motion vector refinement mode. When a value of pic_cur_tool_disabled_flag is the second value, it indicates that each block in the current picture is allowed to enable the decoder-side motion vector refinement mode.

In some examples, when a value of sps_cur_tool_disabled_flag is the first value and/or a value of the pic_cur_tool_disabled_flag is the first value, it indicates that the current block is not allowed to enable the decoder-side motion vector refinement mode, i.e., the control information does not allow the current block to enable the decoder-side motion vector refinement mode.

In another possible embodiment, the sequence-level (such as multiple pictures) control information may include a control flag (such as sps_cur_tool_enabled_flag), and the picture-level (such as one picture) control information may include a control flag (such as pic_cur_tool_disabled_flag). When a value of sps_cur_tool_enabled_flag is the first value and a value of the pic_cur_tool_disabled_flag is the first value, it indicates that the current block is allowed to enable the decoder-side motion vector refinement mode.

In some examples, sps_cur_tool_enabled_flag indicates whether all pictures in a sequence is allowed enabling the decoder-side motion vector refinement mode. pic_cur_tool_disabled_flag indicates whether each block in a current picture is allowed to enable the decoder-side motion vector refinement mode. When a value of sps_cur_tool_enabled_flag is the first value, it indicates that all the pictures in the sequence is allowed enabling the decoder-side motion vector refinement mode. When a value of pic_cur_tool_enabled_flag is the first value, it indicates that each block in the current picture is allowed to enable the decoder-side motion vector refinement mode.

In some examples, when a value of sps_cur_tool_enabled_flag is the second value and/or a value of pic_cur_tool_enabled_flag is the second value, it indicates that the current block is not allowed to enable the decoder-side motion vector refinement mode, i.e., the control information does not allow the current block to enable the decoder-side motion vector refinement mode.

In another possible embodiment, the sequence-level (such as multiple pictures) control information may include a control flag (such as sps_cur_tool_disabled_flag), and the picture-level (such as a one picture) control information may include a control flag (such as pic_cur_tool_enabled_flag). When a value of sps_cur_tool_disabled_flag is the second value and a value of the pic_cur_tool_enabled_flag is the first value, it indicates that the current block is allowed to enable the decoder-side motion vector refinement mode.

In some examples, sps_cur_tool_disabled_flag indicates whether all pictures in a sequence is not allowed enabling the decoder-side motion vector refinement mode. The pic_cur_tool_disabled_flag indicates whether each block in a current picture is allowed to enable the decoder-side motion vector refinement mode. When a value of sps_cur_tool_disabled_flag is the second value, it indicates that all the pictures in the sequence is not allowed enabling the decoder-side motion vector refinement mode. When a value of pic_cur_tool_enabled_flag is the first value, it indicates that each block in the current picture is allowed to enable the decoder-side motion vector refinement mode.

In some examples, when a value of sps_cur_tool_disabled_flag is the first value and/or a value of the pic_cur_tool_enabled_flag is the second value, it indicates that the current block is not allowed to enable the decoder-side motion vector refinement mode, i.e., the control information does not allow the current block to enable the decoder-side motion vector refinement mode.

In the above-mentioned embodiments, the first value may be 1 and the second value may be 0, or, the first value may be 0 and the second value may be 1. Of course, the foregoing is only an example, which is not limited herein.

In some examples, a frame or a picture in this text is equivalent to an image, for example, a current picture represents a current image, and a reference picture represents a reference image.

2. A prediction mode of the current block is a regular merge mode; or, a prediction mode of the current block is a merge mode or a skip mode, and the prediction mode of the current block is not other modes except the regular merge mode.

In a possible implementation, if the prediction mode (such as an inter prediction mode) of the current block is a merge mode or a skip mode, and the prediction mode of the current block is not other modes (such as a sub-block merge mode, a MMVD mode, a CIIP mode, a TPM mode, a GEO mode, etc.) except the regular merge mode, it indicates that the current block is allowed to enable the decoder-side motion vector refinement mode. For example, when the prediction mode of the current block is the merge mode or skip mode and the prediction mode of the current block is not the MMVD mode nor the CIIP mode, it indicates that the current block is allowed to enable the decoder-side motion vector refinement mode.

In some examples, if the prediction mode of the current block is not the merge mode, and the prediction mode of the current block is also not the skip mode, it indicates that the current block is not allowed to enable the decoder-side motion vector refinement mode, i.e., the enabling condition 2 is not satisfied.

In some examples, if the prediction mode of the current block is the merge mode or the skip mode, and the prediction mode of the current block is other modes (such as the sub-block merge mode, the MMVD mode, the CIIP mode, the TPM mode, and the GEO mode, etc.) except the regular merge mode, it indicates that the current block is not allowed to enable the decoder-side motion vector refinement mode, i.e., the enabling condition 2 is not satisfied.

In another possible embodiment, if the prediction mode of the current block is the regular merge mode (regular merge mode), it indicates that the current block is allowed to use the decoder-side motion vector refinement mode. In some examples, the regular merge mode refers to that: one piece of motion information in a motion information list of the current block is reused as the motion information of the current block to generate the prediction values of the current block.

In some examples, if the prediction mode of the current block is not the regular merge mode, it indicates that the current block is not allowed to use the decoder-side motion vector refinement mode, i.e., the enabling condition 2 is not satisfied.

3. the prediction values of the current block are obtained by use of a weighted sample prediction process on reference blocks of two reference pictures, one reference picture is displayed earlier than a current picture, the other reference picture displayed later than the current picture, and the two reference pictures have a same distance from the current picture; where obtaining the prediction values of the current block by use of a weighted sample prediction process on reference blocks of two reference pictures refers to that: the current block adopts a bidirectional prediction mode, i.e., the prediction values of the current block are obtained by use of a weighted sample prediction process on reference blocks of two reference pictures. In some examples, the current block may correspond to two motion information lists, which may be respectively denoted as first motion information and second motion information, the first motion information includes a first reference picture and a first original motion vector, and the second motion information includes a second reference picture and a second original motion vector. The condition that one reference picture is displayed earlier than a current picture, the other reference picture is displayed later than the current picture means that: the first reference picture is displayed earlier than the current picture which the current block is in, and the second reference picture is displayed later than the current picture.

In a possible implementation, if the current block has two lists (such as list0 and list1) of motion information (such as two reference pictures and two motion vectors), and one reference picture is displayed earlier than a current picture, the other reference picture is displayed later than the current picture, and the two reference pictures have a same distance from the current picture, it indicates that the current block is allowed to use the decoder-side motion vector refinement mode.

The condition "one reference picture is displayed earlier than a current picture, the other reference picture is displayed later than the current picture, and the two reference pictures have same distance from the current picture" may be expressed below by a relative relationship among a display sequence number POC_Cur of the current picture, a display sequence number POC_0 of the reference picture of list0 and a display sequence number POC_1 of the reference picture of list1: (POC_0−POC_Cur) is exactly equal to (POC_Cur−POC_0).

In some examples, the current block adopts bidirectional prediction, and the two reference pictures corresponding to the current block are from different directions, that is, one reference picture corresponding to the current block is displayed earlier than the current picture, and the other reference picture corresponding to the current block is displayed later than the current picture.

In some examples, the above-mentioned condition "the current block has two reference pictures, one reference picture is displayed earlier than a current picture, the other reference picture is displayed later than the current picture, and the two reference pictures have a same distance from the current picture" may be expressed below.

In some examples, if the current block has only one reference picture, it indicates that the current block is not allowed to use the decoder-side motion vector refinement mode, i.e., the enabling condition 3 is not satisfied. In some examples, if the current block has two reference pictures and the two reference pictures are both are displayed earlier than a current picture, it indicates that the current block is not allowed to use the decoder-side motion vector refinement mode, i.e., the enabling condition 3 is not satisfied. In some examples, if the current block has two reference pictures and the two reference pictures are both displayed later than a current picture, it indicates that the current block is not allowed to use the decoder-side motion vector refinement mode, i.e., the enabling condition 3 is not satisfied. In some examples, if the current block has two reference pictures, and one reference picture is displayed earlier than a current picture, the other reference picture is displayed later than the current picture, but the two reference pictures have different distances from the current picture, it indicates that the current block is not allowed to use the decoder-side motion vector refinement mode, i.e., the enabling condition 3 is not satisfied.

4. The two reference pictures of the current block are same in weight.

In a possible implementation, if the weights of the two reference pictures of the current block are same, it indicates that the current block is allowed to use a decoder-side motion vector refinement mode. In some examples, if the picture-level weights of two reference pictures are same, for example, a luma (luminance) weight (luma_weight_l0_flag [refIdxL0]) of a reference picture refIdxL0 may be equal to a luma weight (luma_weight_l1_flag[refIdxL1]) of a reference picture refIdxL1, it indicates that the weights of the two reference pictures of the current block are same. In some examples, if the block-level weights of the two reference pictures are same, for example, an index BcwIdx[xCb][yCb] of the block-level weight value of the current block is 0, it indicates that the weights of the two reference pictures of the current block are same. In some examples, if the picture-level weights of the two reference pictures are same, and the block-level weights of the two reference pictures are same, it indicates that the weights of the two reference pictures of the current block are same.

In some examples, if the weights of the two reference pictures of the current block are different, it indicates that the current block is not allowed to use the decoder-side motion vector refinement mode, i.e., the enabling condition 4 is not satisfied. For example, if the picture-level weights of the two reference pictures are different, it indicates that the weights of the two reference pictures of the current block are different. In some examples, if the block-level weights of the two reference pictures are different, it indicates that the weights of the two reference pictures of the current block are different. In some examples, if the picture-level weights of the two reference pictures are different and the block-level weights of the two reference pictures are different, it indicates that the weights of the two reference pictures of the current block are different.

In some examples, the weights of the two reference pictures of the current block refer to weights adopted in bidirectional weighted compensation. For example, for each sub-block of the current block, after two sets of prediction values of the sub-block are obtained (the obtaining process is referred to subsequent embodiments), final prediction values of the sub-block are obtained by performing weighting for the two sets of prediction values. When the weighting process is performed on the two sets of prediction values, the weights corresponding to the two sets of prediction values are the weights of the two reference pictures of the current block, that is, the weights corresponding to the two sets of prediction values are same.

5. The two reference pictures of the current block both are short-term reference pictures. In other words, neither of the two reference pictures of the current block is a long-term reference picture.

In a possible implementation, if the two reference pictures of the current block both are short-term reference pictures, it indicates that the current block is allowed to use the decoder-side motion vector refinement mode. The short-term reference picture refers to a reference picture close to the current picture, and usually is an actual picture.

In some examples, if both of the two reference pictures of the current block are not short-term reference pictures, it indicates that the current block is not allowed to use the decoder-side motion vector refinement mode, that is, the enabling condition 5 is not satisfied. In some examples, if one reference picture of the current block is not a short-term reference picture, it indicates that the current block is not allowed to use the decoder-side motion vector refinement mode, that is, the enabling condition 5 is not satisfied. In some examples, if neither of the two reference pictures of the current block is a short-term reference picture, it indicates that the current block is not allowed to use the decoder-side motion vector refinement mode, that is, the enabling condition 5 is not satisfied.

In another possible embodiment, if the two reference pictures of the current block are not long-term reference pictures, it indicates that the current block is allowed to use the decoder-side motion vector refinement mode. The display sequence number POC of the long-term reference picture has no actual meaning. The long-term reference picture refers to a reference picture far away from a current picture, or a picture synthesized by several actual pictures.

In some examples, if one reference picture of the current block is a long-term reference picture, it indicates that the current block is not allowed to use the decoder-side motion vector refinement mode, that is, the enabling condition 5 is not satisfied. In some examples, if the two reference pictures of the current block are both long-term reference pictures, it indicates that the current block is not allowed to use the decoder-side motion vector refinement mode, that is, the enabling condition 5 is not satisfied.

6. The width, height and area of the current block are all in defined ranges.

In a possible implementation, if the width cbWidth of the current block is greater than or equal to a first threshold (e.g., 8), and the height cbHeight of the current block is greater than or equal to a second threshold (e.g., 8), and the area (cbHeight*cbWidth) of the current block is greater than or equal to a third threshold (e.g., 128), it indicates that the current block is allowed to use the decoder-side motion vector refinement mode.

In some examples, if the width cbWidth of the current block is less than the first threshold, it indicates that the current block is not allowed to use the decoder-side motion vector refinement mode, that is, the enabling condition 6 is not satisfied. In some examples, if the height cbHeight of the current block is less than the second threshold, it indicates that the current block is not allowed to use the decoder-side motion vector refinement mode, that is, the enabling condition 6 is not satisfied. In some examples, if the area of the current block is less than the third threshold, it indicates that the current block is not allowed to use the decoder-side motion vector refinement mode, that is, the enabling condition 6 is not satisfied.

In another possible embodiment, if the width cbWidth of the current block is greater than or equal to the first threshold (e.g., 8), the height cbHeight of the current block is greater than or equal to the second threshold (e.g., 8), and the area (cbHeight*cbWidth) of the current block is greater than a fourth threshold (e.g., 64), it indicates that the current block is allowed to use the decoder-side motion vector refinement mode.

In some examples, if the width cbWidth of the current block is less than the first threshold, it indicates that the current block is not allowed to use the decoder-side motion vector refinement mode, that is, the enabling condition 6 is not satisfied. In some examples, if the height cbHeight of the current block is less than the second threshold, it indicates that the current block is not allowed to use the decoder-side motion vector refinement mode, that is, the enabling condition 6 is not satisfied. In some examples, if the area of the current block is less than or equal to the fourth threshold, it indicates that the current block is not allowed to use the decoder-side motion vector refinement mode, that is, the enabling condition 6 is not satisfied.

7. The two reference pictures of the current block are identical in size to the current picture.

In a possible implementation, if the size of the reference picture of list0 is identical to that of the current picture, for example, the width of the reference picture of list0 is identical to that of the current picture, and the height of the reference picture of list0 is identical to that of the current picture, and if the size of the reference picture of list1 is identical to that of the current picture, for example, the width of the reference picture of list1 is identical to that of the current picture, and the height of the reference picture of list1 is identical to that of the current picture, it indicates that the current block is allowed to use the decoder-side motion vector refinement mode.

In some examples, if the size of at least one of the two reference pictures of the current block is different from that of the current picture, it indicates that the current block is not allowed to use the decoder-side motion vector refinement mode, that is, the enabling condition 7 is not satisfied. For example, if the width of the reference picture of list0 is different from that of the current picture, it indicates that the current block is not allowed to use the decoder-side motion vector refinement mode; or, if the height of the reference picture of list0 is different from that of the current picture, it indicates that the current block is not allowed to use the decoder-side motion vector refinement mode; or, if the width of the reference picture of list1 is different from that of the current picture, it indicates that the current block is not allowed to use the decoder-side motion vector refinement mode; or, if the height of the reference picture of list1 is different from that of the current picture, it indicates that the current block is not allowed to use the decoder-side motion vector refinement mode.

Embodiment 5: in the above-mentioned embodiments, for each sub-block of the current block, a first reference block corresponding to the sub-block is determined from a first reference picture according to a first original motion vector of the sub-block, where the pixel values of all pixel points in the first reference block are called first pixel values; and a second reference block corresponding to the sub-block is determined from a second reference picture according to a second original motion vector of the sub-block, where the pixel values of all pixel points in the second reference block are called second pixel values. Detailed descriptions will be made below to the above.

The first pixel values of pixel points in the first reference block are obtained by performing interpolation for pixel values of neighboring pixel points in the first reference block, or by copying the pixel values of the neighboring pixel points in the first reference block.

The second pixel values of pixel points in the second reference block are obtained by performing interpolation for pixel values of neighboring pixel points in the second reference block, or by copying the pixel values of the neighboring pixel points in the second reference block.

The size of the first reference block is identical to that of the second reference block, the width of the first reference block/second reference block is determined based on the width of the sub-block and a search range, and the height of the first reference block/second reference block is determined based on the height of the sub-block and a search range.

For example, for each dx*dy sub-block of the current block (e.g., a 16*16 sub-block, or a smaller sub-block, or a larger sub-block, where the size of the smaller sub-block may be 8*8, and the size of the larger sub-block may be 32*32, which is not restricted herein, in some examples, the sub-block and the current block may be identical in size, that is, the sub-block is the current block. For example, when the size of the current block is 8*16, if the current block includes only one sub-block, the size of the sub-block is 8*16. The size of the sub-block may be different from that of the current block, for example, when the size of the current block is 8*32, the current block may include two 8*16 sub-blocks, of course, the foregoing is just an example, for convenience, descriptions will be made below with an example of a 16*16 sub-block), a width of the sub-block is dx, a height of the sub-block is dy, a first original motion vector is denoted as MV0, and a second original motion vector is denoted as MV1.

An integer-pixel block with an area of (dx+filtersize−1)* (dy+filtersize−1) is obtained from a corresponding position of the first original motion vector MV0 in the first reference picture, and the integer-pixel block may be denoted as an integer-pixel block A.

An integer-pixel block with an area of (dx+filtersize−1)* (dy+filtersize−1) is obtained from a corresponding position of the second original motion vector MV1 in the second reference picture, and the integer-pixel block may be denoted as an integer-pixel block B.

In a possible implementation, based on the integer-pixel block A with an area of (dx+filtersize−1)*(dy+filtersize−1), an initial reference pixel block with a size of (dx+2*IterNum)*(dy+2*IterNum) may be obtained by means of bilinear interpolation, and the initial reference pixel block may be denoted as a first reference block. Based on the integer-pixel block B with an area of (dx+filtersize−1)*(dy+filtersize−1), an initial reference pixel block with a size of (dx+2*IterNum)*(dy+2*IterNum) may be obtained by means of bilinear interpolation, and the initial reference pixel block may be denoted as a second reference block.

In another possible embodiment, based on the integer-pixel block A with an area of (dx+filtersize−1)*(dy+filtersize−1), an initial reference pixel block with a size of (dx+2*IterNum)*(dy+2*IterNum) is obtained by directly copying (without interpolation), and the initial reference pixel block is denoted as a first reference block. Based on the integer-pixel block B with an area of (dx+filtersize−1)*(dy+filtersize−1), an initial reference pixel block with a size of (dx+2*IterNum)*(dy+2*IterNum) is obtained by directly copying, and the initial reference pixel block is denoted as a second reference block.

In some examples, for a luma component (because in a subsequent search process, a cost value is calculated based on the luma component to reduce complexity), based on the integer-pixel blocks (such as the integer-pixel block A and the integer-pixel block B) with an area of (dx+filtersize−1)* (dy+filtersize−1), initial reference pixel blocks with a size of (dx+2*IterNum)*(dy+2*IterNum) may be obtained, and the initial reference pixel blocks are the first reference block (e.g. Pred_Inter0) and the second reference block (e.g. Pred_Inter1).

In an example, filtersize may be a number of taps of an interpolation filter, for example, 8, which is not limited herein.

In an example, obtaining the first reference block/the second reference block by means of bilinear interpolation refers to that: the pixel values of pixel points in the first reference block/the second reference block are obtained by performing interpolation for pixel values of neighboring pixel points in the first reference block/the second reference block. Obtaining the first reference block/the second reference block by copying refers to that: the pixel values of pixel points in the first reference block/the second reference block are obtained by copying pixel values of neighboring pixel points in the first reference block/the second reference block.

As shown in the above-mentioned embodiments, the area of the first reference block is (dx+2*IterNum)*(dy+2*IterNum) and the area of the second reference block is (dx+2*IterNum)*(dy+2*IterNum), for example, the width of the first reference block/the second reference block is dx+2*IterNum and the height of the first reference block/the second reference block is dy+2*IterNum, where dx refers to the width of the sub-block, dy refers to the height of the sub-block, and IterNum may be a search range SR, for example, a number of iterations in subsequent embodiments. IterNum may be maximum horizontal/vertical component interpolation of the target motion vector(s) and the original motion vector(s), for example, IterNum may be 2, etc.

Figure 5:
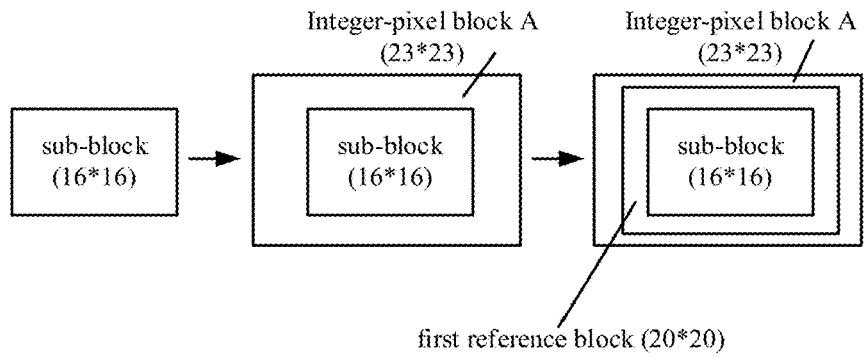
FIG. 5 is a schematic diagram of obtaining a reference block according to an embodiment of the present disclosure.

As shown in FIG. 5, for a 16*16 sub-block, an integer-pixel block A with an area of 23 (i.e., 16+8−1)*23 is obtained based on the corresponding position of the first original motion vector MV0 in the first reference picture. Based on the integer-pixel block A with an area of 23*23, a first reference block with a size of 20 (i.e., 16+2*2)*20 may be obtained by means of bilinear interpolation. Similarly, for a 16*16 sub-block, an integer-pixel block B with an area of 23*23 may be obtained based on the corresponding position of the second original motion vector MV1 in the second reference picture. Based on the integer-pixel block B with an area of 23*23, a second reference block with a size of 20*20 is obtained.

The first reference block and the second reference block are applied to motion vector refinement in subsequent processes.

Embodiment 6: in the above-mentioned embodiments, for each sub-block of the current block, according to the first pixel values of the first reference block and the second pixel values of the second reference block, the first original motion vector is adjusted to obtain a first target motion vector of the sub-block; and according to the first pixel values of the first reference block and the second pixel values of the second reference block, the second original motion vector is adjusted to obtain a second target motion vector of the sub-block. The process of refinement of the original motion vectors is introduced with a processing procedure of one sub-block (such as each sub-block of dx*dy of the current block) as an example.

At step a1, the first original motion vector or the second original motion vector is determined as a central motion vector.

For example, if the first original motion vector is (4, 4) and the second original motion vector is (−4, −4), the first original motion vector (4, 4) or the second original motion vector (−4, −4) is determined as the central motion vector.

For convenience, descriptions will be made below with an example in which the first original motion vector (4, 4) is determined as the central motion vector. A process of determining the second original motion vector (−4, −4) as the central motion vector is similar to the process of determining the first original motion vector (4, 4) as the central motion vector, and will not be repeated herein.

At step a2, an edge motion vector corresponding to the central motion vector is determined.

Figure 6:
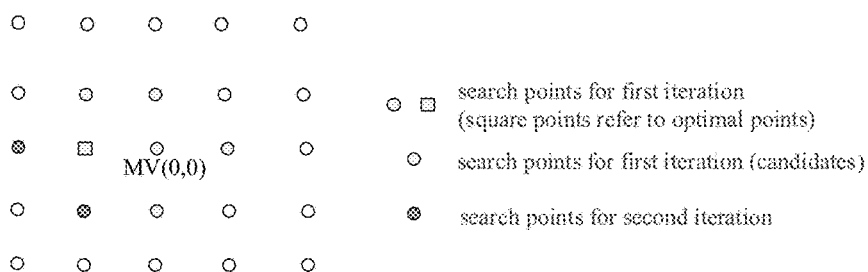
FIG. 6 is a schematic diagram illustrating iteration of a motion vector according to an embodiment of the present disclosure.

For example, a central motion vector (x, y) may be offset by S in different directions so as to obtain an edge motion vector (x, y+S), an edge motion vector (x, y−S), an edge motion vector (x+S, y), an edge motion vector (x−S, y) and an edge motion vector (x+right, y+down) in different directions. In some examples, right may be S or −S, down may be S or −S. The manner of determining right and down may be referred to subsequent embodiments. As shown in FIG. 6, if the central motion vector (x, y) is taken as a center, that is., the central motion vector is (0, 0), with an example in which S is 1 and both right and down are 1, edge motion vectors corresponding to the central motion vector (0, 0) include: an edge motion vector (0, 1), an edge motion vector (0, −1), an edge motion vector (1, 0), an edge motion vector (−1, 0), and an edge motion vector (1, 1).

At step a3, according to the first pixel values of the first reference block and the second pixel values of the second reference block, a first cost value corresponding to the central motion vector and a second cost value corresponding to each edge motion vector are obtained.

For example, a sub-reference block A1 corresponding to the central motion vector (0, 0) is copied from the first reference block, and the sub-reference block A1 is a sub-reference block of the central motion vector (0, 0) in the first reference block. A sub-reference block B1 corresponding to the central motion vector (0, 0) is copied from the second reference block, and the sub-reference block B1 is a sub-reference block of the central motion vector (0, 0) in the second reference block. Then, a cost value 1 corresponding to the central motion vector (0, 0) is obtained by using first pixel values of the sub-reference block A1 and second pixel values of the sub-reference block B1. The determination manner of the cost value may be referred to subsequent embodiments.

A sub-reference block A2 corresponding to the edge motion vector (0, 1) is copied from the first reference block, and the sub-reference block A2 is a sub-reference block of the edge motion vector (0, 1) in the first reference block. A sub-reference block B2 corresponding to a symmetric motion vector (0, −1) of the edge motion vector (0, 1) is copied from the second reference block, and the sub-reference block B2 is a sub-reference block of the symmetric motion vector (0, −1) in the second reference block. A cost value 2 corresponding to the edge motion vector (0, 1) is obtained by first pixel values of the sub-reference block A2 and second pixel values of the sub-reference block B2. The determination manner of the cost value may be referred to subsequent embodiments.

Based on the determination manner of the cost value 2 corresponding to the edge motion vector (0, 1), a cost value 3 corresponding to the edge motion vector (0, −1), a cost value 4 corresponding to the edge motion vector (1, 0), a cost value 5 corresponding to the edge motion vector (−1, 0), and a cost value 6 corresponding to the edge motion vector (1, 1) may be determined, which will not be repeated herein.

At step a4, according to the first cost value and the second cost value, a motion vector is selected from the central motion vector and the edge motion vectors as an optimal motion vector. For example, a motion vector with a minimum cost value may be taken as the optimal motion vector.

For example, if the cost value 2 corresponding to the edge motion vector (0, 1) is minimum, the edge motion vector (0, 1) corresponding to the cost value 2 may be taken as the optimal motion vector. Of course, the foregoing is just an example, which is not restricted here.

At step a5, determining on whether an ending condition is satisfied is performed. If not, the optimal motion vector may be determined as the central motion vector, and go back to step a2. If yes, step a6 may be performed.

In an example, if a number of iterations/a search range reaches a threshold, the ending condition is satisfied; and if the number of iterations/the search range does not reach the threshold, the ending condition is not satisfied. For example, it is assumed that SR is 2, i.e., the threshold is 2. If the number of iterations/the search range has reached 2, that is, steps a2 to a4 have been performed twice, the ending condition is satisfied. Otherwise, the ending condition is not satisfied.

In another example, after one motion vector is selected as an optimal motion vector from the central motion vector and the edge motion vectors, if the central motion vector is selected as the optimal motion vector, the ending condition may be satisfied.

At step a6, a first integer-pixel motion vector refinement value (configured to adjust the first original motion vector) and a second integer-pixel motion vector refinement value (configured to adjust the second original motion vector) are determined according to the optimal motion vector.

In an example, the first integer-pixel motion vector refinement value may be determined according to the optimal motion vector and the first original motion vector, and the second integer-pixel motion vector refinement value may be determined according to the first integer-pixel motion vector refinement value. In some examples, the second integer-pixel motion vector refinement value and the first integer-pixel motion vector refinement value may be symmetrical.

For example, in a first iteration process, an optimal motion vector is an edge motion vector (0, 1); by centering on the edge motion vector (0, 1), a second iteration is performed, and in the second iteration process, the optimal motion vector is the edge motion vector (0, 1). If an iteration process is completed till now, the first integer-pixel motion vector refinement value is (0, 2), i.e., a sum of the edge motion vector (0, 1) and the edge motion vector (0, 1). Based on this, if the first original motion vector is (4, 4), in the first iteration process, the optimal motion vector is the edge motion vector (0, 1), i.e., the optimal motion vector may correspond to an optimal motion vector (4, 5). The second iteration is performed by centering on the edge motion vector (0, 1), and in the second iteration process, the optimal motion vector is the edge motion vector (0, 1), i.e., the optimal motion vector may correspond to an optimal motion vector (4, 6). To sum up, the first integer-pixel motion vector refinement value is determined according to the optimal motion vector (4, 6) and the first original motion vector (4, 4), and the first integer-pixel motion vector refinement value is a difference between the optimal motion vector (4, 6) and the first original motion vector (4, 4), that is, the first integer-pixel motion vector refinement value is (0, 2). The second integer-pixel motion vector refinement value is determined according to the first integer-pixel motion vector refinement value (0, 2), and the second integer-pixel motion vector refinement value may be (0, −2), i.e., a symmetric value of (0, 2).

At step a7, a first fractional pixel motion vector refinement value (configured to adjust the first original motion vector) and a second fractional pixel motion vector refinement value (configured to adjust the second original motion vector) are determined according to the optimal motion vector.

In an example, the first fractional pixel motion vector refinement value may be determined according to the cost value for the optimal motion vector and the cost value for the edge motion vector corresponding to the optimal motion vector, and then, the second fractional pixel motion vector refinement value may be determined according to the first fractional pixel motion vector refinement value. For example, $x_0 = N*(E(-1, 0) - E(1, 0))/(E(-1, 0) + E(1, 0) - 2*E(0, 0))$, $y_0 = N*(E(0, -1) - E(0, 1))/(E(0, -1) + E(0, 1) - 2*E(0, 0))$, where for motion vector pixel accuracies such as ½, ¼, ⅛ and ¹⁄₁₆, N is 1, 2, 4 and 8. Then, $(x_0, y_0)$ is assigned to deltaMv, SPMV is equal to deltaMv/2N, if the current motion vector pixel accuracy is ¹⁄₁₆, SPMV is $(x_0/16, y_0/16)$.

In the above formula, SPMV may represent the first fractional pixel motion vector refinement value, and N may be related to the motion vector pixel accuracy, for example, the motion vector pixel accuracy may be ½, and N is 1; the motion vector pixel accuracy is ¼, and N is 2; the motion vector pixel accuracy is ⅛, and N is 4; and the motion vector pixel accuracy is ¹⁄₁₆, and N is 8.

In the above formula, E(0, 0) represents a cost value of the optimal motion vector; E(−1, 0) is a cost value of the edge motion vector (−1, 0) of the optimal motion vector (0, 0), with the optimal motion vector as center; E(1, 0) is a cost value of the edge motion vector (1, 0) of the optimal motion vector (0, 0), with the optimal motion vector as center; E(0, −1) is a cost value of the edge motion vector (0, −1) of the optimal motion vector (0, 0) with the optimal motion vector as center; and E(0, 1) is a cost value of the edge motion vector (0, 1) of the optimal motion vector (0, 0) with the optimal motion vector as center. For the cost value of each motion vector, the determination manner may be referred to the above-mentioned example, and will not be repeated herein.

After the first fractional pixel motion vector refinement value is determined in the above manner, the second fractional pixel motion vector refinement value may be determined according to the first fractional pixel motion vector refinement value, and the second first fractional pixel motion vector refinement value is a symmetric value of the first fractional pixel motion vector refinement value. For example, if the first fractional pixel motion vector refinement value is (1, 0), the second fractional pixel motion vector refinement value may be (−1, 0), i.e., the symmetric value of the first fractional pixel motion vector refinement value (1, 0).

At step a8, according to the first integer-pixel motion vector refinement value and/or the first fractional pixel motion vector refinement value, the first original motion vector is adjusted to obtain a first target motion vector. For example, the first target motion vector is obtained by adding up the first original motion vector, the first integer-pixel motion vector refinement value, and the first fractional pixel motion vector refinement value.

At step a9, according to the second integer-pixel motion vector refinement value and/or the second fractional pixel motion vector refinement value, the second original motion vector is adjusted to obtain a second target motion vector. For example, the second target motion vector is obtained by adding up the second original motion vector, the second integer-pixel motion vector refinement value, and the second fractional pixel motion vector refinement value.

Embodiment 7, in the above-mentioned embodiments, for each sub-block of the current block, according to the first pixel values of the first reference block and the second pixel values of the second reference block, the first original motion vector is adjusted to obtain a first target motion vector of the sub-block; and according to the first pixel values of the first reference block and the second pixel values of the second reference block, the second original motion vector is adjusted to obtain a second target motion vector of the sub-block. The process of refinement of the original motion vectors is introduced with a processing procedure of one sub-block (such as each sub-block of dx*dy of the current block) as an example.

In this embodiment, the first original motion vector is denoted as Org_MV0 and the second original motion vector is denoted as Org_MV1. After the first original motion vector Org_MV0 is adjusted, the obtained first target motion vector is denoted as Refined_MV0; and after the second original motion vector Org_MV1 is adjusted, the obtained second target motion vector is denoted as Refined_MV1.

At step b1, SR iterations are performed to obtain an integer-pixel offset of an optimal integer-pixel MV point, the integer-pixel offset is denoted as IntegerDeltaMV, and IntegerDeltaMV is the first integer-pixel motion vector refinement value in the above-mentioned embodiments. For example, IntegerDeltaMV is initialized to (0, 0) firstly, and the following process is performed in each iteration.

At step b11, deltaMV is set to (0, 0). If a first iteration is carried out, based on a reference pixel of the first original motion vector in the first reference block, a prediction sample block A1 (i.e., a dx*dy block at the center of the first reference block) is obtained by copying; and based on a reference pixel of the second original motion vector in the second reference block, a prediction sample block B1 (i.e., a dx*dy block at the center of the second reference block) is obtained by copying. An initial cost value (the initial cost value is a SAD (sum of abstract distortion) based on the prediction sample block A1 and the prediction sample block B1, and the determination manner thereof is referred to subsequent embodiments) is obtained based on the prediction sample block A1 and the prediction sample block B1. If the initial cost value is less than dx*dy (dx and dy are the width and height of the current sub-block), a subsequent search process is directly skipped, to perform step b2, and notZeroCost is set to false.

At step b12, as shown in FIG. 6, by centering on the above initial point, five offsets MV (the five offsets MV are all called MVOffset) are obtained in a sequence of {Mv(0, 1), Mv(0, −1), Mv(1, 0), Mv(−1, 0), Mv(right, down)}, and then the calculation and comparison process of the cost values of the five offsets MV is performed. For example, based on a certain MVOffset (such as Mv(0, 1), etc.), in the first reference block and the second reference block, two prediction sample blocks (such as a dx*dy block with a central position offset MVOffset in the first reference block and a dx*dy block with a central position offset −MVOffset (opposite to MVOffset) in the second reference block) are obtained through the MVOffset, and a downsampling SAD of the two prediction sample blocks is calculated as a cost value of the MVOffset.

Then, the MVOffset with the minimum cost value is retained, and the MVOffset with the minimum cost value is updated to the value of the deltaMV, and the MVOffset with the minimum cost value is taken as a new central offset point of the next iteration.

The value of the IntegerDeltaMV is updated based on the deltaMV, and the updated IntegerDeltaMV is a sum of the IntegerDeltaMV before being updated and the deltaMV, i.e., the current IntegerDeltaMV plus the deltaMV.

At step b13, after iteration, if the optimal MV is still the initial MV (i.e., not the MVOffset) or the minimum cost value is 0, a next iterative search process is not carried out, step b2 is performed, and notZeroCost is set to false.

Otherwise, if the number of iterations reaches SR, step b2 is performed; if the number of iterations does not reach SR, the next iterative search process may be performed by centering on the optimal MV, that is, go back to step b11.

After the iterative search process is completed, the value of the IntegerDeltaMV is obtained, i.e., the final value of the IntegerDeltaMV is the first integer-pixel motion vector refinement value, and denoted as IntegerDeltaMV below.

At step b2, an optimal fractional pixel offset MV denoted as SPMV may be obtained by centering on the optimal integer-pixel MV point in step b1, where the SPMV is the first fractional pixel motion vector refinement value in the above embodiment.

For example, the SPMV may be initialized to (0, 0) firstly, and then, the following process is performed.

At step b21, when notZeroCost is not false and deltaMV is (0, 0), the subsequent processing (i.e., SPMV needs to be obtained) may be carried out; otherwise, the IntegerDeltaMV may be directly utilized to adjust the original motion vectors, instead of utilizing the IntegerDeltaMV and the SPMV to adjust the original motion vectors.

AT step b22, E(x, y) is represented as a cost value (a cost value calculated in step b1) corresponding to MV of the optimal MV point offset (x, y) obtained in step b1. Based on E(x, y) of five points (i.e., central, upper, lower, left and right points), the offset $(x_0, y_0)$ of a point with the minimum E(x, y) may be obtained as follows: $x_0 = N*(E(-1, 0)-E(1, 0))/(E(-1, 0)+E(1, 0)-2*E(0, 0))$, $y_0 = N*(E(0, -1)-E(0, 1))/(E(0, -1)+E(0, 1)-2*E(0, 0))$. In an example, for the motion vector pixel accuracies as ½, ¼, ⅛, and 1/16, N is 1, 2, 4, and 8. Then, $(x_0, y_0)$ may be assigned to deltaMv, SPMV=deltaMv/2N, so if the current motion vector pixel accuracy is 1/16, SPMV may be $(x_0/16, y_0/16)$.

If E(−1, 0)=E(0, 0), it is offset by half a pixel in a horizontal leftward direction (deltaMv[0]=−N).

If E(1, 0)=E(0, 0), it is offset by half a pixel in a horizontal rightward direction (deltaMv[0]=N).

If E(0, −1)=E(0, 0), it is offset by half a pixel in a vertical upward direction (deltaMv[1]=−N).

If E(0, 1)=E(0, 0), it is offset by half a pixel in a vertical downward direction (deltaMv[1]=N).

Based on the above processing, the value of the SPMV, i.e., the first fractional pixel motion vector refinement value, may be obtained.

At step b3, based on the integer-pixel offset IntegerDeltaMV in step b1 and the fractional pixel offset SPMV in step b2, an optimal offset MV is obtained, where the optimal offset MV may be denoted as BestMVoffset. Furthermore, BestMVoffset=IntegerDeltaMV+SPMV. The target motion vectors of two directions may be obtained based on BestMVoffset: Refined_MV0=Org_MV0+BestMVoffset; and Refined_MV1=Org_MV1−BestMVoffset.

Obviously, BestMVoffset=IntegerDeltaMV+SPMV, i.e., a sum of the first integer-pixel motion vector refinement value and the first fractional pixel motion vector refinement value. Furthermore, −IntegerDeltaMV is a symmetric value of IntegerDeltaMV, i.e., the second integer-pixel motion vector refinement value; and −SPMV is a symmetric value of SPMV, i.e., the second fractional pixel motion vector refinement value, therefore, −BestMVoffset=(−IntegerDeltaMV)+(−SPMV), that is, a sum of the second integer-pixel motion vector refinement value and the second fractional pixel motion vector refinement value.

Embodiment 8: in an example, for adjusting the first original motion vector Org_MV0 and the second original motion vector Org_MV1 to the first target motion vector Refined_MV0 and the second target motion vector Refined_MV1, the implementation of embodiment 8 may be carried out as in Embodiment 7, except that: "if the initial cost value is less than dx*dy, the subsequent search process is directly skipped" in step b11 is removed, in other words, even if the initial cost value is less than dx*dy, the subsequent search process will not be directly skipped, but continued, that is, step b12 needs to be performed.

Embodiment 9: for adjusting the first original motion vector Org_MV0 and the second original motion vector Org_MV1 to the first target motion vector Refined_MV0 and the second target motion vector Refined_MV1, the implementation of embodiment 9 can be carried out as in Embodiment 7, except that: "if the initial cost value is less than dx*dy, the subsequent search process will be directly skipped" in step b11 is removed, in other words, even if the initial cost value is less than dx*dy, the subsequent search process will not be directly skipped, but continued, that is, step b12 needs to be performed. "If the optimal MV is still the initial MV (i.e., not MVOffset) or the minimum cost value is 0, the next iterative search process will not be carried out" in step b13 is removed, that is to say, even if the optimal MV is still the initial MV or the minimum cost is 0, the next iterative search process may also be carried out.

Embodiment 10: in an example, for adjusting the first original motion vector Org_MV0 and the second original motion vector Org_MV1 to the first target motion vector Refined_MV0 and the second target motion vector Refined_MV1, the implementation of embodiment 10 can be carried out as in Embodiment 7, except that: processes relating to "notZeroCost" are removed, in other words, in steps b11 and b13, the value of notZeroCost is not set and stored. In step b21, a fractional pixel offset calculation process (i.e., step b22) may be carried out as long as deltaMV is (0, 0), instead of only when notZeroCost is not false and deltaMV is (0, 0).

Embodiment 11: in an example, for adjusting the first original motion vector Org_MV0 and the second original motion vector Org_MV1 to the first target motion vector Refined_MV0 and the second target motion vector Refined_MV1, the implementation of embodiment 11 can be carried out as in Embodiment 7, except that: "only when notZeroCost is not false and deltaMV is (0, 0), the subsequent processing is carried out; otherwise, IntegerDeltaMV is directly utilized to adjust the original motion vectors" in step b21 is modified to "the subsequent processing is performed only when notZeroCost is not false and the cost values of four points spaced apart by one integer-pixel at the upper, lower, left and right sides of a current optimal integer-pixel have been calculated in step b1, otherwise, IntegerDeltaMV is directly utilized to adjust the original motion vectors". In an example, the "subsequent processing" refers to the fractional pixel offset calculation process in step b22.

In an example, in the fractional pixel offset calculation process in step b22, the cost values of four points spaced apart by one integer-pixel on the upper, lower, left and right sides of the optimal integer-pixel need to be used, therefore, "the cost values of four points spaced apart by one integer-pixel on the upper, lower, left and right sides of the optimal integer-pixel have been calculated" in step b1 may be a requisite condition.

Embodiment 12: for adjusting the first original motion vector Org_MV0 and the second original motion vector Org_MV1 to the first target motion vector Refined_MV0 and the second target motion vector Refined_MV1, the implementation of embodiment 12 can be carried out as in embodiment 7, except that: "the subsequent processing is performed only when notZeroCost is not false and deltaMV is (0, 0), otherwise, IntegerDeltaMV is directly utilized to adjust the original motion vector" in step b21 is modified to "the subsequent processing (i.e., the fractional pixel offset calculation process) is performed only when the cost values of four points spaced apart by one integer-pixel on the upper, lower, left and right sides of the current optimal integer-pixel have been calculated in step b1, otherwise, IntegerDeltaMV is utilized to adjust the original motion vector".

Embodiment 13: for adjusting the first original motion vector Org_MV0 and the second original motion vector Org_MV1 to the first target motion vector Refined_MV0 and the second target motion vector Refined_MV1, the implementation of embodiment 13 can be carried out as in embodiment 7, except that: "the subsequent processing is performed only when notZeroCost is not false and deltaMV is (0, 0), otherwise, IntegerDeltaMV is directly utilized to adjust the original motion vector" in step b21 is modified to "the subsequent processing (i.e., the fractional pixel offset calculation process in step b22) is performed if the cost values of four points spaced apart by one integer-pixel on the upper, lower, left and right sides of the current optimal integer-pixel have been calculated in step b1, otherwise, step b23 is performed.

At step b23, a current optimal integer-pixel point MV_inter_org is set to an integer-pixel point MV_inter_nearest around which the cost values of four points spaced apart by one integer-pixel on the upper, lower, left and right sides of the integer-pixel have been calculated in step b1and which is nearest to the MV_inter_org. Then, with the MV_inter_nearest as center, the fractional pixel offset calculation process in step b22 is performed, that is to say, the SPMV is obtained with MV_inter_nearest as center. For example, if all of the cost values of the four points spaced apart by one integer-pixel on the upper, lower, left and right sides of the current optimal integer-pixel point are not obtained in step b1, an integer-pixel point MV_inter_nearest is selected from around the optimal integer-pixel point MV_inter_org, and the cost values of four points spaced apart by one integer-pixel on the upper, lower, left and right sides of the integer-pixel point MV_inter_nearest have been calculated in step b1.

Then, the integer-pixel point MV_inter_nearest may be taken as the current optimal integer-pixel point, and the SPMV may be obtained by centering on the integer-pixel point MV_inter_nearest. The specific acquisition manner may be referred to step b22. When the SPMV is obtained by centering on the integer-pixel point MV_inter_nearest, reference may be made to step b22; when $x_0$ and $y_0$ are calculated, $x_0$ and $y_0$ may be limited to the range of [−2N, 2N]. If $x_0/y_0$ is greater than 2N, $x_0/y_0$ may be assigned to 2N; and if $x_0/y_0$ is less than −2N, $x_0/y_0$ may be assigned to −2N. For the motion vector pixel accuracies such as ½, ¼, ⅛, and 1/16, N is 1, 2, 4, and 8.

Embodiment 14: in the above-mentioned embodiments, edge motion vectors corresponding to a central motion vector need to be determined. If a central motion vector (x, y) is offset with S in different directions, an edge motion vector (x, y+S), an edge motion vector (x, y−S), an edge motion vector (x+S, y), an edge motion vector (x−S, y) and an edge motion vector (x+right, y+down) in different directions are obtained in sequence. Or, if the central motion vector (x, y) is offset with S in different directions, an edge motion vector (x, y−S), an edge motion vector (x, y+S), an edge motion vector (x−S, y), an edge motion vector (x+S, y) and an edge motion vector (x+right, y+down) in different directions are obtained in sequence. For example, if (x, y) is (0, 0) and S is 1, five edge motion vectors may be obtained in a sequence of (0, 1), (0, −1), (1, 0), (−1, 0) and (right, down); or, five edge motion vectors may be obtained in a sequence of (0, −1), (0, 1), (−1, 0), (1, 0) and (right, down).

Embodiment 15: In the above-mentioned embodiments, a default value of the edge motion vector (x+right, y+down) is (x−S, y−S). If the cost value of the edge motion vector (x+S, y) is less than that of the edge motion vector (x−S, y), right is S (modified from −S to S); and if the cost value of the edge motion vector (x, y+S) is less than that of the edge motion vector (x, y−S), down is S (modified from −S to S). Or, if the cost value of the edge motion vector (x+S, y) is less than or equal to that of the edge motion vector (x−S, y), right is S (modified from −S to S); and if the cost value of the edge motion vector (x, y+S) is less than or equal to that of the edge motion vector (x, y−S), down is S (modified from −S to S).

Five edge motion vectors are obtained in a sequence of (0, 1), (0, −1), (1, 0), (−1, 0), (right, down), where a default value of (right, down) is (−1, −1). If the cost value of the edge motion vector (1, 0) is less than that of the edge motion vector (−1, 0), right is 1; and if the cost value of the edge motion vector (0, 1) is less than that of the edge motion vector (0, −1), down is 1. Or, if the cost value of the edge motion vector (1, 0) is less than or equal to that of the edge motion vector (−1, 0), right is 1; and if the cost value of the edge motion vector (0, 1) is less than or equal to that of the edge motion vector (0, −1), down is 1. For example, five edge motion vectors are obtained in a sequence of (0, −1), (0, 1), (−1, 0), (1, 0), (right, down), where a default value of (right, down) is (−1, −1). If the cost value of the edge motion vector (1, 0) is less than that of the edge motion vector (−1, 0), right is 1; and if the cost value of the edge motion vector (0, 1) is less than that of the edge motion vector (0, −1), down is 1. Or, if the cost value of the edge motion vector (1, 0) is less than or equal to that of the edge motion vector (−1, 0), right is 1; and if the cost value of the edge motion vector (0, 1) is less than or equal to that of the edge motion vector (0, −1), down is 1.

Embodiment 16, in the above-mentioned embodiments, for each sub-block of the current block, according to the first pixel values of the first reference block and the second pixel values of the second reference block, the first original motion vector is adjusted to obtain a first target motion vector of the sub-block; and according to the first pixel values of the first reference block and the second pixel values of the second reference block, the second original motion vector is adjusted to obtain a second target motion vector of the sub-block. The process of refinement of the original motion vectors is introduced with a processing procedure of one sub-block (such as each sub-block with a size of dx*dy of the current block) as an example.

At step c1, by centering on an initial motion vector, part or all of motion vectors surrounding and including the initial motion vector are selected as candidate motion vectors. In some examples, the initial motion vector may be the first original motion vector or the second original motion vector. For example, by centering on the first original motion vector, part or all of motion vectors surrounding and including the first original motion vector may be selected as candidate motion vectors, and this selection manner may be referred to subsequent embodiments. Alternatively, by centering on the second original motion vector, part or all of motion vectors surrounding and including the second original motion vector may be selected as candidate motion vectors, and this selection manner may be referred to subsequent embodiments. To facilitate the description of the technical solutions provided by the present disclosure, in subsequent embodiments, taking that the first original motion vector is taken as center as an example to describe, that is, the initial motion vector is the first original motion vector.

In some examples, by centering on the initial motion vector, part or all of (2*SR+1)*(2*SR+1) motion vectors surrounding and including the initial motion vector are selected, and the selected motion vectors are determined as candidate motion vectors; where, SR refers to a search range. When part or all of the (2*SR+1)*(2*SR+1) motion vectors surrounding and including the initial motion vector are selected and then are determined as candidate motion vectors, a search sequence of the motion vectors may include left-to-right, and top-to-bottom.

When SR is 2, all of 25 motion vectors surrounding and including the initial motion vector are selected, and then the selected motion vectors are determined as candidate motion vectors; and the search order of the motion vectors is as follows: {Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; or, {Mv(0, 0), Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}.

When SR is 2, part of 21 motion vectors surrounding and including the initial motion vector is selected, and the selected motion vectors are determined as candidate motion vectors; and the search sequence of the motion vectors is as follows: {Mv(−1, −2), Mv(0, −2), Mv(1, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−1, 2), Mv(0, 2), Mv(1, 2)}; or, {Mv(0, 0), Mv(−1, −2), Mv(0, −2), Mv(1, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−1, 2), Mv(0, 2), Mv(1, 2)}.

At step c2, according to the first pixel values of the first reference block and the second pixel values of the second reference block, a third cost value corresponding to the first original motion vector (i.e., the initial motion vector) and a fourth cost value corresponding to each candidate motion vector are obtained.

For example, a sub-reference block A1 corresponding to the first original motion vector may be copied from the first reference block, and the sub-reference block A1 may be a sub-reference block for the first original motion vector in the first reference block. Then, a sub-reference block B1 corresponding to the second original motion vector may be copied from the second reference block, and the sub-reference block B1 is a sub-reference block for the second original motion vector in the second reference block. Then, the third cost value corresponding to the first original motion vector may be obtained by first pixel values of the sub-reference block A1 and second pixel values of the sub-reference block B1. For each candidate motion vector, a sub-reference block A2 corresponding to the candidate motion vector may be copied from the first reference block, and the sub-reference block A2 is a sub-reference block for the candidate motion vector in the first reference block. Then, a sub-reference block B2 corresponding to a symmetric motion vector of the candidate motion vector may be copied from the second reference block, and the sub-reference block B2 is a sub-reference block for a symmetric motion vector in the second reference block. The fourth cost value corresponding to the candidate motion vector is obtained by first pixel values of the sub-reference block A2 and second pixel values of the sub-reference block B2.

At step c3, according to the third cost value and the fourth cost value, a motion vector is selected from the first original motion vector and the candidate motion vectors, and the selected motion vector is determined as an optimal motion vector. For example, one motion vector with a minimum cost value (such as the first original motion vector, or any candidate motion vector) may be taken as the optimal motion vector.

At step c4, a first integer-pixel motion vector refinement value (configured to adjust the first original motion vector) and a second integer-pixel motion vector refinement value (configured to adjust the second original motion vector) are determined according to the optimal motion vector. For example, the first integer-pixel motion vector refinement value is determined according to the optimal motion vector and the first original motion vector, and the second integer-pixel motion vector refinement value is determined according to the first integer-pixel motion vector refinement value, where, the second integer-pixel motion vector refinement value and the first integer-pixel motion vector refinement value are symmetrical.

For example, if the optimal motion vector is (4, 6) and the first original motion vector is (4, 4), a first integer-pixel motion vector refinement value is determined according to the optimal motion vector (4, 6) and the first original motion vector (4, 4), and the first integer-pixel motion vector refinement value is a difference between the optimal motion vector (4, 6) and the original motion vector (4, 4), i.e., the first integer-pixel motion vector refinement value is (0, 2). Then, a second integer-pixel motion vector refinement value is determined according to the first integer-pixel motion vector refinement value (0, 2), and the second integer-pixel motion vector refinement value may be (0, −2), i.e., a symmetric value of (0, 2).

At step c5, a first fractional pixel motion vector refinement value (configured to adjust the first original motion vector) and a second fractional pixel motion vector refinement value (configured to adjust the second original motion vector) are determined according to the optimal motion vector. For example, the first fractional pixel motion vector refinement value is determined according to a cost value for the optimal motion vector and a cost value for the edge motion vector which is corresponding to the optimal motion vector, and then the second fractional pixel motion vector refinement value is determined according to the first fractional pixel motion vector refinement value.

For example, $x_0=N*(E(-1, 0)-E(1, 0))/(E(-1, 0)+E(1, 0)-2*E(0, 0))$, $y_0=N*(E(0, -1)-E(0, 1))/(E(0, -1)+E(0, 1)-2*E(0, 0))$, for the motion vector pixel accuracies such as ½, ¼, ⅛ and 1/16, N is 1, 2, 4 and 8. Then, $(x_0, y_0)$ is assigned to deltaMv, SPMV=deltaMv/2N, and if the current motion vector pixel accuracy is 1/16, SPMV is $(x_0/16, y_0/16)$. SPMV is the first fractional pixel motion vector refinement value. $E(0, 0)$ represents the cost value of the optimal motion vector; $E(-1, 0)$ is the cost value of the edge motion vector $(-1, 0)$ of the optimal motion vector $(0, 0)$ with the optimal motion vector as a center; $E(1, 0)$ is the cost value of the edge motion vector $(1, 0)$ of the optimal motion vector $(0, 0)$ with the optimal motion vector as a center; $E(0, -1)$ is the cost value of the edge motion vector $(0, -1)$ of the optimal motion vector $(0, 0)$ with the optimal motion vector as a center; and $E(0, 1)$ is the cost value of the edge motion vector $(0, 1)$ of the optimal motion vector $(0, 0)$ with the optimal motion vector as a center. For the cost value of each motion vector, the determination manner may be referred to the above-mentioned embodiments. After the first fractional pixel motion vector refinement value is determined in the above manner, the second fractional pixel motion vector refinement value may be determined according to the first fractional pixel motion vector refinement value, and the second first fractional pixel motion vector refinement value is a symmetric value of the first fractional pixel motion vector refinement value. For example, if the first fractional pixel motion vector refinement value is (1, 0), the second fractional pixel motion vector refinement value is (−1, 0), i.e., a symmetric value of (1, 0).

At step c6, according to the first integer-pixel motion vector refinement value and/or the first fractional pixel motion vector refinement value, the first original motion vector is adjusted to obtain a first target motion vector corresponding to the first original motion vector. For example, the first target motion vector is obtained by adding up the first original motion vector, the first integer-pixel motion vector refinement value and the first fractional pixel motion vector refinement value together.

At step c7, according to the second integer-pixel motion vector refinement value and/or the second fractional pixel motion vector refinement value, the second original motion vector is adjusted to obtain a second target motion vector corresponding to the second original motion vector. For example, the second target motion vector is obtained by adding up the second original motion vector, the second integer-pixel motion vector refinement value and the second fractional pixel motion vector refinement value together.

Embodiment 17, in the above-mentioned embodiments, for each sub-block of the current block, according to the first pixel values of the first reference block and the second pixel values of the second reference block, the first original motion vector is adjusted to obtain a first target motion vector of the sub-block; and according to the first pixel values of the first reference block and the second pixel values of the second reference block, the second original motion vector is adjusted to obtain a second target motion vector of the sub-block. The process of refinement of the original motion vectors is introduced with a processing procedure of one sub-block (such as each sub-block with a size of dx*dy of the current block) as an example.

The first original motion vector may be denoted as Org_MV0, the second original motion vector may be denoted as Org_MV1, the first target motion vector may be denoted as Refined_MV0, and the second target motion vector may be denoted as Refined_MV1.

At step d1, by centering on the first original motion vector, part or all of motion vectors are selected from $(2*SR+1)*(2*SR+1)$ points surrounding and including the first original motion vector. For example, if SR=2, part or all of motion vectors are selected from 25 points surrounding and including the first original motion vector, and the selected motion vectors are taken as candidate motion vectors. A cost value of the first original motion vector is determined, and a cost value of each candidate motion vector is determined. The motion vector with a minimum cost value is regarded as an optimal motion vector. Compared with step b1 in the above-mentioned embodiments, an iteration process is not required in step d1, that is, all candidate motion vectors to be processed may be selected at one time, rather than selected by firstly selecting part of motion vectors in a first iteration process and then selecting the other part of motion vectors in a second iteration process. Based on this, because all candidate motion vectors to be processed can be selected at one time, these candidate motion vectors may be processed in parallel to obtain the cost value of each candidate motion vector. Therefore, the computation complexity may be reduced, and the encoding performance may be improved.

At step d2, a value of IntegerDeltaMV is determined according to the optimal motion vector, and a final value of IntegerDeltaMV is the first integer-pixel motion vector refinement value. This determination manner will not be described again since it is already described in the above-mentioned embodiments.

At step d3, an optimal fractional pixel offset MV is obtained with the optimal motion vector as center, the optimal fractional pixel offset MV is denoted as SPMV, and the value of the SPMV is the first fractional pixel motion vector refinement value.

The implementation of step d3 may be referred to the above step b2 and will not be repeated herein.

At step d4, BestMVoffset is obtained based on IntegerDeltaMV and SPMV. For example, BestMVoffset= IntegerDeltaMV+SPMV. Then, target motion vectors may be obtained based on BestMVoffset: Refined_MV0=Org_MV0+BestMVoffset; and Refined_MV1=Org_MV1-BestMVoffset.

Embodiment 18: for adjusting the first original motion vector Org_MV0 and the second original motion vector Org_MV1 to the first target motion vector Refined_MV0 and the second target motion vector Refined_MV1, the implementation of embodiment 18 can be carried out as in embodiments 16 and 17. In this embodiment, by centering on the original motion vector, all of motion vectors are selected from a total of $(2*SR+1)*(2*SR+1)$ points surrounding and including the original motion vector. For example, if SR=2, all motion vectors are selected from 25 points surrounding and including the original motion vector, then the cost values of these motion vectors are determined, and the cost value of each motion vector is determined. The motion vector with a minimum cost value is taken as an optimal motion vector.

Embodiment 19: for adjusting the first original motion vector Org_MV0 and the second original motion vector Org_MV1 to the first target motion vector Refined_MV0 and the second target motion vector Refined_MV1, the implementation of embodiment 19 can be carried out as in embodiments 16 and 17. In this embodiment, because all candidate motion vectors to be processed are selected at one time, these candidate motion vectors may be processed in parallel to obtain the cost value of each candidate motion vector, thereby reducing the computational complexity and improving the encoding performance. In this embodiment, by centering on the original motion vector, some motion vectors with offsets not exceeding the range of SR are selected from a total of (2*SR+1)*(2*SR+1) points surrounding and including the original motion vector.

For example, N (N is greater than or equal to 1, less than or equal to (2*SR+1)*(2*SR+1)) candidate points are selected from (2*SR+1)*(2*SR+1) points including the original motion vector. Then, the cost values of the motion vectors corresponding to the N points are determined. In some examples, the cost values of the N points may be scanned in a certain sequence to select a motion vector with a minimum cost value as the optimal motion vector. If the cost values are equal, a candidate point ranked top is selected in priority. In some examples, the determination manner of the cost value may be that: the cost value is determined according to a downsampling SAD of two sets of prediction values obtained based on the candidate motion vector.

Figure 7A:
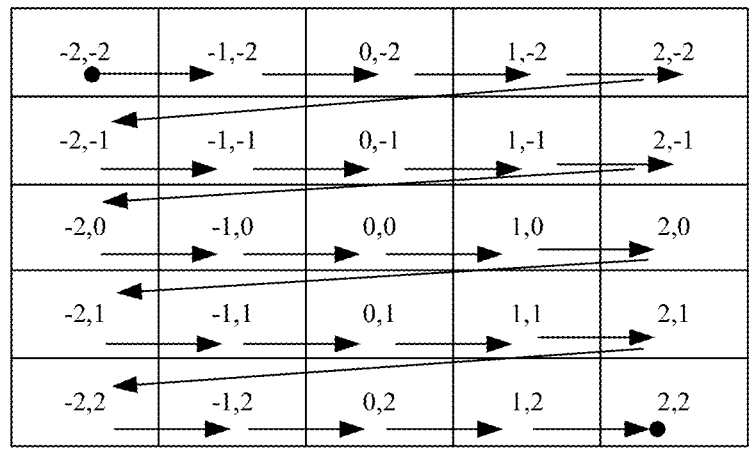
FIGS. 7A to 7G shows sequence schematic diagrams of candidate points according to an embodiment of the present disclosure.
Figure 7B:
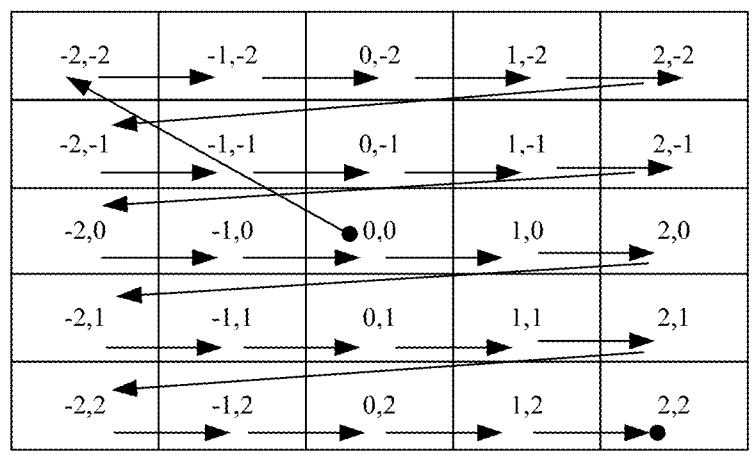

In one example, if SR=2, there may be 25 candidate points, and these candidate points may be arranged in a sequence of from left to right and from top to bottom. As shown in FIG. 7A, the sequence of these candidate points may be: {Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; or, as shown in FIG. 7B, the sequence of these candidate points may be: {Mv(0, 0), Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}.

Cost values corresponding to the motion vectors of the 25 points are determined, and scanned in the above-mentioned sequence so as to obtain a motion vector with a minimum cost value as an optimal offset MV, and then an integer-pixel motion vector refinement value and a fractional pixel motion vector refinement value may be determined by the optimal offset MV. The determination manner be referred to the above-mentioned embodiments, and thus will not be repeated herein.

Figure 7C:
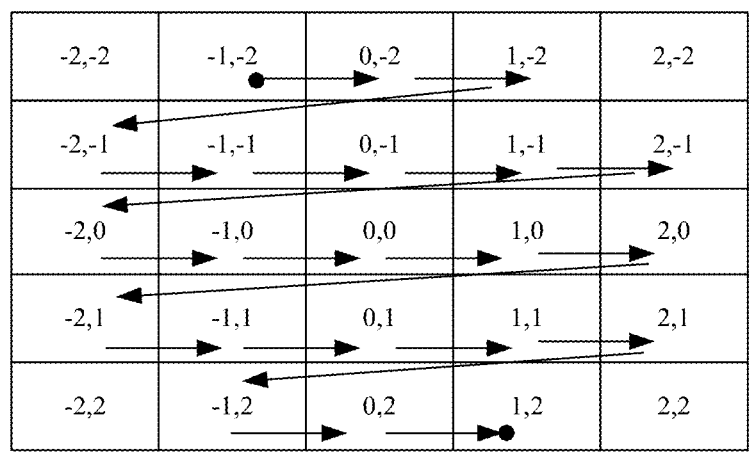
Figure 7D:
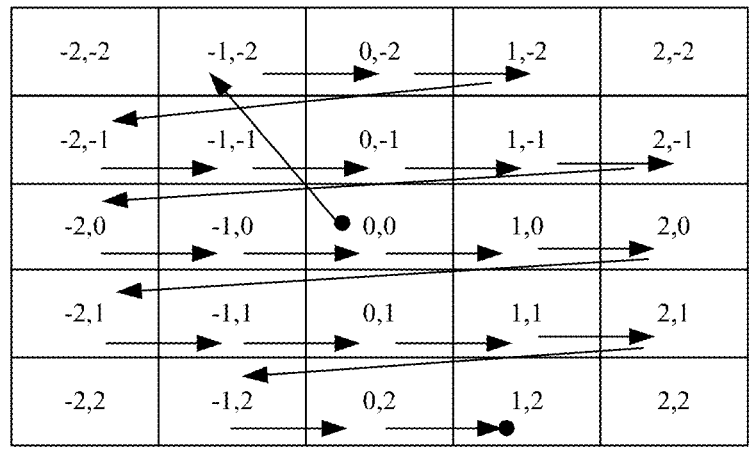

In another example, if SR=2, there may be 21 candidate points, and these candidate points may be arranged in a sequence of from left to right, and from top to bottom. As shown in FIG. 7C, the sequence of these candidate points may be: {Mv(−1, −2), Mv(0, −2), Mv(1, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2,0), Mv(−2, 1), Mv(−1, 1), Mv(0, 1), Mv(1, 1), Mv(2, 1), Mv(−1, 2), Mv(0, 2), Mv(1, 2)}; or, as shown in FIG. 7D, the sequence of these candidate points may be: {Mv(0, 0), Mv(−1, −2), Mv(0, −2), Mv(1, −2), Mv(−2, −1), Mv(−1, −1), Mv(0, −1), Mv(1, −1), Mv(2, −1), Mv(−2,0), Mv(−1, 0), Mv(0, 0), Mv(1, 0), Mv(2,0), Mv(−2, 1), Mv(−1, 1), Mv(0, 1), Mv(1, 1), Mv(2, 1), Mv(−1, 2), Mv(0, 2), Mv(1, 2)}.

Cost values corresponding to the motion vectors of the 21 points are determined, and scanned in the above-mentioned sequence so as to obtain a motion vector with a minimum cost value as an optimal offset MV, then an integer-pixel motion vector refinement value and a fractional pixel motion vector refinement value may be determined by the optimal offset MV. The determination manner may be referred to the above-mentioned embodiments, and thus will not be repeated herein.

Figure 7E:
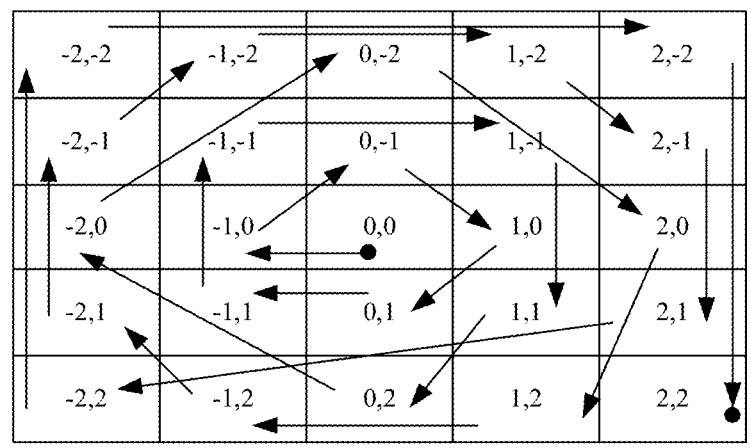

In another example, if SR=2, there may be 25 candidate points, and these candidate points are arranged with the motion vector (0, 0) as a center, in an ascending sequence of distances from the center to the candidate points. As shown in FIG. 7E, the sequence of these candidate points may be: {Mv(0, 0), Mv(−1, 0), Mv(0, −1), Mv(1, 0), Mv(0, 1), Mv(−1, 1), Mv(−1, −1), Mv(1, −1), Mv(1, 1), Mv(0, 2), Mv(−2, 0), Mv(0, −2), Mv(2, 0), Mv(1, 2), Mv(−1, 2), Mv(−2, 1), Mv(−2, −1), Mv(−1, −2), Mv(1, −2), Mv(2, −1), Mv(2, 1), Mv(−2, 2), Mv(−2, −2), Mv(2, −2), Mv(2, 2)}. Cost values corresponding to the motion vectors of the 25 points are determined, and scanned in the above-mentioned sequence so as to obtain a motion vector with a minimum cost value as an optimal offset MV, then an integer-pixel motion vector refinement value and a fractional pixel motion vector refinement value may be determined by the optimal offset MV. The determination manner may be referred to the above-mentioned embodiments, and thus will not be repeated herein.

Figure 7F:
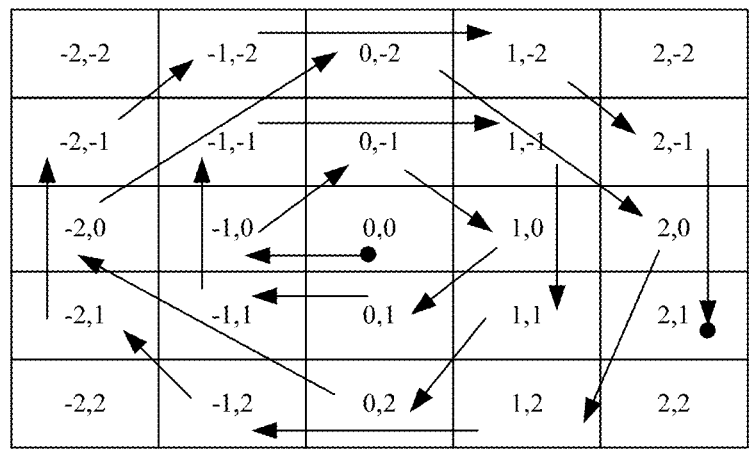

In another example, if SR=2, there may be 21 candidate points, and these candidate points are arranged, with the motion vector (0, 0) as a center, in an ascending sequence of distances from the center to the candidate points. As shown in FIG. 7F, the sequence of these candidate points may be: {Mv(0, 0), Mv(−1, 0), Mv(0, −1), Mv(1, 0), Mv(0, 1), Mv(−1, 1), Mv(−1, −1), Mv(1, −1), Mv(1,1), Mv(0,2), Mv(−2,0), Mv(0, −2), Mv(2,0), Mv(1, 2), Mv(−1, 2), Mv(−2, 1), Mv(−2, −1), Mv(−1, −2), Mv(1, −2), Mv(2, −1), Mv(2, 1)}. Cost values corresponding to the motion vectors of the 21 points are determined, and scanned in the above-mentioned sequence so as to obtain a motion vector with a minimum cost value as an optimal offset MV, and then an integer-pixel motion vector refinement value and a fractional pixel motion vector refinement value are determined by the optimal offset MV. The determination manner may be referred to the above-mentioned embodiments.

Figure 7G:
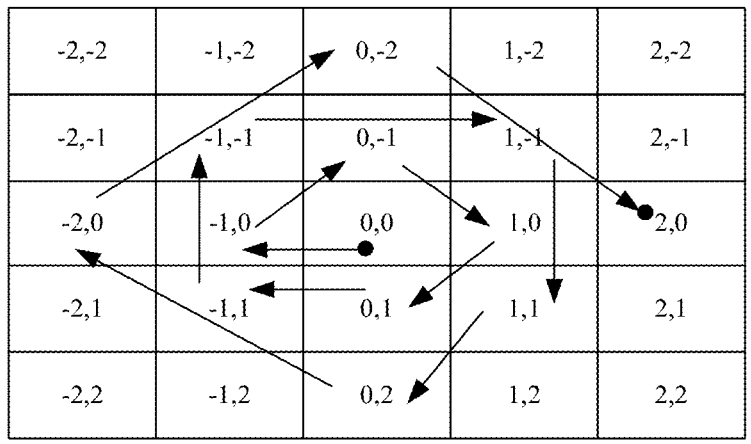

In another example, if SR=2, there may be 13 candidate points, and these candidate points are arranged, with the motion vector (0, 0) as a center, in an ascending sequence of distances from the center to the candidate points. As shown in FIG. 7G, the sequence of these candidate points may be: {Mv(0, 0), Mv(−1, 0), Mv(0, −1), Mv(1, 0), Mv(0, 1), Mv(−1, 1), Mv(−1, −1), Mv(1, −1), Mv(1, 1), Mv(0, 2), Mv(−2, 0), Mv(0, −2), Mv(2, 0)}. Cost values corresponding to the motion vectors of the 13 points are determined, and scanned in the above-mentioned sequence so as to obtain a motion vector with a minimum cost value as an optimal offset MV, and then an integer-pixel motion vector refinement value and a fractional pixel motion vector refinement value may be determined by the optimal offset MV. The determination manner may be referred to the above-mentioned embodiments.

In the above-mentioned embodiments, when the first candidate motion vector is Mv(0, 0), the cost SAD (0, 0) of the first candidate motion vector Mv(0, 0) is processed as follows: SAD (0, 0)=SAD (0, 0)−SAD (0, 0)/4, that is, it is mandatory to be reduced by ¼. The costs SAD of other candidate motion vectors are not processed as above.

In a possible implementation, the following early termination mechanism exists in the above-mentioned checking process of the candidate motion vectors.

If the cost SAD (0, 0) of the first candidate motion vector (Mv(0, 0)) is less than a threshold dx*dy, the checking of the subsequent candidate motion vectors is not performed, i.e., the optimal integer-pixel offset of the sub-block is Mv(0, 0).

If the cost of some candidate motion vector is 0, the checking of the subsequent candidate motion vectors is not carried out, and the current candidate motion vector is taken as the optimal integer-pixel offset.

If any one of the above-mentioned early termination cases exists in the checking of the candidate motion vectors, the calculation process of subsequent fractional pixel offsets is not carried out, that is, the target motion vector of the sub-block is obtained directly through the integer-pixel offset.

Embodiment 20: for adjusting the first original motion vector Org_MV0 and the second original motion vector Org_MV1 to the first target motion vector Refined_MV0 and the second target motion vector Refined_MV1, the implementation of embodiment 20 can be carried out as in embodiments 16 and 17. In this embodiment, because all candidate motion vectors to be processed are selected at one time, these candidate motion vectors may be processed in parallel to obtain the cost value of each candidate motion vector, thereby reducing the computational complexity and improving the encoding performance. In this embodiment, with an original motion vector as center, some motion vectors with offsets not exceeding the range of SR are selected from (2*SR+1)*(2*SR+1) points. For example, N (N greater than or equal to 1, less than or equal to (2*SR+1)*(2*SR+1)) candidate points are selected from (2*SR+1)*(2*SR+1) points including the original motion vector. Cost values of the motion vectors corresponding to the N points are determined. The cost values of the N points are scanned in a certain sequence to select a motion vector with a minimum cost value as an optimal motion vector. If these costs are equal, a candidate point ranked top is selected preferentially.

Embodiment 20 differs from Embodiment 19 in that the positions of the candidate points in Embodiment 19 are fixed, i.e., irrelevant to the original motion vectors, while the positions of the candidate points in Embodiment 20 are relevant to the original motion vectors, which will be illustrated as below in combination with several specific examples.

In an example, if SR=2, there may be 13 candidate points, and these candidate points are arranged, with the motion vector (0, 0) as a center, in an ascending sequence of distances from the center to the candidate points. Moreover, the sequence of the first layer of candidate points from the center is independent of the size of the original motion vectors, and the sequence of the second layer of candidate points from the center is dependent of the size of the original motion vectors. The sequence of these candidate points may be: {Mv(0, 0), Mv(−1, 0), Mv(0, −1), Mv(1, 0), Mv(0, 1), Mv(−1, 1), Mv(−1, −1), Mv(1, −1), Mv(1,1), Mv(sign_H*2, 0), Mv(sign_H*2,sign_V*1), Mv(0, sign_V*2), Mv(0, sign_V*2)}. The first original motion vector is denoted as MV0, a horizontal component is denoted as MV0_Hor, and a vertical component is denoted as MV0_Ver. If MV0_Hor is greater than or equal to 0, sign_H is 1; otherwise, sign_H is −1; if MV0_Ver is greater than or equal to 0, sign_V=1; otherwise, sign_V is −1. Cost values corresponding to the motion vectors of the 13 points are determined, and scanned in the above-mentioned sequence so as to obtain a motion vector with a minimum cost value as an optimal offset MV, and then an integer-pixel motion vector refinement value and a fractional pixel motion vector refinement value are determined by using the optimal offset MV. The determination manner may be referred to the above-mentioned embodiments.

In another example, assume SR=2, there may be 13 candidate points, and these candidate points are arranged, with the motion vector (0, 0) as a center, in an ascending sequence of distances from the center to the candidate points. Moreover, the sequence of the first layer of candidate points from the center is independent of the size of the original motion vector, and the sequence of the second layer of candidate points from the center is dependent of the size of the original motion vector. The sequence of these candidate points may be: {Mv(0, 0), Mv(−1, 0), Mv(0, −1), Mv(1, 0), Mv(0, 1), Mv(−1, 1), Mv(−1, −1), Mv(1, −1), Mv(1,1), Mv(sign_H*2,0), Mv(sign_H*2,sign_V*1), Mv(0, sign_V*2), Mv(0, sign_V*2)}. The first original motion vector is denoted as MV0, a horizontal component is denoted as MV0_Hor, and a vertical component is denoted as MV0_Ver. If MV0_Hor is greater than 0, sign_H is 1; otherwise, sign_H is −1; if MV0_Ver is greater than 0, sign_V is 1; otherwise, sign_V is −1. Cost values corresponding to the motion vectors of the 13 points are determined, and scanned in the above-mentioned sequence so as to obtain a motion vector with a minimum cost value as an optimal offset MV, and then an integer-pixel motion vector refinement value and a fractional pixel motion vector refinement value may be determined by the optimal offset MV. The determination manner may be referred to the above-mentioned embodiments.

Embodiment 21: in the above-mentioned embodiments, a first cost value corresponding to the central motion vector and a second cost value corresponding to the edge motion vector are obtained according to first pixel values of the first reference block and second pixel values of the second reference block; and a third cost value corresponding to the first original motion vector and a fourth cost value corresponding to the candidate motion vector are obtained according to first pixel values of the first reference block and second pixel values of the second reference block. In an example, the first cost value corresponding to the central motion vector, the second cost value corresponding to the edge motion vector, the third cost value corresponding to the first original motion vector, and the fourth cost value corresponding to the candidate motion vector are obtained according to non-downsampled first pixel values and non-downsampled second pixel values. Or, the first pixel values are downsampled, and the second pixel values are downsampled; and then, according to the downsampled first pixel values and the downsampled second pixel values, the first cost value corresponding to the central motion vector, the second cost value corresponding to the edge motion vector, the third cost value corresponding to the first original motion vector, and the fourth cost value corresponding to the candidate motion vector are obtained. Or, first pixel values are shifted and downsampled, and the second pixel values are shifted and downsampled; and then, according to the shifted and downsampled first pixel values and the shifted and downsampled second pixel values, the first cost value corresponding to the central motion vector, the second cost value corresponding to the edge motion vector, the third cost value corresponding to the first original motion vector, and the fourth cost value corresponding to the candidate motion vector are obtained.

For different cases, the cost value may be determined in a similar manner. For example, in order to obtain a cost value corresponding to a central motion vector, a sub-reference block A1 corresponding to the central motion vector may be copied from a first reference block, a sub-reference block B1 corresponding to a symmetric motion vector of the central motion vector may be copied from a second reference block, and then the cost value corresponding to the central motion vector may be obtained by first pixel values of the sub-reference block A1 and second pixel values of the sub-reference block B1. In order to obtain a cost value corresponding to an edge motion vector, a sub-reference block A2 corresponding to the edge motion vector may be copied from the first reference block, a sub-reference block B2 corresponding to a symmetric motion vector of the edge motion vector may be copied from the second reference block, and then the cost value corresponding to the edge motion vector may be obtained by first pixel values of the sub-reference block A2 and second pixel values of the sub-reference block B2, and so on.

In conclusion, in order to obtain a cost value corresponding to a motion vector, a sub-reference block corresponding to the motion vector may be obtained from the first reference block, a sub-reference block corresponding to a symmetric motion vector of the motion vector may be obtained from the second reference block, and then the cost value of the motion vector may be obtained by pixel values of the two sub-reference blocks. This process will not be repeated here.

Embodiment 22: on the basis of embodiment 21, the cost value corresponding to the motion vector is obtained according to the non-downsampled first pixel values (i.e., the non-downsampled pixel values of the sub-reference block in the first reference block) and the non-downsampled second pixel values (i.e., the non-downsampled pixel values of the sub-reference block in the second reference block). For example, assume the sub-reference block in the first reference block is $pred_0$ and the sub-reference block in the second reference block is $pred_1$, the cost value is determined according to a SAD of all the pixel values of the sub-reference block $pred_0$ and the sub-reference block $pred_1$, without performing vertical downsampling for the pixel values of the sub-reference blocks $pred_0$ and $pred_1$.

Based on all the pixel values of the sub-reference block $pred_0$ and the sub-reference block $pred_1$, the cost value may be calculated in the following formula:

$$\text{cost} = \sum_{i=1}^{H} \sum_{j}^{W} \text{abs}(pred_0(i, j) - pred_1(i, j))$$

In the above formula, cost may represent a cost value, W may be a width value of the sub-reference block, H may be a height value of the sub-reference block, $pred_0(i, j)$ may represent a pixel value of row j and column i of the sub-reference block $pred_0$, $pred_1(i, j)$ may represent a pixel value of row j and column i of the sub-reference block $pred_1$, and abs (x) may represent an absolute value of x.

Embodiment 23: on the basis of embodiment 21, the first pixel values may be downsampled, and the second pixel values may be downsampled; and the cost value corresponding to the motion vector may be obtained according to the downsampled first pixel values (i.e., the downsampled pixel values of the sub-reference block in the first reference block) and the downsampled second pixel values (i.e., the downsampled pixel values of the sub-reference block in the second reference block). For example, if the sub-reference block in the first reference block is $pred_0$ and the sub-reference block in the second reference block is $pred_1$, the cost value is determined according to a SAD of all the pixel values of the sub-reference block $pred_0$ and the sub-reference block $pred_1$. When the SAD of all the pixel values is used to determine the cost value, vertical N-times (N is an integer greater than 0, for example, may be 2) downsampling is carried out on the pixel values of the sub-reference block $pred_0$ and the sub-reference block $pred_1$.

Based on all the pixel values of the sub-reference block $pred_0$ and the sub-reference block $pred_1$, the cost value may be calculated in the following formula:

$$\text{cost} = \sum_{i=1}^{H/N} \sum_{j}^{W} \text{abs}(pred_0(1 + N(i-1), j) - pred_1(1 + N(i-1), j))$$

In the above formula, cost may represent a cost value, W may be a width value of the sub-reference block, and H may be a height value of the sub-reference block; N may represent a parameter of downsampling, which is an integer greater than 0, for example, may be 2; $pred_0(1+N(i-1),j)$ may represent a pixel value of row j and column 1+N(i−1) of the sub-reference block $pred_0$, $pred_1(1+N(i-1),j)$ may represent a pixel value of row j and column 1+N(i−1) of the sub-reference block $pred_1$, and abs (x) may represent an absolute value of x.

Embodiment 24: on the basis of embodiment 21, the first pixel values are shifted and downsampled, and the second pixel values are shifted and downsampled; and the cost value corresponding to the motion vector is obtained according to the shifted and downsampled first pixel values (i.e., the shifted and downsampled pixel values of the sub-reference block in the first reference block) and the shifted and downsampled second pixel values (i.e., the shifted and downsampled pixel values of the sub-reference block in the second reference block). For example, if the sub-reference block in the first reference block is $pred_0$ and the sub-reference block in the second reference block is $pred_1$, both $pred_0$ and $pred_1$ are stored in D-bit form, that is, each pixel value in $pred_0$ is stored in D-bit form, and each pixel value in $pred_1$ is stored in D-bit form.

If D is less than or equal to 8, a cost value is determined according to a SAD of all pixel values of the sub-reference block $pred_0$ and the sub-reference block $pred_1$. When the SAD of all the pixel values is used to determine the cost value, vertical N-times (N is an integer greater than 0, and may be 2) downsampling is carried out on the pixel values of the sub-reference block $pred_0$ and the sub-reference block $pred_1$. Based on all pixel values of the sub-reference block $pred_0$ and the sub-reference block $pred_1$, is the cost value may be calculated in the following formula:

$$\text{cost} = \sum_{i=1}^{H/N} \sum_{j}^{W} \text{abs}(pred_0(1 + N(i-1), j) - pred_1(1 + N(i-1), j))$$

In the above formula, cost represents a cost value, W refers to a width value of the sub-reference block, and H refers to a height value of the sub-reference block; N represents a parameter of downsampling, which is an integer greater than 0, and may be 2; $pred_0(1+N(i-1),j)$ represents a pixel value of row j and column 1+N(i−1) of the sub-reference block $pred_0$, $pred_1(1+N(i-1),j)$ represents a pixel value of row j and column 1+N(i−1) of the sub-reference block $pred_1$, and abs (x) may represent an absolute value of x. To sum up, it can be seen that only a sum of absolute values of differences of pixel values of row 1, row N+1, row 2N+1 . . . .

If D is greater than 8, all the pixel values of the sub-reference block $pred_0$ and the sub-reference block $pred_1$ are shifted to 8 bits to obtain 8-bit $pred_0$ and 8-bit $pred_1$ which are respectively denoted as $pred_{0\_8bit}(i, j)$ and $pred_{1\_8bit}(i, j)$. This operation is to save the storage cost of SAD calculation, and 8-bit storage may achieve a higher degree of parallelism.

$$pred_{0\_8bit}(i,j)=pred_0(i,j)>>(D-8), pred_{1\_8bit}(i,j)=pred_1(i,j)>>(D-8)$$

Then, vertical N-times (N is an integer greater than 0, and may be 2) downsampling is performed on the pixel values of the 8-bit $pred_0$ and the 8-bit $pred_1$, and in this way, the cost value may be calculated in the following formula:

$$cost = \sum_{i=1}^{H/N} \sum_j^W abs(pred_{0\_8bit}(1 + N\ (i-1), j) - pred_{1\_8bit}(1 + N\ (i-1), j))$$

In the above formula, the meaning of each expression may be referred to the above embodiments and will not be repeated here.

Embodiment 25: in the above-mentioned embodiments, for each sub-block of the current block, the prediction values of the sub-block are determined according to the first target motion vector and second target motion vector of the sub-block, and the prediction values of the current block are determined according to the prediction values of each sub-block. For example, based on the first target motion vector and second target motion vector of the sub-block, the reference blocks of two directions (i.e. the third reference block and the fourth reference block, which may include the prediction values of three components; and because the target motion vectors may be fractional pixels, interpolation is required to be performed) are obtained by interpolation (such as 8-tap interpolation). Then, final prediction values (such as the prediction values of the three components) are obtained by performing weighting process on the third pixel values of the third reference block and the fourth pixel values of the fourth reference block.

In a possible implementation, if the optimal motion vector is same as the initial motion vector (i.e. the first original motion vector or the second original motion vector), based on the first target motion vector of the sub-block, a third reference block corresponding to the sub-block is determined from the first reference picture; and based on the second target motion vector of the sub-block, a fourth reference block corresponding to the sub-block is determined from the second reference picture. The prediction values of the sub-block are obtained by performing weighting process on pixel values of the third reference block and pixel values of the fourth reference block.

For example, assume the size of the sub-block is dx*dy, a third reference block with a size of dx*dy is determined from the first reference picture based on the first target motion vector. For example, a reference block with a size of A*B is determined from the first reference picture, and the size of A*B relates to the interpolation manner, for example, A is greater than dx and B is greater than dy, which is not restricted herein. By interpolating between the pixel values in the reference block, a third reference block with a size of dx*dy may be obtained, and there is no restriction on this interpolation manner. A fourth reference block with a size of dx*dy is determined from the second reference picture based on the second target motion vector. For example, a reference block with a size of A*B is determined from the second reference picture, and the size of A*B relates to the interpolation manner, for example, A is greater than dx and B is greater than dy, which is not limited herein. By interpolating between the pixel values in the reference block, a fourth reference block with a size of dx*dy may be obtained, and there is no restriction on this interpolation manner.

In another possible implementation, if the optimal motion vector is different from the initial motion vector, a fifth reference block may be determined from the first reference picture, and a sixth reference block is obtained by extending the fifth reference block; and then, based on the first target motion vector of the sub-block, a third reference block corresponding to the sub-block is selected from the sixth reference block. Moreover, a seventh reference block may be determined from the second reference picture, and an eighth reference block is obtained by extending the seventh reference block; and then, based on the second target motion vector of the sub-block, a fourth reference block corresponding to the sub-block is selected from the eighth reference block. Then, prediction values of the sub-block are obtained by performing weighting process on pixel values of the third reference block and pixel values of the fourth reference block.

For example, if the size of the sub-block is dx*dy, a fifth reference block with a size of dx*dy is determined from the first reference picture based on the first original motion vector. For example, a reference block with a size of A*B is determined from the first reference picture, and the size of A*B depends on the interpolation manner, for example, A is greater than dx and B is greater than dy, which is not restricted herein. By interpolating between the pixel values in the reference block, the fifth reference block with a size of dx*dy may be obtained, and there is no restriction on this interpolation manner. Then, a sixth reference block is obtained by extending the fifth reference block, for example, upper, lower, left and right filling is performed on the fifth reference block by copying neighboring values, and the filled reference block is taken as the sixth reference block, where the size of the sixth reference block may be greater than dx*dy. Then, based on the first target motion vector of the sub-block, a third reference block with a size of dx*dy corresponding to the sub-block is selected from the sixth reference block.

If the size of the sub-block is dx*dy, a seventh reference block with a size of dx*dy is determined from the second reference picture based on the second original motion vector. For example, a reference block with a size of A*B is determined from the second reference picture, the size of A*B depends on the interpolation manner, for example, A is greater than dx and B is greater than dy, which is not limited herein. By interpolating between the pixel values in the reference block, the seventh reference block with a size of dx*dy may be obtained, and there is no restriction on this interpolation manner. Then, an eighth reference block may be obtained by extending the seventh reference block, for example, upper, lower, left and right filling is performed on the seventh reference block by copying neighboring values, and the filled reference block is taken as the eighth reference block, where the size of the eighth reference block may be greater than dx*dy. Then, based on the second target motion vector of the sub-block, a fourth reference block with a size of dx*dy corresponding to the sub-block is selected from the eighth reference block.

Embodiment 26: after the target motion vector is obtained, based on the target motion vector of each sub-block, the two sets of prediction values of two directions (i.e., the prediction values of YUV three components, i.e., the prediction values of the third reference block and the prediction values of the fourth reference block as above) are obtained through an 8-tap interpolation filter, and then weighted to obtain final prediction values. Or, based on the target motion vector of each sub-block, the prediction values of two directions (namely, the prediction values of the YUV three components, i.e., the prediction values of the third reference block and the prediction values of the fourth reference block) are obtained through a bilinear interpolation filter (rather than through the 8-tap interpolation filter here), and then weighted to obtain final the prediction values.

Embodiment 27: after the two sets of prediction values of two directions are obtained, final prediction values are obtained by means of mean-weighted averaging (i.e. the weights of the two sets of prediction values of two directions are same). Alternatively, after the two sets of prediction values of two directions are obtained, final prediction values are obtained by means of weighted averaging, and the weights of the two set of prediction values may be different. For example, a ratio of the weights of the two sets of prediction values may be 1:2, 1:3, 2:1, etc. For an encoder, a weight table may include weight ratios such as 1:2, 1:3, 2:1, etc., and the encoder may determine a cost value of each weight ratio, and determine a weight ratio with a minimum cost value. In this way, the encoder may obtain final prediction values by means of weighted averaging based on the weight ratio with the minimum cost value. When the encoder sends an encoded bit stream to a decoder, the encoded bit stream carries index values of the weight ratios in the weight table. In this way, the decoder acquires the weight ratios corresponding to the index values from the weight table by decoding the index values in the encoded bit stream, and then obtains the final prediction values by means of weighted averaging based on the weight ratios.

In an example, the weight table may include but is not limited to {−2, 3, 4, 5, 10}. In some examples, a sum of two weights may be 8, and for each weight, the weight may be a negative value as long as the sum of the two weights is 8.

For example, the weight "−2" is a negative value. When the weight of one prediction value is −2, the weight of the other prediction value is 10, that is, the sum of the two weights is 8. In this case, the final prediction value=(prediction value 1*(−2)+prediction value 2*(8−(−2))).

For another example, the weight "10" indicates that the weight of one prediction value is 10, and the weight of the other prediction value is −2, that is, the sum of the two weights is 8. In this case, the final prediction value=(prediction value 1*(10)+prediction value 2*(−2)).

For another example, the weight "3" indicates that the weight of one prediction value is 3, and the weight of the other prediction value is 5, that is, the sum of the two weights is 8. In this case, the final prediction value=(prediction value 1*(3)+prediction value 2*(5)).

For another example, the weight "5" indicates that the weight of one prediction value is 5, and the weight of the other prediction value is 3, that is, the sum of the two weights is 8. In this case, the final prediction value=(prediction value 1*(5)+prediction value 2*(3)).

For another example, the weight "4" indicates that the weight of one prediction value is 4, and the weight of the other prediction value is 4, that is, the sum of the two weights is 8. In this case, the final prediction value=(prediction value 1*(4)+prediction value 2*(4)).

In a possible implementation, for each sub-block of the current block, with reference to the above-mentioned embodiments, the third pixel values of the third reference block and the fourth pixel values of the fourth reference block may be obtained, then, a final prediction value is obtained by weighting the third pixel values of the third reference block and the fourth pixel values of the fourth reference block. For example, the prediction value of the sub-block is obtained by performing weighting for the third pixel values, a first weight corresponding to the third pixel values, the fourth pixel values, and a second weight corresponding to the fourth pixel values. If the final prediction value is obtained by means of mean-weighted averaging (i.e. the two weights are identical), the first weight is identical to the second weight.

Embodiment 28: in the above-mentioned embodiments, the first target motion vector and second target motion vector of each sub-block of the current block may be stored, or, the first original motion vector and the second original motion vector of each sub-block of the current block may be stored, or, the first original motion vector, the second original motion vector, the first target motion vector and the second target motion vector of each sub-block of the current block may be stored. These stored motion vectors may be applied as a reference to the encoding and decoding of subsequent blocks.

For example, illustration is performed with an example of storing the first target motion vector and the second target motion vector of each sub-block of the current block; the first target motion vector and the second target motion vector are applied to the loop filtering of a current picture; the first target motion vector and the second target motion vector are applied to the temporal reference of subsequent pictures; and/or, the first target motion vector and the second target motion vector are applied to the spatial reference of the current picture. For example, the first target motion vector and the second target motion vector of each sub-block of the current block may be applied to the motion compensation of the current block, and the temporal reference of subsequent pictures. For another example, the first target motion vector and the second target motion vector of each sub-block of the current block may be applied to the motion compensation of the current block, a loop filtering process of the current block, and the temporal reference of subsequent pictures. For another example, the first target motion vector and second target motion vector of each sub-block of the current block may be applied to the motion compensation of the current block, a loop filtering process of the current block, the temporal reference of subsequent pictures, and the spatial reference of the current picture, as described below.

The first target motion vector and the second target motion vector of each sub-block of the current block may be applied to the spatial reference of blocks in some LCU (Largest Coding Unit) in a space domain. Because the encoding and decoding sequence is from top to bottom and from left to right, the motion vectors of the current block may be referenced by other blocks in a current LCU, or may be referenced by blocks in subsequent neighboring LCU. Due to a large amount of calculation required for obtaining the target motion vectors, if a subsequent block refers to the target motion vectors of the current block, it is required to wait for a longer time. For avoiding the time delay caused by too long waiting, only a few spatially-neighboring blocks are allowed to refer to the target motion vectors of the current block while other blocks refer to the original motion vectors of the current block.

In some examples, these few blocks include sub-blocks in a lower LCU and a lower right LCU located at a lower side of the current LCU, while the sub-blocks in a right LCU and a left LCU cannot refer to the target motion vectors of the current block.

Embodiment 29: the following will describe a motion vector refinement process in combination with one specific example. The specific steps of motion vector refinement are described below. The "copying" in the following description indicates obtaining without using interpolation. If a MV (i.e. motion vector) is an integer-pixel offset, the motion vector may be directly copied from a reference picture; otherwise, the motion vector may be obtained by interpolation.

At step e1, if a decoder-side motion vector refinement mode is used for a current block, the following process is performed.

At step e2, reference pixel values (it is assumed that a width of the current block is W and a height is H) are prepared.

Figure 8:
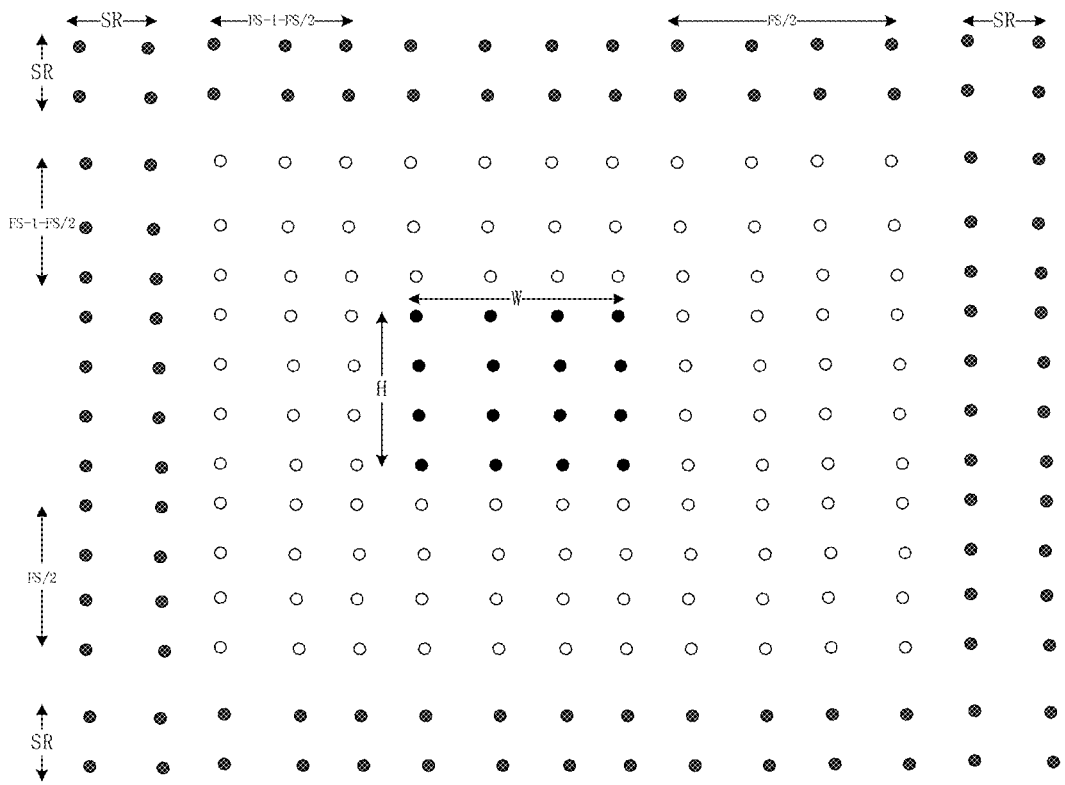
FIG. 8 is a schematic diagram of extending a reference block according to an embodiment of the present disclosure.

Integer-pixel blocks used in step e3 are prepared: based on the original motion vectors (the original motion vector of list0 is denoted as Org_MV0 and the original motion vector of list1 is denoted as Org_MV1), two three-component integer-pixel blocks with an area of (W+FS−1)*(H+FS−1) are copied at the corresponding positions of the corresponding reference pictures. In addition, integer-pixel blocks used in step e4 are prepared: on the basis of the integer-pixel blocks with an area of (W+FS−1)*(H+FS−1), the three-component integer-pixel blocks with an area of (W+FS−1)*(H+FS−1) are extended respectively by SR rows/columns upwards, downwards, leftwards and rightwards to obtain three-component integer-pixel blocks with an area of (W+FS−1+2*SR)*(H+FS−1+2*SR) which are respectively denoted as Pred_Inter0 and Pred_Inter1, as shown in FIG. 8. In some examples, the size of an inner black area is the size of the current block, an outer white area is extra reference pixels required for 8-tap filter interpolation of the original motion vectors, and an outer black area is extra reference pixels required for 8-tap filter interpolation of the target motion vectors.

For inner W*H black and white areas, the pixel values are obtained from the reference pictures; and the pixel values of the outer black area need not to be obtained from the reference pictures, but may be obtained by copying neighboring pixel values. In an example, W+FS−1 pixel values in the first row of the white area are copied to the pixel values in the first SR rows of the outer black area. W+FS−1 pixel values in the last row of the white area are copied to the pixel values in the last SR rows of the outer black area. Then, H+FS−1 pixel values in the first column of the white area and the obtained upper SR pixel values and the obtained lower SR pixel values of the outer black area are copied to the pixel values in the first SR columns of the outer black area. H+FS−1 pixel values in the last column of the white area and the obtained upper SR pixel values and the obtained lower SR pixel values of the outer black area are copied to the pixel values in the last SR columns of the outer black area. In another example, H+FS−1 pixel values in the first column of the white area are copied to the pixel values in the first SR columns of the outer black area. H+FS−1 pixel values in the last column of the white area are copied to the pixel values in the last SR columns of the outer black area. Then, W+FS−1 pixel values in the first row of the white area and the obtained left SR pixel values and the obtained right SR pixel values of the outer black area are copied to the pixel values in the first SR rows of the outer black area. W+FS−1 pixel values in the last row of the white area and the obtained left SR pixel values and the obtained right SR pixel values of the outer black area are copied to the pixel values in the last SR rows of the outer black area.

First motion compensation is performed based on the motion information of two different directions. For example, for a luma component (because the luma component is used to calculate a cost value in the subsequent search process), based on two integer-pixel reference blocks with an area of (W+FS−1)*(H+FS−1), two initial reference prediction sample blocks (denoted as Pred_Bilinear0 and Pred_Bilinear1) with a size of (W+2*SR)*(H+2*SR) are obtained by means of bilinear interpolation, where FS is a number of taps of a filter, and may be 8 by default; and SR refers to a search range, i.e., the maximum horizontal/vertical component interpolation of the target motion vector(s) and the original motion vector(s), and may be 2 by default. Pred_Bilinear0/1 is used in step e3.

At step e3, for each dx*dy sub-block of the current block, the target motion vectors are respectively obtained (the target motion vectors in two directions are respectively denoted as Refined_MV0 and Refined_MV1).

At step e31, SR iterations are performed to obtain an integer-pixel offset of an optimal integer-pixel MV point, where the integer-pixel offset is denoted as IntegerDeltaMV; and IntegerDeltaMV is initialized to (0, 0); and each iteration is performed in the following process.

At step e311, deltaMV is set to (0, 0). If a first iteration is performed, two prediction sample blocks (i.e., W*H blocks at the center of PreD_Bilinear0/1) are copied in the reference pixels Pred_Bilinear0/1 based on original motion vectors, and an initial cost value (i.e., a SAD obtained by carrying out vertical 2-times downsampling on the prediction sample blocks in two directions) is obtained based on the two prediction sample blocks. If the initial cost value is less than dx*dy, the subsequent search process is skipped directly to perform step e32, and notZeroCost is set to false, where dx and dy refer to the width and height of the current sub-block.

At step e312, by centering on the above initial point, in a sequence of {Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}, 24 offset MVs (all the 24 offset MVs are called MVOffset) are obtained, and then processes of calculating and comparing cost values of these offset MVs are performed. For example, based on an MVOffset, in the reference pixels Pred_Bilinear0/1, two prediction sample blocks (i.e., a W*H block with a central position offset MVOffset in Pred_Bilinear0 and a W*H block with a central position offset −MVOffset (opposite to list0) in Pred_Bilinear1) are obtained through the MVOffset, and a downsampled SAD of the two prediction sample blocks is calculated as the cost value of the MVOffset. The MVOffsetwith a minimum cost value is retained (stored in deltaMV).

IntegerDeltaMV is updated based on the value of deltaMV: IntegerDeltaMV=deltaMV.

At step e313, after one iteration is performed, if the optimal MV is still the initial MV or the minimum cost value is 0, the next iterative search process is not carried out, but step e32 is performed, and notZeroCost is set to false.

At step e32, an optimal fractional pixel offset MV denoted as SPMV (i.e. subMV) may be obtained with the optimal integer-pixel MV point in step e31 as center, and then SPMV is initialized to (0, 0), and then the following process is performed.

At step e321, only when notZeroCost is not false and deltaMV is (0, 0), the subsequent processing is performed; otherwise, IntegerDeltaMV is directly used to adjust the original motion vectors.

At step e322, E(x, y) is represented as a cost value (a cost calculated in step e31) corresponding to the MV of the optimal MV point offset (x, y) obtained in step e31. Based on E(x, y) of five points respectively at the center and the upper, lower, left and right sides, an offset (x0, y0) of a point with a minimum E(x, y) may be obtained as follows: $x_0=N*(E(-1, 0)-E(1, 0))/(E(-1, 0)+E(1, 0)-2*E(0, 0))$, $y_0=N*(E(0, -1)-E(0, 1))/(E(0, -1)+E(0, 1)-2*E(0, 0))$. In an example, for the motion vector pixel accuracies such as ½, ¼, ⅛, and ¹⁄₁₆, N is 1, 2, 4, and 8. Then, (x0, y0) may be assigned to deltaMv, SPMV=deltaMv/2N, so if the current motion vector pixel accuracy is ¹⁄₁₆, SPMV may be ($x_0$/16, $y_0$/16).

If E(−1, 0)=E(0, 0), it is offset by half a pixel in a horizontal leftward direction (deltaMv[0]=−N).

If E(1, 0)=E(0, 0), it is offset by half a pixel in a horizontal rightward direction (deltaMv[0]=N).

If E(0, −1)=E(0, 0), it is offset by half a pixel in a vertical upward direction (deltaMv[1]=−N).

If E(0, 1)=E(0, 0), it is offset by half a pixel in a vertical downward direction (deltaMv[1]=N).

At step e33, based on the integer-pixel offset IntegerDeltaMV in step e31 and the fractional pixel offset SPMV in step e32, an optimal offset MV is obtained, which is denoted as BestMVoffset. BestMVoffset=IntegerDeltaMV+SPMV. Target motion vectors of two directions may be obtained based on BestMVoffset: Refined_MV0=Org_MV0+BestMVoffset; and Refined_MV1=Org_MV1-BestMVoffset.

At step e4, based on the target motion vectors of each sub-block, 8-tap interpolation is performed to obtain three-component prediction values of two directions, and final prediction values (such as the prediction values of three components) are obtained by weighting. For example, based on the target motion vectors Refined_MV0 and Refined_MV1 of each sub-block, in the Pred_Inter0/1 prepared in step e2, a corresponding prediction block is obtained by interpolation (the motion vector may be a fractional pixel, so a corresponding pixel block may be obtained only by interpolation).

At step e5, the target motion vectors are applied to the motion compensation of the current block (that is, to obtain the prediction values of each sub-block and the prediction values of the current block) and the temporal reference of subsequent pictures, but not applied to the loop filtering and spatial reference of the current picture.

Embodiment 30: the difference from embodiment 29 is that a reference pixel preparation process is moved to each dx*dy sub-block to proceed. When a reference pixel is prepared, only a pixel block of (dx+(Filtersize−1))*(dy+(Filtersize−1)) is prepared. If an optimal motion vector obtained by searching is not the original motion vector, the reference pixel is extended, otherwise, the reference pixel is not extended. For each dx*dy sub-block of the current block, a target motion vector is obtained respectively, then motion compensation is performed based on the target motion vectors, and final prediction values are obtained by weighting. The following process is performed for each dx*dy sub-block of the current block.

At step f1, if a decoder-side motion vector refinement mode is used for the current block, the following process is performed.

At step f2, integer-pixel blocks used in step f3 are prepared: for example, only for a luma component: based on the original motion vectors (the original motion vector of list0 is denoted as Org_MV0 and the original motion vector of list1 is denoted as Org_MV1), two integer-pixel blocks with an area of (dx+(filtersize−1))*(dy+(filtersize−1)) are obtained from the corresponding positions of corresponding reference pictures.

In some examples, filtersize is a number of taps of a filter, and may be 8 by default.

At step f3, for each dx*dy sub-block of the current block, the target motion vectors are obtained respectively (the target motion vectors of two directions are respectively denoted as Refined_MV0 and Refined_MV1).

In some examples, the implementation process of step f3 may be referred to step e3, and thus will not be described in detail here.

For example, a first motion vector compensation is performed based on the original motion vectors. For a luma component, an initial prediction values with a size of (dx+2*IterNum)*(dy+2*IterNum) are obtained based on bilinear interpolation, where IterNum is 2 by default, IterNum may be a search range SR, and IterNum may be a maximum horizontal/vertical component interpolation of the target motion vector(s) and the original motion vector(s). The initial prediction values of the original motion vector obtained above are stored in m_cyuvpredtempl0/1.

Cost values of 25 points are calculated to obtain an integer-pixel offset of an optimal integer-pixel MV point. If it is the first point (MV offset (0, 0)), an initial cost value is obtained (the cost value is a SAD obtained by carrying out vertical 2-times downsampling on the prediction values in two directions), if the cost value is less than dx*dy, the subsequent search process is directly skipped over (notZeroCost is set to false). With the above-mentioned initial point as a center, cost calculation and comparison are performed on 24 points, and one point with a minimum cost is retained as a new central point for the next step. With the optimal integer-pixel MV point as center, an optimal fractional pixel offset of ¹⁄₁₆ pixel is obtained. Based on the integer-pixel offset and the fractional pixel offset, an optimal offset MV is obtained, and the optimal offset MV is denoted as BestMVoffset. BestMVoffset=IntegerDeltaMV+SPMV. The target motion vectors of two directions may be obtained based on BestMVoffset: Refined_MV0=Org_MV0+BestMVoffset; and Refined_MV1=Org_MV1−BestMVoffset.

At step f4, if the optimal offset MV is (0, 0), the following steps will not be performed (that is, no additional extension is performed when the original motion vectors are used). If the optimal offset MV is not (0, 0), an integer-pixel is obtained again (because the extension of reference pixels is not performed in the above-mentioned step, reference pixels required after offset exceed the range of the reference pixels obtained in the above-mentioned step), then the following step is performed:

For the reference picture of list0 and the reference picture of list1, the following process is separately performed on U/V components (because the luma component is obtained in step f2): an integer-pixel value of (dxc+(filtersizec−1))*(dyc+(filtersizec−1)) is obtained from the reference picture, where dxc and dyc are relevant to a sampling rate; and when YUV adopts a 420 sampling rate, dxc=dx/2 and dyc=dy/2. Of course, this is just an example, and there is no restriction on dxc and dyc. filtersizeC may be 4, of course, this is just an example, and there is no restriction on filtersizeC. For another example, an integer-pixel value of dx*dy may be obtained directly from the reference picture without restriction.

For the reference picture of list0 and the reference picture of list1, three components are respectively filled. For example, by copying neighboring value, based on the integer-pixel value obtained in the above step (e.g. the integer-pixel value of dxc+(filtersizeC−1))*(dyc+(filtersizeC−1)), upper, lower, left and right filling is performed (e.g., width/luma component filled is 2, and chroma (chrominance) component of 420 is 1). In some examples, usable integer-pixel values around the current sub-block (in the current CU block) are not used.

At step f5, based on the target motion vectors of each sub-block and the two reference pixel blocks (obtained in step f4), 8-tap interpolation is performed to obtain three-component prediction values of two directions, and final the prediction values (such as the prediction values of the three components) are obtained by weighting.

Embodiment 31: The above-mentioned embodiments may be implemented separately or by any combination, which is not limited herein.

For example, embodiment 4 and embodiment 2 may be implemented by combination; and embodiment 4 and embodiment 3 may be implemented by combination.

Embodiment 5 and embodiment 2 may be implemented by combination; embodiment 5, embodiment 2 and embodiment 4 may be implemented by combination; embodiment 5 and embodiment 3 may be implemented by combination; and embodiment 5, embodiment 3 and embodiment 4 may be implemented by combination.

Embodiment 6 may be implemented separately, embodiment 7 may be implemented separately, and embodiment 8 and embodiment 7 may be implemented by combination; embodiment 9 and embodiment 7 may be implemented by combination; embodiment 10 and embodiment 7 may be implemented by combination; embodiment 11 and embodiment 7 may be implemented by combination; embodiment 12 and embodiment 7 may be implemented by combination; embodiment 13 and embodiment 7 may be implemented by combination; embodiment 14 and embodiment 7 may be implemented by combination; and embodiment 15 and embodiment 7 may be implemented by combination.

Embodiment 16 may be implemented separately, embodiment 17 may be implemented separately, and embodiment 18 and embodiment 17 may be implemented by combination; embodiment 19 and embodiment 17 may be implemented by combination; and embodiment 20 and embodiment 17 may be implemented by combination.

Embodiment 21 and embodiment 6 may be implemented by combination, embodiment 21 and embodiment 16 may be implemented by combination, embodiment 21 and embodiment 7 may be implemented by combination, embodiment 21 and embodiment 17 may be implemented by combination, embodiment 22 and embodiment 21 may be implemented by combination, embodiment 23 and embodiment 21 may be implemented by combination, and embodiment 24 and embodiment 21 may be implemented by combination.

Embodiment 25 and embodiment 2 may be implemented by combination; embodiment 25, embodiment 2 and embodiment 4 may be implemented by combination; embodiment 25 and embodiment 3 may be implemented by combination; and embodiment 25, embodiment 3 and embodiment 4 may be implemented by combination.

Embodiment 26 and embodiment 25 may be implemented by combination; and embodiment 27 and embodiment 25 may be implemented by combination.

Embodiment 28 and embodiment 2 may be implemented by combination; embodiment 28, embodiment 2 and embodiment 4 may be implemented by combination; embodiment 28 and embodiment 3 may be implemented by combination; and embodiment 28, embodiment 3 and embodiment 4 may be implemented by combination.

Embodiment 29 may be implemented separately; and embodiment 29 and embodiment 4 may be implemented by combination. Embodiment 30 may be implemented separately; and embodiment 30 and embodiment 4 may be implemented by combination. Of course, the above are only several examples of the present disclosure, which are not limited herein. All embodiments involved in the present disclosure may be implemented separately or by combination, and no redundant descriptions are made herein.

Figure 9A:
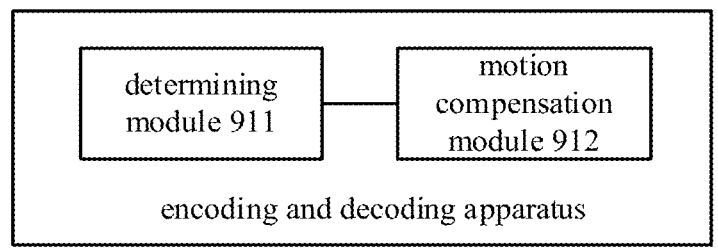
FIG. 9A is a structural diagram illustrating an encoding and decoding apparatus according to an embodiment of the present disclosure.

Embodiment 32:

Based on the same application conception as the above method, an embodiment of the present disclosure also provides an encoding and decoding apparatus, which is applied to an encoder or a decoder. FIG. 9A shows a structural diagram of the apparatus. The apparatus includes:

a determining module 911, configured to determine to use a decoder-side motion vector refinement mode for a current block if the following conditions are all satisfied:

control information allows the current block to enable the decoder-side motion vector refinement mode;

a prediction mode of the current block is a regular merge mode; or, a prediction mode of the current block is a merge mode or a skip mode, and the prediction mode of the current block is not other modes except the regular merge mode;

prediction values of the current block are obtained by use of a weighted sample prediction process on reference blocks of two reference pictures, the two reference pictures are respectively displayed earlier than and later than a current picture, and the two reference pictures have a same distance from the current picture;

the two reference pictures of the current block are same in weight;

the two reference pictures of the current block both are short-term reference pictures;

the width, height and area of the current block are all in defined ranges; and the two reference pictures of the current block are identical in size to the current picture;

a motion compensation module 912, configured to perform motion compensation on the current block in response to determining to use the decoder-side motion vector refinement mode for the current block.

The motion compensation module 912 is specifically configured to: for each sub-block in at least one sub-block included in the current block:

determine a first reference block corresponding to the sub-block according to a first original motion vector of the sub-block, and determine a second reference block corresponding to the sub-block according to a second original motion vector of the sub-block; adjust the first original motion vector and the second original motion vector according to first pixel values of the first reference block and second pixel values of the second reference block, so as to obtain a first target motion vector corresponding to the first original motion vector and a second target motion vector corresponding to the second original motion vector; and determine prediction values of the sub-block according to the first target motion vector and the second target motion vector;

and determine prediction values of the current block according to the prediction values of each sub-block.

The determining module 911 is further configured to determine not to use the decoder-side motion vector refinement mode for the current block if any one of the following conditions is not satisfied: control information allows the current block to enable the decoder-side motion vector refinement mode a prediction mode of the current block is a regular merge mode; or, a prediction mode of the current block is a merge mode or a skip mode, and the prediction mode of the current block is not other modes except the regular merge mode;

prediction values of the current block are obtained by use of a weighted sample prediction process on reference blocks of two reference pictures, the two reference pictures are respectively displayed earlier than and later than a current picture, and the two reference pictures have a same distance from the current picture;

the two reference pictures of the current block are same in weight;

the two reference pictures of the current block both are short-term reference pictures;

the width, height and area of the current block are all in defined ranges; and the two reference pictures of the current block are identical in size to the current picture.

The condition that control information allows the current block to enable the decoder-side motion vector refinement mode includes: sequence-level control information allows the current block to enable the decoder-side motion vector refinement mode; and/or, picture-level control information allows the current block to enable the decoder-side motion vector refinement mode.

The condition that the width, height and area of the current block are all in defined ranges includes the followings: the width is greater than or equal to a first threshold, the height is greater than or equal to a second threshold, and the area is greater than or equal to a third threshold; or, the width is greater than or equal to the first threshold, the height is greater than or equal to the second threshold, and the area is greater than a fourth threshold; where the third threshold is greater than the fourth threshold.

The first threshold is 8, the second threshold is 8, the third threshold is 128, and the fourth threshold is 64.

The motion compensation module 912, when determining the first reference block corresponding to the sub-block according to the first original motion vector of the sub-block, and determining the second reference block corresponding to the sub-block according to the second original motion vector of the sub-block, is specifically configured to:

determine the first reference block corresponding to the sub-block from the first reference picture based on the first original motion vector of the sub-block, where pixel values of pixel points in the first reference block is obtained by interpolating pixel values of neighboring pixel points in the first reference block, or by copying the pixel values of the neighboring pixel points in the first reference block; and determine the second reference block corresponding to the sub-block from the second reference picture based on the second original motion vector of the sub-block, where pixel values of pixel points in the second reference block is obtained by interpolating between pixel values of neighboring pixel points in the second reference block, or by copying the pixel values of the neighboring pixel points in the second reference block.

The motion compensation module 912, when adjusting the first original motion vector and the second original motion vector according to the first pixel values of the first reference block and the second pixel values of the second reference block, so as to obtain the first target motion vector corresponding to the first original motion vector and the second target motion vector corresponding to the second original motion vector, is specifically configured to:

with an initial motion vector as center, select part or all of motion vectors surrounding and including the initial motion vector, and determine the selected motion vectors as candidate motion vectors, where the initial motion vector is either the first original motion vector or the second original motion vector;

according to the first pixel values of the first reference block and the second pixel values of the second reference block, select a motion vector from the initial motion vector and the candidate motion vectors as an optimal motion vector; and adjust the first original motion vector according to the optimal motion vector so as to obtain the first target motion vector corresponding to the first original motion vector, and adjust the second original motion vector according to the optimal motion vector so as to obtain the second target motion vector corresponding to the second original motion vector.

The motion compensation module 912, when adjusting the first original motion vector according to the optimal motion vector so as to obtain the first target motion vector corresponding to the first original motion vector, and adjusting the second original motion vector according to the optimal motion vector so as to obtain the second target motion vector corresponding to the second original motion vector, is specifically configured to:

determine a first integer-pixel motion vector refinement value, a second integer-pixel motion vector refinement value, a first fractional pixel motion vector refinement value and a second fractional pixel motion vector refinement value of the sub-block according to the optimal motion vector;

adjust the first original motion vector to obtain the first target motion vector of the sub-block according to the first integer-pixel motion vector refinement value and the first fractional pixel motion vector refinement value; and adjust the second original motion vector to obtain the second target motion vector of the sub-block according to the second integer-pixel motion vector refinement value and the second fractional pixel motion vector refinement value.

If the optimal motion vector is same as the initial motion vector, the motion compensation module 912, when determining prediction values of the sub-block according to the first target motion vector and the second target motion vector, is specifically configured to:

determine a third reference block corresponding to the sub-block from the first reference picture based on the first target motion vector of the sub-block;

determine a fourth reference block corresponding to the sub-block from the second reference picture based on the second target motion vector; and weight pixel values of the third reference block and pixel values of the fourth reference block to obtain the prediction values of the sub-block.

If the optimal motion vector is difference from the initial motion vector, the motion compensation module 912, when determining the prediction values of the sub-block according to the first target motion vector and the second target motion vector, is specifically configured to:

determine a fifth reference block from the first reference picture, and obtain a sixth reference block by extending the fifth reference block; and based on the first target motion vector of the sub-block, select a third reference block corresponding to the sub-block from the sixth reference block;

determine a seventh reference block from the second reference picture, and obtain an eighth reference block by extending the seventh reference block; and based on the second target motion vector of the sub-block, select a fourth reference block corresponding to the sub-block from the eighth reference block; and weight the pixel values of the third reference block and the pixel values of the fourth reference block to obtain the prediction values of the sub-block.

The motion compensation module 912, when weighting the pixel values of the third reference block and the pixel values of the fourth reference block to obtain the prediction values of the sub-block, is specifically configured to: obtain the prediction values of the sub-block by performing weighting for the pixel values of the third reference block, a first weight corresponding to the pixel values of the third reference block, the pixel values of the fourth reference block, and a second weight corresponding to the pixel values of the fourth reference block; where the first weight is identical to the second weight.

Figure 9B:
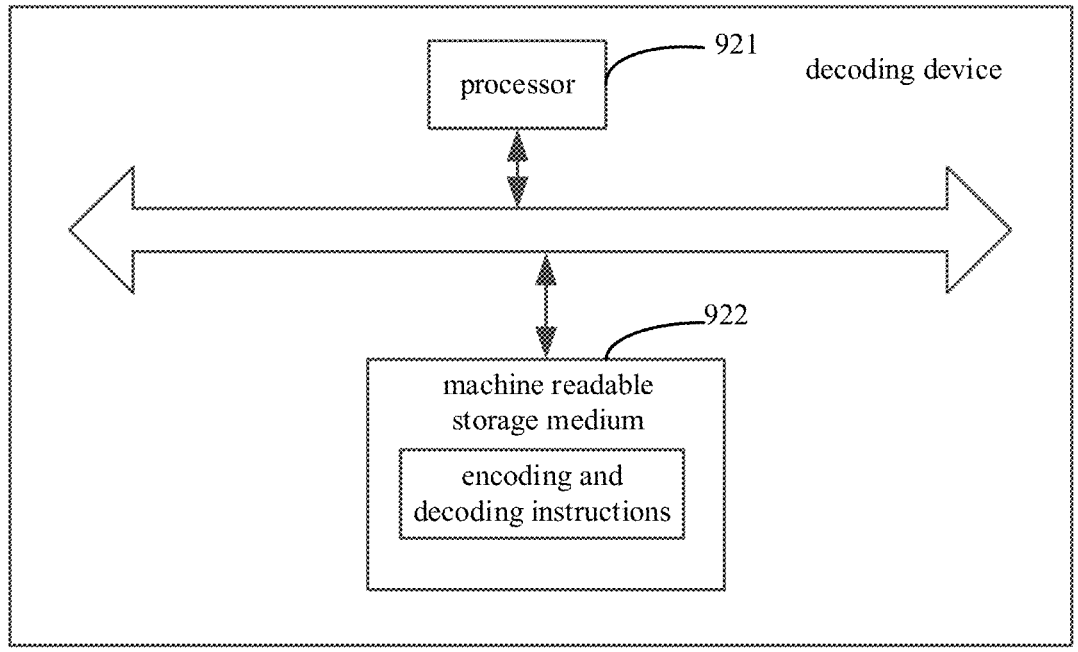
FIG. 9B is a hardware structure diagram illustrating a decoding device according to an embodiment of the present disclosure.

From hardware level, the hardware architecture schematic diagram of the decoding device provided by an embodiment of the present disclosure is shown in FIG. 9B. The decoding device includes: a processor 921 and a machine-readable storage medium 922, where the machine-readable storage medium stores machine-executable instructions that can be executed by the processor 921; and the processor 921 is configured to execute the machine-executable instructions to implement the methods disclosed by the above embodiments of the present disclosure. For example, the processor is configured to execute the machine-executable instructions to implement the following steps:

if the following conditions are all satisfied, determining to use a decoder-side motion vector refinement mode for a current block:

control information allows the current block to enable the decoder-side motion vector refinement mode;

a prediction mode of the current block is a regular merge mode; or, a prediction mode of the current block is a merge mode or a skip mode, and the prediction mode of the current block is not other modes except the regular merge mode;

prediction values of the current block are obtained by use of a weighted sample prediction process on reference blocks of two reference pictures, the two reference pictures are respectively displayed earlier than and displayed later than a current picture, and the two reference pictures have a same distance from the current picture;

the two reference pictures of the current block are same in weight;

the two reference pictures of the current block both are short-term reference pictures;

the width, height and area of the current block are all in defined ranges; and the two reference pictures of the current block are identical in size to the current picture;

if it is determined to use the decoder-side motion vector refinement mode for the current block, performing motion compensation on the current block.

Figure 9C:
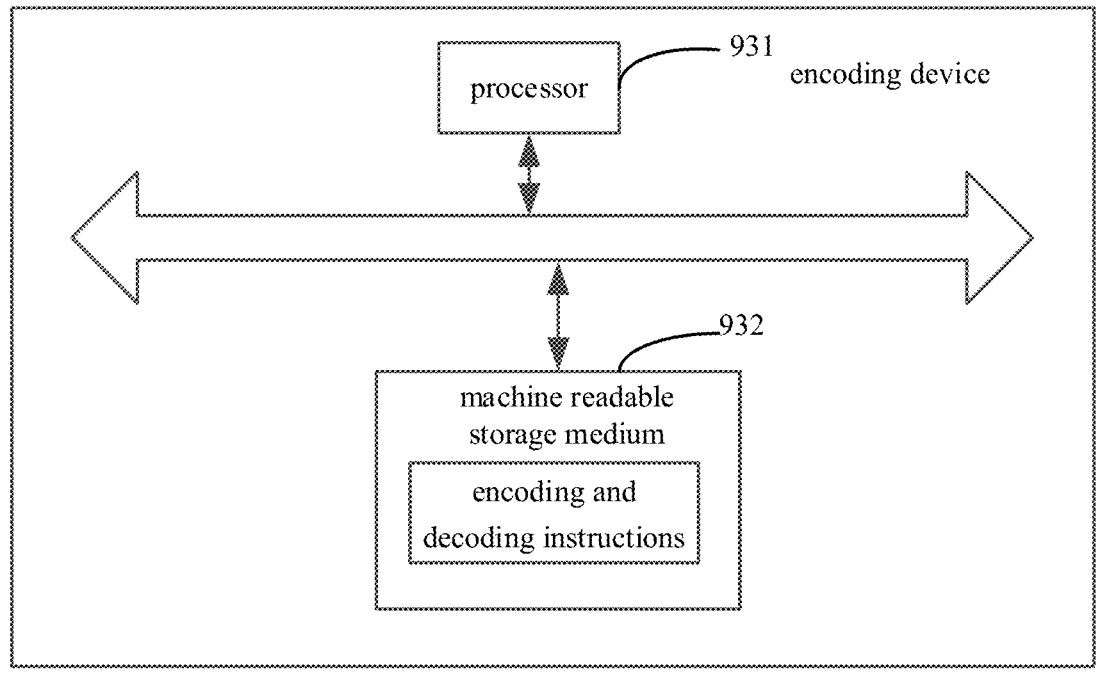
FIG. 9C is a hardware structure diagram illustrating an encoding device according to an embodiment of the present disclosure.

From hardware level, the hardware architecture schematic diagram of the encoding device provided by an embodiment of the present disclosure is shown in FIG. 9C. The encoding device includes: a processor 931 and a machine-readable storage medium 932, where the machine-readable storage medium 932 stores machine-executable instructions that can be executed by the processor 931; and the processor 931 is configured to execute the machine-executable instructions to implement the methods disclosed by the above embodiments of the present disclosure. For example, the processor is configured to execute the machine-executable instructions to implement the following steps:

if the following conditions are all satisfied, determining to use a decoder-side motion vector refinement mode for a current block:

control information allows the current block to enable the decoder-side motion vector refinement mode;

a prediction mode of the current block is a regular merge mode; or, a prediction mode of the current block is a merge mode or a skip mode, and the prediction mode of the current block is not other modes except the regular merge mode;

prediction values of the current block are obtained by use of a weighted sample prediction process on reference blocks of two reference pictures, the two reference pictures are respectively displayed earlier than and later than after a current picture, and the two reference pictures have a same distance from the current picture;

the two reference pictures of the current block are same in weight;

the two reference pictures of the current block both are short-term reference pictures;

the width, height and area of the current block are all in defined ranges; and the two reference pictures of the current block are identical in size to the current picture;

if it is determined to use the decoder-side motion vector refinement mode for the current block, performing motion compensation on the current block.

Based on the same application conception as the above method, an embodiment of the present disclosure further provides a machine-readable storage medium. The machine-readable storage medium stores several computer instructions, which are executed by a processor to implement the encoding and decoding method disclosed by the above-mentioned embodiments. Where, the machine-readable storage medium may be any electronic, magnetic, optical or other physical storage device, and may contain or store information such as executable instructions, and data, etc. For example, the machine-readable storage medium may be a Radom Access Memory (RAM), a volatile memory, a non-volatile memory, a flash memory, a memory driver (such as a hard disk drive), a solid state disk, storage disks of any type (such as compact discs, DVD S, etc.), or similar storage mediums, or a combination thereof.

Based on the same application conception as the above method, an embodiment of the present disclosure further provides a computer program product. The computer program product includes computer instructions, which are executed by a processor to implement the encoding and decoding method disclosed in the above-mentioned embodiments of the present disclosure.

Based on the same application conception as the above method, an embodiment of the present disclosure further provides an encoding and decoding system. The encoding and decoding system includes a processor and a machine-readable storage medium. The machine-readable storage medium stores machine-executable instructions capable of being executed by the processor. When the machine-executable instructions are executed by the processor, the encoding and decoding method disclosed in the above-mentioned embodiments of the present disclosure may be implemented.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a game console, a tablet computer, wearable equipment, or combinations of any several devices of these devices. For the convenience of description, the above-mentioned apparatus, when described, is divided into various units by function for descriptions. Of course, when the present disclosure is implemented, the functions of different units may be implemented in one or more softwares and/or hardwares.

Those skilled in the art should understand that the embodiments of the present disclosure may be provided as methods, systems, or computer program products. Therefore, the present disclosure may take the form of a pure hardware embodiment, a pure software embodiment, or an embodiment combining both software and hardware. Furthermore, the embodiments of the present disclosure may take the form of a computer program product implemented on one or more computer available storage mediums (including but not limited to disk memories, CD-ROM, optical memories, etc.) containing computer available program codes. The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processor, or other programmable data processing device to produce a machine, so that the instructions executed by the processor or other programmable data processing device generate a device for implementing functions specified in one or more flows in the flowchart and/or in one or more blocks in the block diagram.

Moreover, these computer program instructions may also be stored in a computer readable memory capable of directing a computer or other programmable data processing device to operate in a particular manner, so that the instructions stored in the computer readable memory generate a product including an instruction device, where the instruction device implements the functions specified in one or more flows in the flowchart and/or one or more blocks in the block diagram. These computer program instructions can also be loaded onto a computer or other programmable data processing device, so that a series of operating steps may be performed on the computer or other programmable device to generate computer-implemented processing, and thus instructions executed on the computer or other programmable device provide steps for implementing the function specified in one or more flows in the flowchart and/or one or more blocks in the block diagram.

The above descriptions are only some examples of the present disclosure, and are not used to limit the present disclosure. For those skilled in the art, the present disclosure may have various changes and modifications. Any modifications, equivalent replacements, improvements, etc. made in the spirit and principle of this present disclosure shall fall within the scope of claims of the present disclosure.

What is claimed is:

1. A decoding method, comprising:
in response to determining to use decoder-side motion vector refinement mode for a current block, performing, based on the decoder-side motion vector refinement mode, motion compensation on the current block to obtain prediction values of the current block;
wherein, performing, based on the decoder-side motion vector refinement mode, the motion compensation on the current block to obtain the prediction values of the current block, comprising:
for each sub-block of one or more sub-blocks comprised in the current block:
determining, according to a first original motion vector of the sub-block, a first reference block corresponding to the sub-block;
determining, according to a second original motion vector of the sub-block, a second reference block corresponding to the sub-block;
adjusting, according to first pixel values of the first reference block and second pixel values of the second reference block, the first original motion vector and the second original motion vector, to obtain a first target motion vector corresponding to the first original motion vector and a second target motion vector corresponding to the second original motion vector; and
determining, according to the first target motion vector and the second target motion vector, prediction values of the sub-block;
obtaining, according to prediction values of all sub-blocks in the current block, prediction values of the current block;
wherein, adjusting, according to first pixel values of the first reference block and second pixel values of the second reference block, the first original motion vector and the second original motion vector, to obtain the first target motion vector corresponding to the first original motion vector and the second target motion vector corresponding to the second original motion vector comprising:
selecting all of (2*SR+1)*(2*SR+1) motion vectors surrounding and comprising an initial motion vector as candidate motion vectors;
according to the first pixel values of the first reference block and the second pixel values of the second reference block, determining cost values of the candidate motion vectors and determining a motion vector with a minimum cost value from the candidate motion vectors as an optimal motion vector;
adjusting, according to the optimal motion vector, the first original motion vector and the second original motion vector, to obtain the first target motion vector corresponding to the first original motion vector and the second target motion vector corresponding to the second original motion vector;
wherein, the initial motion vector is the first original motion vector or the second original motion vector;

wherein, SR represents a search range, a value of SR is equal to 2, and the search order of 25 motion vectors is as follows: {Mv(0, 0), Mv(−2, −2), Mv(−1, −2), Mv (0, −2), Mv(1, −2), Mv(2, −2), Mv(−2, −1), Mv (−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; Mv(0,0) represents the initial motion vector, other candidates motion vector excluded Mv(0,0) are offset motion vectors of the initial motion vector.

2. The method of claim 1, wherein after determining the cost value of Mv(0,0), the method further comprising:

in response to determining that the cost value of Mv(0,0) is less than dx*dy, terminating the searching process of cost values of motion vectors after than Mv(0,0), which are {Mv(−2, −2), Mv(−1, −2), Mv(0, −2), Mv(1, −2), Mv(2, −2), Mv(−2, −1), Mv(−1, −1), Mv(0, −1), Mv (1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)};

wherein, dx represents width of the sub-block and dy represents height of the sub-block.

3. The method of claim 1, wherein determining, according to the first original motion vector of the sub-block, the first reference block corresponding to the sub-block, and determining, according to the second original motion vector of the sub-block, the second reference block corresponding to the sub-block comprises:

determining the first reference block corresponding to the sub-block from a first reference picture based on the first original motion vector of the sub-block; wherein pixel values of pixel points in the first reference block are obtained by interpolating between pixel values of neighboring pixel points in the first reference block, or by copying the pixel values of the neighboring pixel points in the first reference block; and determining the second reference block corresponding to the sub-block from a second reference picture based on the second original motion vector of the sub-block; wherein pixel values of pixel points in the second reference block are obtained by interpolating between pixel values of neighboring pixel points in the second reference block, or by copying the pixel values of the neighboring pixel points in the second reference block.

4. The method of claim 1, furthering comprising:

in response to that following conditions are satisfied, determining to use the decoder-side motion vector refinement mode for the current block;

wherein the conditions comprise:

picture-level control information is configured to indicate the current block to enable the decoder-side motion vector refinement mode;

the current block uses a regular merge mode;

the current block doesn't use a combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;

wherein, two reference pictures of the current block being same in weight comprises: picture-level weights of the two reference pictures are same and block-level weights of the two reference pictures are same;

the two reference pictures of the current block both are short-term reference pictures;

the two reference pictures of the current block are identical in size to the current picture;

the size of the current block is satisfied: the width is greater than or equal to 8, the height is greater than or equal to 8, and the area is greater than or equal to 128.

5. The method of claim 1, further comprising:

in response to that any one of following conditions is not satisfied, determining not to use the decoder-side motion vector refinement mode for the current block;

wherein the conditions comprise:

picture-level control information is configured to indicate the current block to enable the decoder-side motion vector refinement mode;

the current block uses a regular merge mode;

the current block doesn't use combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;

wherein, two reference pictures of the current block being same in weight comprises: picture-level weights of the two reference pictures are same and block-level weights of the two reference pictures are same;

the two reference pictures of the current block both are short-term reference pictures;

the two reference pictures of the current block are identical in size to the current picture;

the size of the current block is satisfied: the width is greater than or equal to 8, the height is greater than or equal to 8, and the area is greater than or equal to 128.

6. An encoding method, comprising:

in response to determining to use decoder-side motion vector refinement mode for a current block, encoding the current block based on the decoder-side motion vector refinement mode;

wherein, encoding the current block based on the decoder-side motion vector refinement mode, comprising:

for each sub-block of one or more sub-blocks comprised in the current block:

determining, according to a first original motion vector of the sub-block, a first reference block corresponding to the sub-block;

determining, according to a second original motion vector of the sub-block, a second reference block corresponding to the sub-block;

adjusting, according to first pixel values of the first reference block and second pixel values of the second reference block, the first original motion vector and the second original motion vector, to obtain a first target motion vector corresponding to the first original motion vector and a second target motion vector corresponding to the second original motion vector; and determining, according to the first target motion vector and the second target motion vector, prediction values of the sub-block;

obtaining, according to prediction values of all sub-blocks in the current block, prediction values of the current block;

wherein, adjusting, according to first pixel values of the first reference block and second pixel values of the second reference block, the first original motion vector and the second original motion vector, to obtain the first target motion vector corresponding to the first original motion vector and the second target motion vector corresponding to the second original motion vector comprising:

selecting all of (2*SR+1)*(2*SR+1) motion vectors surrounding and comprising an initial motion vector as candidate motion vectors;

according to the first pixel values of the first reference block and the second pixel values of the second reference block, determining cost values of the candidate motion vectors and determining a motion vector with a minimum cost value from the candidate motion vectors as an optimal motion vector;

adjusting, according to the optimal motion vector, the first original motion vector and the second original motion vector, to obtain the first target motion vector corresponding to the first original motion vector and the second target motion vector corresponding to the second original motion vector;

wherein, the initial motion vector is the first original motion vector or the second original motion vector;

wherein, SR represents a search range, a value of SR is equal to 2, and the search order of 25 motion vectors is as follows: {Mv(0, 0), Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; Mv(0,0) represents the initial motion vector, other candidates motion vector excluded Mv(0,0) are offset motion vectors of the initial motion vector.

7. The method of claim 6, wherein after determining the cost value of Mv (0,0), the method further comprising:

in response to determining that the cost value of Mv(0,0) is less than dx*dy, terminating the searching process of cost values of motion vectors after than Mv(0,0), which are {Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)};

wherein, dx represents width of the sub-block and dy represents height of the sub-block.

8. The method of claim 6, wherein determining, according to the first original motion vector of the sub-block, the first reference block corresponding to the sub-block, and determining, according to the second original motion vector of the sub-block, the second reference block corresponding to the sub-block comprises:

determining the first reference block corresponding to the sub-block from a first reference picture based on the first original motion vector of the sub-block; wherein pixel values of pixel points in the first reference block are obtained by interpolating between pixel values of neighboring pixel points in the first reference block, or by copying the pixel values of the neighboring pixel points in the first reference block; and determining the second reference block corresponding to the sub-block from a second reference picture based on the second original motion vector of the sub-block; wherein pixel values of pixel points in the second reference block are obtained by interpolating between pixel values of neighboring pixel points in the second reference block, or by copying the pixel values of the neighboring pixel points in the second reference block.

9. The method of claim 6, furthering comprising:

in response to that following conditions are satisfied, determining to use the decoder-side motion vector refinement mode for current block;

wherein the conditions comprise:

picture-level control information is configured to indicate the current block to enable the decoder-side motion vector refinement mode;

the current block uses a regular merge mode;

the current block doesn't use combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;

wherein, two reference pictures of the current block being same in weight comprises: picture-level weights of the two reference pictures are same and block-level weights of the two reference pictures are same;

the two reference pictures of the current block both are short-term reference pictures;

the two reference pictures of the current block are identical in size to the current picture;

the size of the current block is satisfied: the width is greater than or equal to 8, the height is greater than or equal to 8, and the area is greater than or equal to 128.

10. The method of claim 6, further comprising:

in response to that any one of following conditions is not satisfied, determining not to use the decoder-side motion vector refinement mode for the current block;

wherein the conditions comprise:

picture-level control information is configured to indicate the current block to enable the decoder-side motion vector refinement mode;

the current block uses a regular merge mode;

the current block doesn't use combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;
wherein, two reference pictures of the current block being same in weight comprises:
picture-level weights of the two reference pictures are same and block-level weights of the two reference pictures are same;
the two reference pictures of the current block both are short-term reference pictures;
the two reference pictures of the current block are identical in size to the current picture;
the size of the current block is satisfied: the width is greater than or equal to 8, the height is greater than or equal to 8, and the area is greater than or equal to 128.

11. A decoding device, comprising a processor and a machine-readable storage medium, wherein the machine-readable storage medium stores machine-executable instructions executable by the processor; and
the processor is configured to execute the machine-executable instructions to implement the operations comprising:
in response to determining to use decoder-side motion vector refinement mode for a current block, performing, based on the decoder-side motion vector refinement mode, motion compensation on the current block to obtain prediction values of the current block;
wherein, performing, based on the decoder-side motion vector refinement mode, the motion compensation on the current block to obtain the prediction values of the current block, comprising:
for each sub-block of one or more sub-blocks comprised in the current block:
determining, according to a first original motion vector of the sub-block, a first reference block corresponding to the sub-block;
determining, according to a second original motion vector of the sub-block, a second reference block corresponding to the sub-block;
adjusting, according to first pixel values of the first reference block and second pixel values of the second reference block, the first original motion vector and the second original motion vector, to obtain a first target motion vector corresponding to the first original motion vector and a second target motion vector corresponding to the second original motion vector; and
determining, according to the first target motion vector and the second target motion vector, prediction values of the sub-block;
obtaining, according to prediction values of all sub-blocks in the current block, prediction values of the current block;
wherein, adjusting, according to first pixel values of the first reference block and second pixel values of the second reference block, the first original motion vector and the second original motion vector, to obtain the first target motion vector corresponding to the first original motion vector and the second target motion vector corresponding to the second original motion vector comprising:
selecting all of $(2*SR+1)*(2*SR+1)$ motion vectors surrounding and comprising an initial motion vector as candidate motion vectors;
according to the first pixel values of the first reference block and the second pixel values of the second reference block, determining cost values of the candidate motion vectors and determining a motion vector with a minimum cost value from the candidate motion vectors as an optimal motion vector;
adjusting, according to the optimal motion vector, the first original motion vector and the second original motion vector, to obtain the first target motion vector corresponding to the first original motion vector and the second target motion vector corresponding to the second original motion vector;
wherein, the initial motion vector is the first original motion vector or the second original motion vector;
wherein, SR represents a search range, a value of SR is equal to 2, and the search order of 25 motion vectors is as follows: {Mv(0, 0), Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; Mv(0,0) represents the initial motion vector, other candidates motion vector excluded Mv(0,0) are offset motion vectors of the initial motion vector.

12. The device of claim 11, wherein after determining the cost value of Mv (0,0), the operations further comprising:
in response to determining that the cost value of Mv(0,0) is less than dx*dy, terminating the searching process of cost values of motion vectors after than Mv(0,0), which are {Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)};
wherein, dx represents width of the sub-block and dy represents height of the sub-block.

13. The device of claim 11, wherein determining, according to the first original motion vector of the sub-block, the first reference block corresponding to the sub-block, and determining, according to the second original motion vector of the sub-block, the second reference block corresponding to the sub-block comprises:
determining the first reference block corresponding to the sub-block from a first reference picture based on the first original motion vector of the sub-block; wherein pixel values of pixel points in the first reference block are obtained by interpolating between pixel values of neighboring pixel points in the first reference block, or by copying the pixel values of the neighboring pixel points in the first reference block; and
determining the second reference block corresponding to the sub-block from a second reference picture based on the second original motion vector of the sub-block; wherein pixel values of pixel points in the second reference block are obtained by interpolating between pixel values of neighboring pixel points in the second reference block, or by copying the pixel values of the neighboring pixel points in the second reference block.

14. The device of claim 11, the operations furthering comprising:
in response to that following conditions are satisfied, determining to use the decoder-side motion vector refinement mode for current block;
wherein the conditions comprise:
picture-level control information is configured to indicate the current block to enable the decoder-side motion vector refinement mode;

the current block uses a regular merge mode;
the current block doesn't use combine inter intra prediction (CIIP) mode or a merge with motion vector difference (MMVD) mode;
the current block uses a bidirectional prediction mode;
wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;
wherein, two reference pictures of the current block being same in weight comprises: picture-level weights of the two reference pictures are same and block-level weights of the two reference pictures are same;
the two reference pictures of the current block both are short-term reference pictures;
the two reference pictures of the current block are identical in size to the current picture;
the size of the current block is satisfied: the width is greater than or equal to 8, the height is greater than or equal to 8, and the area is greater than or equal to 128.

15. The device of claim 11, the operations further comprising:
in response to that any one of following conditions is not satisfied, determining not to use the decoder-side motion vector refinement mode for the current block;
wherein the conditions comprise:
picture-level control information is configured to indicate the current block to enable the decoder-side motion vector refinement mode;
the current block uses a regular merge mode;
the current block doesn't use combine inter intra prediction (CIIP) mode or a merge with motion vector difference (MMVD) mode;
the current block uses a bidirectional prediction mode;
wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;
wherein, two reference pictures of the current block being same in weight comprises: picture-level weights of the two reference pictures are same and block-level weights of the two reference pictures are same;
the two reference pictures of the current block both are short-term reference pictures;
the two reference pictures of the current block are identical in size to the current picture;
the size of the current block is satisfied: the width is greater than or equal to 8, the height is greater than or equal to 8, and the area is greater than or equal to 128.

16. An encoding device, comprising a processor and a machine-readable storage medium, wherein the machine-readable storage medium stores machine-executable instructions executable by the processor; and
the processor is configured to execute the machine-executable instructions to implement the operations comprising:
in response to determining to use decoder-side motion vector refinement mode for a current block, encoding the current block based on the decoder-side motion vector refinement mode;
wherein, encoding the current block based on the decoder-side motion vector refinement mode, comprising:
for each sub-block of one or more sub-blocks comprised in the current block:
determining, according to a first original motion vector of the sub-block, a first reference block corresponding to the sub-block;
determining, according to a second original motion vector of the sub-block, a second reference block corresponding to the sub-block;
adjusting, according to first pixel values of the first reference block and second pixel values of the second reference block, the first original motion vector and the second original motion vector, to obtain a first target motion vector corresponding to the first original motion vector and a second target motion vector corresponding to the second original motion vector; and
determining, according to the first target motion vector and the second target motion vector, prediction values of the sub-block;
obtaining, according to prediction values of all sub-blocks in the current block, prediction values of the current block;
wherein, adjusting, according to first pixel values of the first reference block and second pixel values of the second reference block, the first original motion vector and the second original motion vector, to obtain the first target motion vector corresponding to the first original motion vector and the second target motion vector corresponding to the second original motion vector comprising:
selecting all of (2*SR+1)*(2*SR+1) motion vectors surrounding and comprising an initial motion vector as candidate motion vectors;
according to the first pixel values of the first reference block and the second pixel values of the second reference block, determining cost values of the candidate motion vectors and determining a motion vector with a minimum cost value from the candidate motion vectors as an optimal motion vector;
adjusting, according to the optimal motion vector, the first original motion vector and the second original motion vector, to obtain the first target motion vector corresponding to the first original motion vector and the second target motion vector corresponding to the second original motion vector;
wherein, the initial motion vector is the first original motion vector or the second original motion vector;
wherein, SR represents a search range, a value of SR is equal to 2, and the search order of 25 motion vectors is as follows: {Mv(0, 0), Mv(−2, −2), Mv(−1, −2), Mv(0, −2), Mv(1, −2), Mv(2, −2), Mv(−2, −1), Mv(−1, −1), Mv(0, −1), Mv(1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)}; Mv(0,0) represents the initial motion vector, other candidates motion vector excluded Mv(0,0) are offset motion vectors of the initial motion vector.

17. The device of claim 16, wherein after determining the cost value of Mv (0,0), the operations further comprising:

in response to determining that the cost value of Mv(0,0) is less than dx*dy, terminating the searching process of cost values of motion vectors after than Mv(0,0), which are {Mv(−2, −2), Mv(−1, −2), Mv(0, −2), Mv(1, −2), Mv(2, −2), Mv(−2, −1), Mv(−1, −1), Mv(0, −1), Mv (1, −1), Mv(2, −1), Mv(−2, 0), Mv(−1, 0), Mv(0, 0), Mv(1, 0), Mv(2, 0), Mv(−2, 1), Mv(−1, 1), Mv(0, 1), Mv(1, 1), Mv(2, 1), Mv(−2, 2), Mv(−1, 2), Mv(0, 2), Mv(1, 2), Mv(2, 2)};

wherein, dx represents width of the sub-block and dy represents height of the sub-block.

18. The device of claim 16, wherein determining, according to the first original motion vector of the sub-block, the first reference block corresponding to the sub-block, and determining, according to the second original motion vector of the sub-block, the second reference block corresponding to the sub-block comprises:

determining the first reference block corresponding to the sub-block from a first reference picture based on the first original motion vector of the sub-block; wherein pixel values of pixel points in the first reference block are obtained by interpolating between pixel values of neighboring pixel points in the first reference block, or by copying the pixel values of the neighboring pixel points in the first reference block; and determining the second reference block corresponding to the sub-block from a second reference picture based on the second original motion vector of the sub-block; wherein pixel values of pixel points in the second reference block are obtained by interpolating between pixel values of neighboring pixel points in the second reference block, or by copying the pixel values of the neighboring pixel points in the second reference block.

19. The device of claim 16, the operations furthering comprising:

in response to that following conditions are satisfied, determining to use the decoder-side motion vector refinement mode for current block;

wherein the conditions comprise:

picture-level control information is configured to indicate the current block to enable the decoder-side motion vector refinement mode;

the current block uses a regular merge mode;

the current block doesn't use combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;

wherein, two reference pictures of the current block being same in weight comprises: picture-level weights of the two reference pictures are same and block-level weights of the two reference pictures are same;

the two reference pictures of the current block both are short-term reference pictures;

the two reference pictures of the current block are identical in size to the current picture;

the size of the current block is satisfied: the width is greater than or equal to 8, the height is greater than or equal to 8, and the area is greater than or equal to 128.

20. The device of claim 16, the operations further comprising:

in response to that any one of following conditions is not satisfied, determining not to use the decoder-side motion vector refinement mode for the current block;

wherein the conditions comprise:

picture-level control information is configured to indicate the current block to enable the decoder-side motion vector refinement mode;

the current block uses a regular merge mode;

the current block doesn't use combine inter intra prediction (CIIP) mode or a merge with motion vector difference (MMVD) mode;

the current block uses a bidirectional prediction mode;

wherein, prediction values of the current block are obtained by use of a weighted sample prediction process on reference blocks of two reference pictures, and the two reference pictures of the current block are same in weight; directions of the two reference pictures are different, one reference picture is displayed earlier than a current picture, the other picture is displayed later than the current picture, and the two reference pictures have a same distance from the current picture;

wherein, two reference pictures of the current block being same in weight comprises: picture-level weights of the two reference pictures are same and block-level weights of the two reference pictures are same;

the two reference pictures of the current block both are short-term reference pictures;

the two reference pictures of the current block are identical in size to the current picture;

the size of the current block is satisfied: the width is greater than or equal to 8, the height is greater than or equal to 8, and the area is greater than or equal to 128.

* * * * *